United States Patent
Ojida et al.

(10) Patent No.: US 12,441,687 B2
(45) Date of Patent: Oct. 14, 2025

(54) Drp1-FILAMIN COMPLEX FORMATION INHIBITORS

(71) Applicant: RDISCOVERY, LLC, Seattle, WA (US)

(72) Inventors: Akio Ojida, Fukuoka (JP); Naoya Shindo, Fukuoka (JP); Akiyuki Nishimura, Fukuoka (JP); Motohiro Nishida, Aichi (JP)

(73) Assignee: RDISCOVERY, LLC, Seattle, WA (US)

( * ) Notice: Subject to any disclaimer, the term of this patent is extended or adjusted under 35 U.S.C. 154(b) by 895 days.

(21) Appl. No.: 17/595,817

(22) PCT Filed: May 26, 2020

(86) PCT No.: PCT/JP2020/020744
§ 371 (c)(1),
(2) Date: Nov. 24, 2021

(87) PCT Pub. No.: WO2020/241638
PCT Pub. Date: Dec. 3, 2020

(65) Prior Publication Data
US 2022/0169613 A1 Jun. 2, 2022

(30) Foreign Application Priority Data
May 31, 2019 (JP) .................... 2019-103034

(51) Int. Cl.
C07D 213/80 (2006.01)
C07D 211/90 (2006.01)
C07D 401/12 (2006.01)

(52) U.S. Cl.
CPC .......... *C07D 213/80* (2013.01); *C07D 211/90* (2013.01); *C07D 401/12* (2013.01)

(58) Field of Classification Search
CPC ..... C07D 213/80; C07D 401/12; A61K 31/00
See application file for complete search history.

(56) References Cited

U.S. PATENT DOCUMENTS 4,672,068 A * 6/1987 Kutsuma .............. C07D 401/04
546/280.4
6,482,841 B1 * 11/2002 Letelier ..................... A61P 9/10
514/354

FOREIGN PATENT DOCUMENTS

| JP | 2-121967 | * | 5/1990 | ........... C07D 211/90 |
| JP | H02121967 A | | 5/1990 | |
| WO | 2016080516 A1 | | 5/2016 | |
| WO | WO2016/080516 | * | 5/2016 | ......... A61K 31/4422 |
| WO | 2018052891 A2 | | 3/2018 | |

OTHER PUBLICATIONS

Zeng et al., Rapid Comm., Mass Spectrum, (2016) vol. 30, pp. 1771-1778 2016.*
Nagashima Shun et al., Japanese Journal of Pharmacology, 2017, vol. 149, pp. 254-259.
Elizabeth A. Novak et al. "Mitochondrial dysfunction in inflammatory bowel disease" Frontiers in Cell and Developmental Biology, Oct. 1, 2015, vol. 3, DOI: 10.3389/fcell.2015.00062.
Office Action for Japanese Patent Application No. 2023-069650 mailed Apr. 30, 2024, with English translation (8 pages). (Contains concise explanation of relevance for Shun et al.).
Office Action for Japanese Patent Application No. 2021-571409 mailed Jun. 7, 2022 (10 pages).
International Search Report of International Application No. PCT/JP2020/020744 mailed Jul. 21, 2020 (3 pages).
Nishimura et al., "Hypoxia-induced interaction of filamin with Drp1 causesmitochondrial hyperfission-associated myocardial senescence," Sci. Signal. 2018; 11(556): eaat5185.
Zeng et al., "Study of the structures of photodegradation impurities andpathways of photodegradation of cilnidipine by liquid chromatography/Q-Orbitrapmass spectrometry," Rappid Communications in Mass Spectrometry. 2016; 30: 1771-1778.

\* cited by examiner

*Primary Examiner* — Paul V Ward
(74) *Attorney, Agent, or Firm* — Dechert LLP

(57) ABSTRACT

Compounds represented by formula (I) below

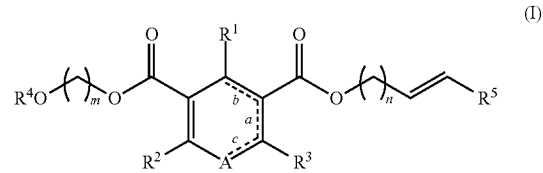

and pharmacologically acceptable salts thereof and solvates of them; pharmaceutical compositions and dynamin-related protein 1 (Drp1)-filamin complex formation inhibitors containing them; and uses of the compounds, salts, solvates, pharmaceutical compositions, and (Drp1)-filamin complex formation inhibitors for use as a prophylactic or therapeutic agent.

93 Claims, 13 Drawing Sheets

(a)

(b)

(a)

(b)

Drp1-FILAMIN COMPLEX FORMATION INHIBITORS

TECHNICAL FIELD

The present invention relates to dynamin-related protein 1 (Drp1)-filamin complex formation inhibitors and novel compounds.

BACKGROUND ART

Mitochondria is an organelle found in almost all eukaryotic cells, and principally takes part in ATP generation as a result of oxidative phosphorylation that occurs in the electron transfer system. Mitochondria repeats fusion and division, and any abnormality thereof is known to be involved in onset of cancer, cardiovascular disease, neurodegenerative disease and so forth. It has been suggested, for example, that morphological dysfunction of mitochondria, induced in a non-infarct area after myocardial infarction, would cause energy metabolic disorder, causing chronic heart failure.

Abnormal interaction between mitochondria and an actin cytoskeleton has attracted public attention as a critical determinant of cardiac vulnerability after myocardial infarction. Mitochondrial division is induced by activation of Drp1, which is a GTP-binding protein. The present inventors clarified that upon hypoxic stimulation of myocardial cells, Drp1 in the cells combines filamin to form a Drp1-filamin complex, further forms a Drp1-filamin-actin complex to activate itself, and promotes mitochondrial division. The present inventors also clarified that cilnidipine inhibits formation of the Drp1-filamin complex. (See Non Patent Literature 1, for example)

Cilnidipine is a compound represented by chemical formula (A1) below. Cilnidipine functions to block the L-type calcium channel and the N-type calcium channel, and has been used as a hypertension drug. Cilnidipine is featured by its long lastingness of the hypotensive effect, as compared with other antihypertensive drugs. Cilnidipine is therefore valuable as a therapeutic agent for cardiovascular diseases including heart failure and arrhythmia (see Patent Literature 1, for example).

[Chem.1]

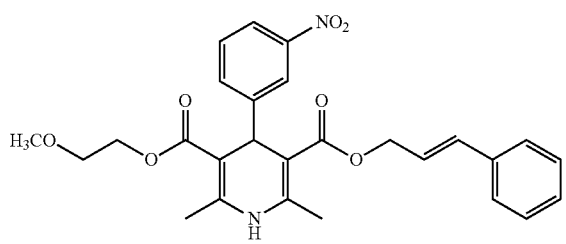

(A1)

CITATION LIST

Patent Literature

PTL 1: WO 2016/080516 A

Non Patent Literature

NPL 1: Nishimura A., et al., Hypoxia-induced interaction of filamin with Drp1 causes mitochondrial hyperfission-associated myocardial senescence, Sci. Signal., 11 (556), eaat5185, 2018.

SUMMARY OF INVENTION

Technical Problem

An object of the present invention is to provide Drp1-filamin complex formation inhibitors and novel compounds that can be included as an active ingredient in Drp1-filamin complex formation inhibitors.

Solution to Problem

The present invention includes the following aspects.

In one aspect, the invention includes compounds of Formula (I):

[Chem.2]

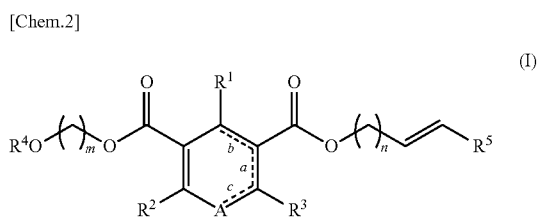

(I)

and pharmacologically acceptable salts thereof and solvates of them, where:

$R^1$ is phenyl substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl, provided that at least one substituent is $NO_2$ or $NH_2$;

$R^2$ is H, $C_1$-$C_6$ alkyl, $C_1$-$C_6$ haloalkyl, or $C_1$-$C_6$ alkoxyalkyl;

$R^3$ is H, $C_1$-$C_6$ alkyl, $C_1$-$C_6$ haloalkyl, or $C_1$-$C_6$ alkoxyalkyl;

$R^4$ is $C_1$-$C_6$ alkyl or $C_1$-$C_6$ haloalkyl;

$R^5$ is phenyl or pyridinyl, wherein the phenyl or pyridinyl is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl;

either (i) bond a is present and bonds b and c are absent or (ii) bonds b and c are present and bond a is absent;

A is NH when bond a is present and N when bonds b and c are present;

m is an integer from 1 to 4; and n is an integer from 1 to 3;

provided that the compound is other than

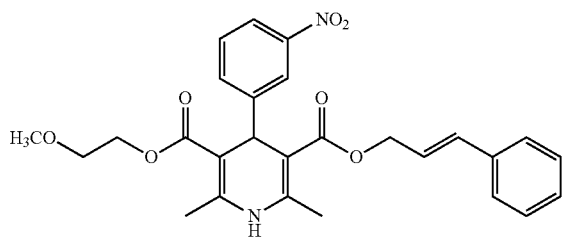

[Chem.3]

Compounds of Formula (I) are further described in the Description of Embodiments and specific embodiments 1 to 41, infra.

In another aspect, the invention includes compounds of Formula (1):

[Chem.4]

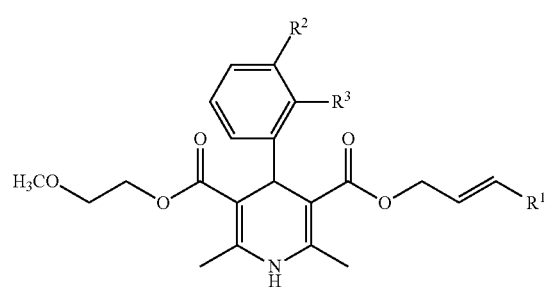

(1)

and pharmacologically acceptable salts thereof and solvates of them, where:

$R^1$ represents a phenyl group, 2-pyridyl group, 3-pyridyl group or 4-pyridyl group, $R^2$ represents a hydrogen atom or amino group, $R^3$ represents a hydrogen atom or nitro group, and if $R^2$ is a hydrogen atom then $R^3$ is a nitro group, and, if $R^2$ is an amino group then $R^3$ is a hydrogen atom.

Compounds of Formula (I) are further described in the Description of Embodiments and specific embodiments 42 to 44, infra.

In another aspect, the invention includes compounds of Formula (2):

[Chem.5]

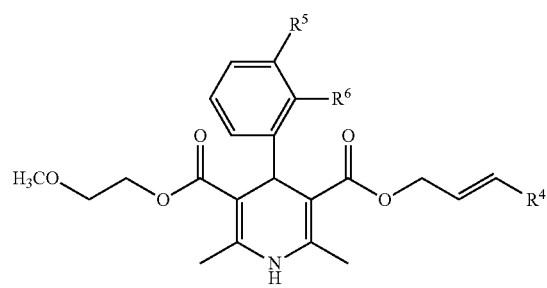

(2)

and pharmacologically acceptable salts thereof and solvates of them, where:

$R^4$ represents a phenyl group, 2-pyridyl group, 3-pyridyl group or 4-pyridyl group, $R^5$ represents an amino group, and $R^6$ represents a hydrogen atom.

In another aspect, the invention includes compounds of Formula (A):

[Chem.6]

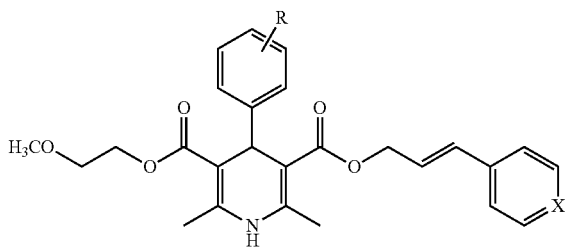

(A)

and pharmacologically acceptable salts thereof and solvates of them, where:

R is $NO_2$ or $NH_2$, wherein R is at the 2-position, 3-position, or 4-position of the phenyl ring; and X is CH or N, provided the compound is other than

[Chem.7]

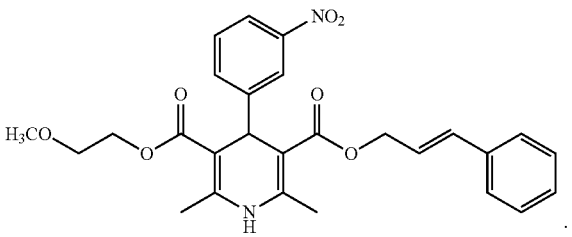

In another aspect, the invention includes compounds of Formula (B):

[Chem.8]

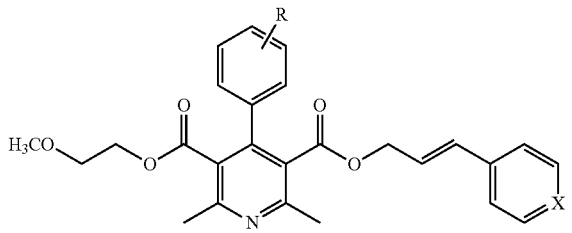

(B)

and pharmacologically acceptable salts thereof and solvates of them, where:

R is $NO_2$ or $NH_2$, wherein R is at the 2-position, 3-position, or 4-position of the phenyl ring; and X represents CH or N.

In another aspect, the invention includes pharmaceutical compositions comprising (a) a compound of the invention and (b) one or more pharmaceutically acceptable carriers.

The term "compound of the invention" as used herein refers to a compound of Formula (I) or a pharmacologically acceptable salt thereof or solvate of them, a compound of Formula (1) or a pharmacologically acceptable salt thereof or solvate of them, a compound of Formula (2) or a pharmacologically acceptable salt thereof or solvate of them, a compound of Formula (A) or a pharmacologically acceptable salt thereof or solvate of them, or a compound of Formula (B) or a pharmacologically acceptable salt thereof or solvate of them. Such pharmaceutical compositions, sometimes referred to herein as "pharmaceutical compositions of the invention", are further described in the Description of Embodiments and specific embodiments 65 to 88, infra.

In another aspect, the invention includes dynamin-related protein 1 (Drp1)-filamin complex formation inhibitors that contain, as an active ingredient, a compound of the invention. Such dynamin-related protein 1 (Drp1)-filamin complex formation inhibitors, sometimes referred to herein as "(Drp1)-filamin complex formation inhibitors of the invention", are further described in the Description of Embodiments and specific embodiment 89, infra.

In yet further aspects, the invention includes compounds of the invention that have advantageous properties as compared to cilnidipine. In some aspects, the compounds have a similar ability to cilnidipine to inhibit mitochondrial division but reduced ability to block calcium channels as compared to cilnidipine. In other aspects, the compounds have enhanced ability as compared to cilnidipine to inhibit mitochondrial division, with or without a reduced ability to block calcium channels. Compounds with such advantageous properties are further described in the Description of Embodiments and specific embodiments 52 to 64, infra.

In further aspects, the invention includes the compounds, pharmaceutical compositions, and (Drp1)-filamin complex formation inhibitors of the invention for use as a prophylactic or therapeutic agent, for example for a disease caused by Drp1 dysfunction, for chronic heart failure, for amyotrophic lateral sclerosis, for inflammatory bowel disease, or for diabetes, e.g., type 1 and type 2 (type 1/2) diabetes. Methods of treating disease caused by Drp1 dysfunction, chronic heart failure, amyotrophic lateral sclerosis, inflammatory bowel disease, and diabetes, e.g., type 1/2 diabetes, with the compounds, pharmaceutical compositions, and (Drp1)-filamin complex formation inhibitors of the invention are also provided. Exemplary uses and methods of treatment are further described in the Description of Embodiments and specific embodiments 90 to 99, infra.

The present invention further includes the following aspects.

[1] A dynamin-related protein 1 (Drp1)-filamin complex formation inhibitor that contains, as an active ingredient, a compound represented by formula (1) below or a pharmacologically acceptable salt thereof or a solvate of them.

[Chem.9]

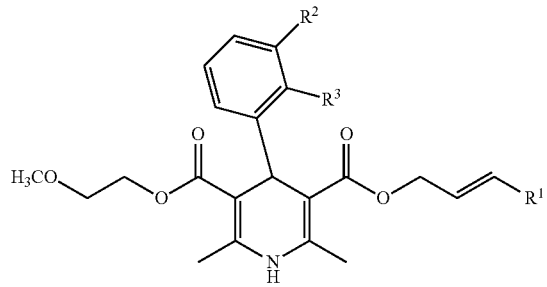

(1)

[in formula (1), $R^1$ represents a phenyl group, 2-pyridyl group, 3-pyridyl group or 4-pyridyl group, $R^2$ represents a hydrogen atom or amino group, $R^3$ represents a hydrogen atom or nitro group, wherein if $R^2$ is a hydrogen atom then $R^3$ is a nitro group, and, if $R^2$ is an amino group then $R^3$ is a hydrogen atom].

[2] The Drp1-filamin complex formation inhibitor according to [1], in which in formula (1), $R^1$ represents a phenyl group, 2-pyridyl group, 3-pyridyl group or 4-pyridyl group, $R^2$ represents a hydrogen atom, and $R^3$ represents a nitro group, or, $R^1$ represents a 2-pyridyl group, 3-pyridyl group or 4-pyridyl group, $R^2$ represents an amino group, and $R^3$ represents a hydrogen atom.

[3] Drp1-filamin complex formation inhibitor according to [1], in which in formula (1), $R^1$ represents a phenyl group, 2-pyridyl group, 3-pyridyl group or 4-pyridyl group, $R^2$ represents an amino group, and $R^3$ represents a hydrogen atom.

[4] The Drp1-filamin complex formation inhibitor according to any one of [1] to [3], being a prophylactic or therapeutic agent for disease caused by Drp1 dysfunction.

[5] The Drp1-filamin complex formation inhibitor according to [4], in which the disease is chronic heart failure, amyotrophic lateral sclerosis, inflammatory bowel disease or diabetes, e.g., type 1/2 diabetes.

[6] A pharmaceutical composition for inhibiting Drp1-filamin complex formation, including the Drp1-filamin complex formation inhibitor described in any one of [1] to [5], and a pharmaceutically acceptable carrier.

[7] A compound represented by formula (2) below or a pharmacologically acceptable salt thereof or a solvate of them.

[Chem.10]

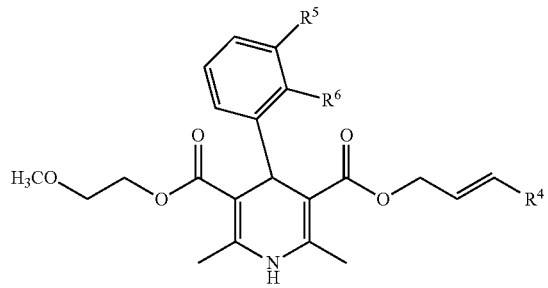

(2)

[in formula (2), $R^4$ represents a phenyl group, 2-pyridyl group, 3-pyridyl group or 4-pyridyl group, $R^5$ represents an amino group, and $R^6$ represents a hydrogen atom].

Advantageous Effects of Invention

According to the present invention, it is possible to provide a Drp1-filamin complex formation inhibitor.

DESCRIPTION OF EMBODIMENTS

Compounds

Figure 1:
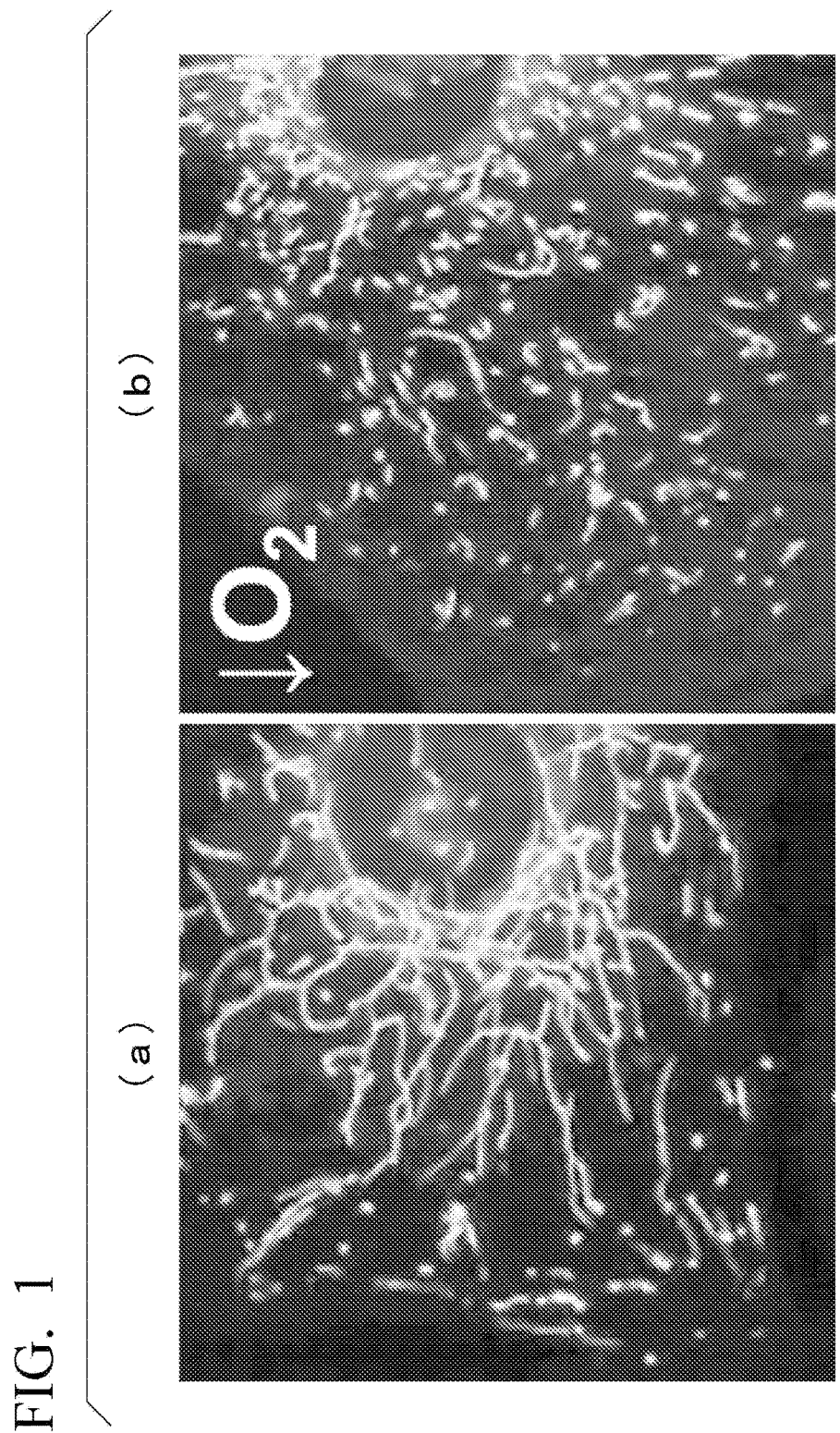
FIG. 1(a) is a fluorescent microphotograph of a cell cultured under normoxia in Exemplary Experiment 1.
FIG. 1(b) is a fluorescent microphotograph of a cell cultured under hypoxia in Exemplary Experiment 1.

In one aspect, the invention includes compounds of Formula (I):

[Chem. 11]

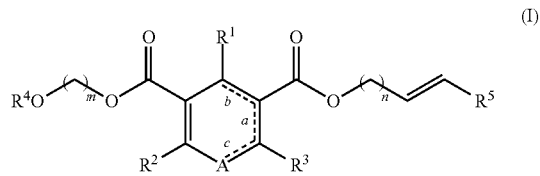

and pharmacologically acceptable salts thereof and solvates of them, where:

$R^1$ is phenyl substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl, provided that at least one substituent is $NO_2$ or $NH_2$;

$R^2$ is H, $C_1$-$C_6$ alkyl, $C_1$-$C_6$ haloalkyl, or $C_1$-$C_6$ alkoxyalkyl;

$R^3$ is H, $C_1$-$C_6$ alkyl, $C_1$-$C_6$ haloalkyl, or $C_1$-$C_6$ alkoxyalkyl;

$R^4$ is $C_1$-$C_6$ alkyl or $C_1$-$C_6$ haloalkyl;

$R^5$ is phenyl or pyridinyl, wherein the phenyl or pyridinyl is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl;

either (i) bond a is present and bonds b and c are absent or (ii) bonds b and c are present and bond a is absent;

A is NH when bond a is present and N when bonds b and c are present;

m is an integer from 1 to 4; and n is an integer from 1 to 3;

provided that the compound is other than

[Chem. 12]

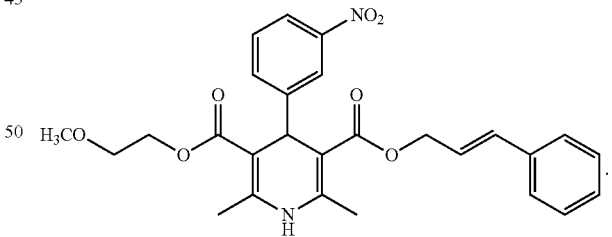

As used herein, the term "$C_1$-$C_n$ alkyl" refers to a straight- or branched-chain unsubstituted alkyl having from 1 to n carbon atoms in the chain. Examples of $C_1$-$C_6$ alkyl include methyl, ethyl, n-propyl, isopropyl, butyl, isobutyl, sec-butyl, tert-butyl (tBu), pentyl, isopentyl, tert-pentyl, hexyl, and isohexyl.

As used herein, the term "$C_1$-$C_n$ haloalkyl" refers to a straight- or branched-chain unsubstituted alkyl having from 1 to n carbon atoms in the chain and having one or more hydrogen atoms substituted with halogens. Examples of haloalkyl groups include trifluoromethyl ($CF_3$), difluoromethyl ($CF_2H$), monofluoromethyl ($CH_2F$), pentafluoroethyl (CF$_2$CF$_3$), tetrafluoroethyl (CHFCF$_3$), monofluoroethyl (CH$_2$CH$_2$F), and trifluoroethyl (CH$_2$CF$_3$.

As used herein, the term "C$_1$-C$_n$ alkoxyalkyl" refers to a straight- or branched-chain unsubstituted alkyl having from 1 to n carbon atoms in the chain and a terminal oxygen linking the group to the remainder of the molecule. Examples of C$_1$-C$_6$ alkyoxy groups include methoxy, ethoxy, propoxy, isopropoxy, n-butoxy, t-butoxy, pentoxy, and hexoxy.

As used herein, the term "phenyl" represents the following group:

[Chem. 13]

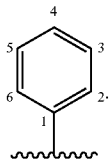

A substituent on a substituted phenyl group can be identified by its position on the phenyl ring. For example, a substituent can be at the 2-position, 3-position, or 4-position, where the position numbering refers to the positions as shown in the foregoing phenyl structure.

As used herein, the term "pyridinyl" or "pyridyl" represents a phenyl group in which one ring CH has been replaced with a nitrogen atom. Pyridinyl groups can be 2-pyridyl, 3-pyridyl, or 4-pyridyl. "2-pyridyl" refers to the following group:

[Chem. 14]

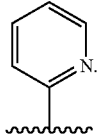

"3-pyridyl" refers to the following group:

[Chem. 15]

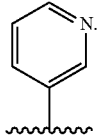

"4-pyridyl" refers to the following group:

[Chem. 16]

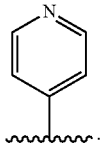

The term "unsubstituted" with reference to a group means that the specified group has no substituents. The term "substituted" with reference to a group means that the specified group has one or more substituents. If a group is not expressly noted as being substituted, it is understood that such group is unsubstituted.

In some embodiments the compound of Formula I is a compound of Formula (Ia):

[Chem. 17]

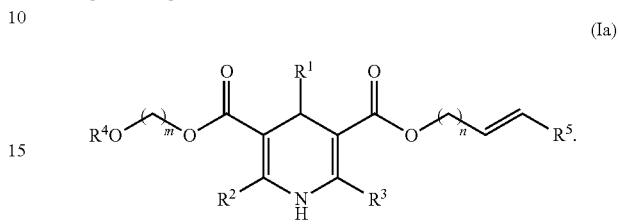

(Ia)

In other embodiments, the compound of Formula (I) is a compound of Formula (Ib):

[Chem. 18]

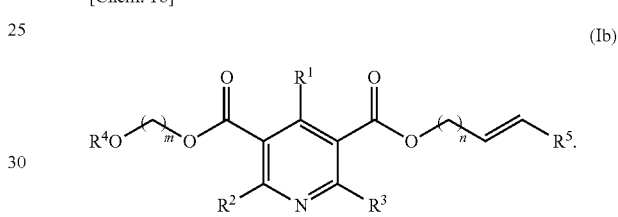

(Ib)

In some embodiments of the compounds of Formula (I) (including compounds of Formula (Ia) and Formula (Ib)), R$^1$ is

[Chem. 19]

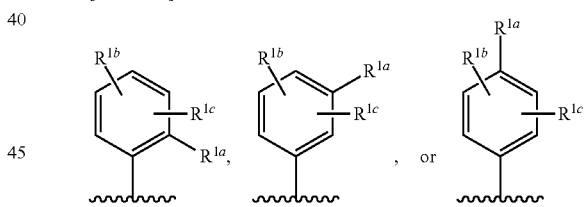

wherein R$^{1a}$ is NO$_2$ or NH$_2$, and R$^{1b}$ and R$^{1c}$ are each independently H, NO$_2$, NH$_2$, OH, C$_1$-C$_6$ alkyl, C$_1$-C$_6$ haloalkyl, or C$_1$-C$_6$ alkoxyalkyl. In some embodiments, both R$^{1b}$ and R$^{1c}$ are H.

In some embodiments of the compounds of Formula (I) (including compounds of Formula (Ia) and Formula (Ib)), R$^2$ is H, C$_1$-C$_3$ alkyl, C$_1$-C$_3$ haloalkyl, or C$_1$-C$_3$ alkoxyalkyl. In some embodiments, R$^2$ is CH$_3$.

In some embodiments of the compounds of Formula (I) (including compounds of Formula (Ia) and Formula (Ib)), R$^3$ is H, C$_1$-C$_3$ alkyl, C$_1$-C$_3$ haloalkyl, or C$_1$-C$_3$ alkoxyalkyl. In some embodiments, R$^3$ is CH$_3$. In some embodiments, both R$^2$ and R$^3$ are CH$_3$.

In some embodiments of the compounds of Formula (I) (including compounds of Formula (Ia) and Formula (Ib)), R$^4$ is C$_1$-C$_3$ alkyl or C$_1$-C$_3$ haloalkyl. In some embodiments, R$^4$ is CH$_3$.

In some embodiments of the compounds of Formula (I) (including compounds of Formula (Ia) and Formula (Ib)), R$^5$ is phenyl which is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl. In some embodiments, $R^5$ is unsubstituted phenyl.

In some embodiments of the compounds of Formula (I) (including compounds of Formula (Ia) and Formula (Ib)), $R^5$ is pyridinyl which is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl. In some embodiments, $R^5$ is unsubstituted pyridinyl. In some embodiments, the $R^5$ pyridinyl group is 4-pyridyl (e.g., unsubstituted 4-pyridyl). In other embodiments, the $R^5$ pyridinyl is 3-pyridyl (e.g., unsubstituted 4-pyridyl). the $R^5$ pyridinyl is 2-pyridyl (e.g., unsubstituted 2-pyridyl).

In some embodiments of the compounds of Formula (I) (including compounds of Formula (Ia) and Formula (Ib)), m is 1. In other embodiments, m is 2. In other embodiments, m is 3. In yet other embodiments, m is 4.

In some embodiments of the compounds of Formula (I) (including compounds of Formula (Ia) and Formula (Ib)), n is 1. In other embodiments, n is 2. In other embodiments, n is 3. In some embodiments, m is 2 and n is 1.

In some embodiments of the compounds of Formula (I) (including compounds of Formula (Ia) and Formula (Ib)), $R^1$ is

[Chem. 20]

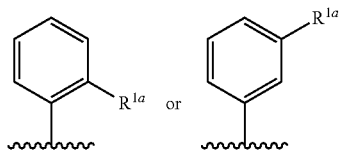

wherein $R^{1a}$ is $NO_2$ or $NH_2$; $R^2$, $R^3$, and $R^4$ are $CH_3$; $R^5$ is unsubstituted phenyl or unsubstituted pyridinyl (e.g., unsubstituted 4-pyridyl; m is 2; and n is 1.

In some embodiments, the compound of Formula (I) is 3-(2-methoxyethyl) 5-[(2E)-3-phenyl-2-propen-1-yl]2,6-dimethyl-4-(2-nitrophenyl)-1,4-dihydropyridine-3,5-dicarboxylate. In other embodiments, the compound of Formula (I) is 3-(2-methoxyethyl) 5-[(2E)-3-phenyl-2-propen-1-yl]4-(3-aminophenyl)-2,6-dimethyl-1,4-dihydropyridine-3,5-dicarboxylate. In other embodiments, the compound of Formula (I) is 3-(2-methoxyethyl) 5-[(2E)-3-phenyl-2-propen-1-yl]2,6-dimethyl-4-(3-nitrophenyl)pyridine-3,5-dicarboxylate. In other embodiments, the compound of Formula (I) is 3-(2-methoxyethyl) 5-[(2E)-3-phenyl-2-propen-1-yl]2,6-dimethyl-4-(4-nitrophenyl)-1,4-dihydropyridine-3,5-dicarboxylate. In other embodiments, the compound of Formula (I) is 3-(2-methoxyethyl) 5-[(2E)-3-phenyl-2-propen-1-yl]4-(4-aminophenyl)-2,6-dimethyl-1,4-dihydropyridine-3,5-dicarboxylate. In other embodiments, the compound of Formula (I) is 3-(2-methoxyethyl) 5-[(2E)-3-(pyridin-4-yl)-2-propen-1-yl]2,6-dimethyl-4-(2-nitrophenyl)-1,4-dihydropyridine-3,5-dicarboxylate. In other embodiments, the compound of Formula (I) is 3-(2-methoxyethyl) 5-[(2E)-3-(pyridin-4-yl)-2-propen-1-yl]2,6-dimethyl-4-(3-nitrophenyl)-1,4-dihydropyridine-3,5-dicarboxylate. In other embodiments, the compound of Formula (I) is 3-(2-methoxyethyl) 5-[(2E)-3-(pyridin-4-yl)-2-propen-1-yl]4-(3-aminophenyl)-2,6-dimethyl-1,4-dihydropyridine-3,5-dicarboxylate. In other embodiments, the compound of Formula (I) is 3-(2-methoxyethyl) 5-[(2E)-3-(pyridin-4-yl)-2-propen-1-yl]2,6-dimethyl-4-(4-nitrophenyl)-1,4-dihydropyridine-3,5-dicarboxylate.

In another aspect, the invention includes compounds of Formula (1):

[Chem. 21]

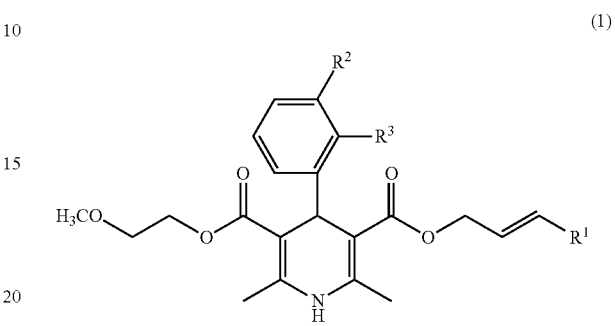

and pharmacologically acceptable salts thereof and solvates of them, where:

$R^1$ represents a phenyl group, 2-pyridyl group, 3-pyridyl group or 4-pyridyl group, $R^2$ represents a hydrogen atom or amino group, $R^3$ represents a hydrogen atom or nitro group, and if $R^2$ is a hydrogen atom then $R^3$ is a nitro group, and, if $R^2$ is an amino group then $R^3$ is a hydrogen atom.

In some embodiments of the compounds of Formula (1), $R^1$ represents a phenyl group, 2-pyridyl group, 3-pyridyl group or 4-pyridyl group, $R^2$ represents a hydrogen atom, and $R^3$ represents a nitro group; or $R^1$ represents a 2-pyridyl group, 3-pyridyl group or 4-pyridyl group, $R^2$ represents an amino group, and $R^3$ represents a hydrogen atom. In some embodiments, $R^1$ represents a phenyl group, 2-pyridyl group, 3-pyridyl group or 4-pyridyl group, $R^2$ represents a hydrogen atom, and $R^3$ represents a nitro group. In other embodiments, $R^1$ represents a 2-pyridyl group, 3-pyridyl group or 4-pyridyl group, $R^2$ represents an amino group, and $R^3$ represents a hydrogen atom. In other embodiments, $R^1$ represents a phenyl group, 2-pyridyl group, 3-pyridyl group or 4-pyridyl group, $R^2$ represents an amino group, and $R^3$ represents a hydrogen atom.

In another aspect, the present invention provides a compound represented by formula (2) below or a pharmacologically acceptable salt thereof or a solvate of them.

[Chem. 22]

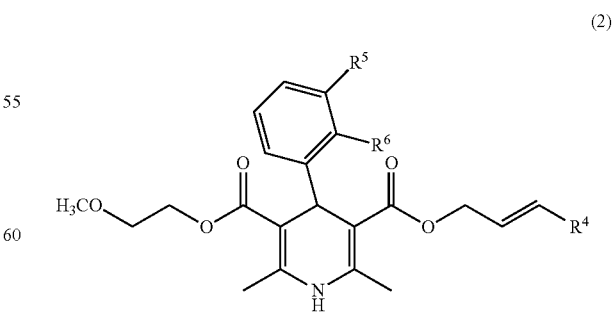

[in formula (2), $R^4$ represents a phenyl group, 2-pyridyl group, 3-pyridyl group or 4-pyridyl group, $R^5$ represents an amino group, and $R^6$ represents a hydrogen atom].

The compound represented by formula (2) above is a novel compound. Specific examples of the compound represented by formula (2) above include a compound represented by chemical formula (5) below (referred to as "NS4-700", hereinafter), and a compound represented by chemical formula (6) below (referred to as "NS4-238", hereinafter).

[Chem. 23]

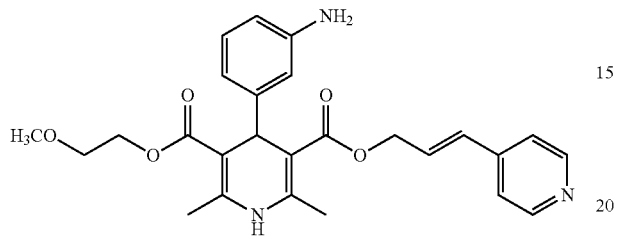

(5)

[Chem. 24]

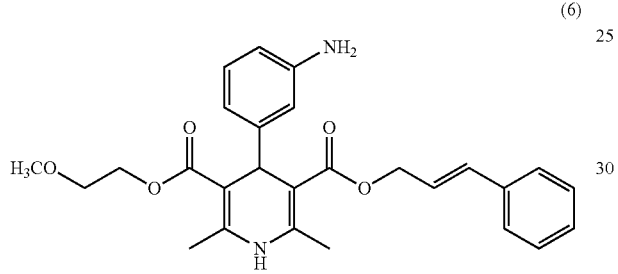

(6)

NS4-700 exhibits suppressive ability over mitochondrial division, to a high degree comparative to that of NS4-238, but does not block the calcium channel. NS4-238 exhibits suppressive ability over mitochondrial division, which is approximately three times stronger than that of cilnidipine, and blocks the calcium channel to a comparable degree with cilnidipine.

In another aspect, the invention includes compounds of Formula (A):

[Chem. 25]

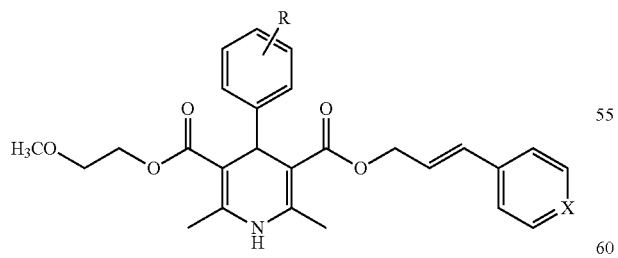

(A)

and pharmacologically acceptable salts thereof and solvates of them, where:

R is $NO_2$ or $NH_2$, wherein R is at the 2-position, 3-position, or 4-position of the phenyl ring; and X is CH or N, provided the compound is other than

[Chem. 26]

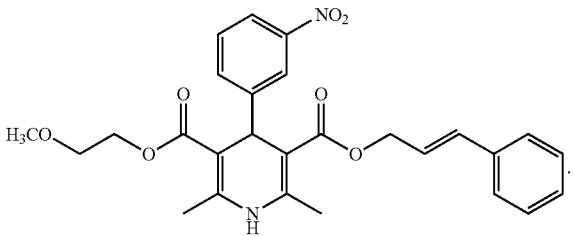

In another aspect, the invention includes compounds of Formula (B):

[Chem.27]

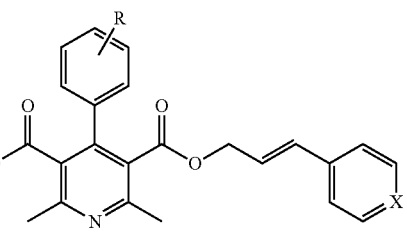

(B)

and pharmacologically acceptable salts thereof and solvates of them, where:

R is $NO_2$ or $NH_2$, wherein R is at the 2-position, 3-position, or 4-position of the phenyl ring; and X represents CH or N.

(Drp1-Filamin Complex Formation Inhibitor)

In one aspect, the invention includes dynamin-related protein 1 (Drp1)-filamin complex formation inhibitors that contain, as an active ingredient, a compound of Formula (I) or a pharmacologically acceptable salt thereof or solvate of them, a compound of Formula (1) or a pharmacologically acceptable salt thereof or solvate of them, a compound of Formula (2) or a pharmacologically acceptable salt thereof or solvate of them, a compound of Formula (A) or a pharmacologically acceptable salt thereof or solvate of them, or a compound of Formula (B) or a pharmacologically acceptable salt thereof or solvate of them.

In one embodiment, the present invention provides a dynamin-related protein 1 (Drp1)-filamin complex formation inhibitor that contains, as an active ingredient, a compound represented by formula (1) below or a pharmacologically acceptable salt thereof or a solvate of them.

[Chem.28]

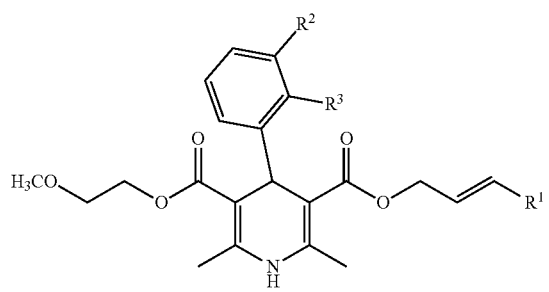

(1)

[in formula (1), $R^1$ represents a phenyl group, 2-pyridyl group, 3-pyridyl group or 4-pyridyl group, $R^2$ represents a hydrogen atom or amino group, $R^3$ represents a hydrogen atom or nitro group, wherein if $R^2$ is a hydrogen atom then $R^3$ is a nitro group, and, if $R^2$ is an amino group then $R^3$ is a hydrogen atom].

The compound represented by formula (1) above is a derivative of cilnidipine represented by chemical formula (A1) above. As described later in Examples, the present inventors clarified that the compound represented by formula (1) can inhibit formation of the Drp1-filamin complex. Inhibition of formation of the Drp1-filamin complex can suppress mitochondrial division.

The Drp1-filamin complex formation inhibitor of this embodiment may also be understood as the compound represented by formula (1) above, or a pharmacologically acceptable salt thereof, or a solvate of them.

Human Drp1 protein is assigned NCBI accession numbers NP_036193.2, NP_036192.2, NP_001265395.1 and so forth. Murine Drp1 protein is assigned NCBI accession numbers NP_001021118.1, NP_001263269.1, NP_001263270.1 and so forth.

Filamin is exemplified by filamin A, filamin B, filamin C and so forth. Human filamin A protein is assigned NCBI accession number NP_001104026.1, NP_001447.2 and so forth. Murine filamin A protein is assigned NCBI accession numbers NP_001277350.1, NP_034357.2 and so forth.

Human Filamin B protein is assigned NCBI accession numbers NP_001157789.1, NP_001157790.1, NP_001157791.1 and so forth. Murine Filamin B protein is assigned NCBI accession numbers NP_001074896.1, NP_598841.1 and so forth.

Human Filamin C protein is assigned NCBI accession numbers NP_001120959.1, NP_001449.3 and so forth. Murine Filamin C protein is assigned NCBI accession numbers NP_001074654.1, NP_001298003.1 and so forth.

In this patent specification, the notation " . . . contains, as an active ingredient, . . . "means" . . . contains, as a principal active ingredient, . . . ". The Drp1-filamin complex formation inhibitor of the invention contains a compound represented by (a) Formula (I) or a pharmacologically acceptable salt thereof or a solvate of them, (b) formula (1) or a pharmacologically acceptable salt thereof or a solvate of them, (c) Formula (2) or a pharmacologically acceptable salt thereof or a solvate of them, (d) Formula (A) or a pharmacologically acceptable salt thereof or a solvate of them, or (e) Formula (E) or a pharmacologically acceptable salt thereof or a solvate of them, the content of which is however not specifically limited. In some embodiments, the Drp1-filamin complex formation inhibitor of the invention contains a compound represented by formula (1) or a pharmacologically acceptable salt thereof or a solvate of them.

(Pharmacologically Acceptable Salts and Solvates)

The compound represented by Formula (I), formula (1), Formula (2), Formula (A), or Formula (B) may be a free species, may be a pharmacologically acceptable salt of the compound represented by Formula (I), formula (1), Formula (2), Formula (A), or Formula (B), may be a solvate of the compound represented by Formula (I), formula (1), Formula (2), Formula (A), or Formula (B), or may be a solvate of a pharmacologically acceptable salt of the compound represented by Formula (I), formula (1), Formula (2), Formula (A), or Formula (B). In some embodiments, the compound is in the form of a solvate, more particularly a hydrate. In other embodiments, the compound is not in the form of a solvate.

The pharmacologically acceptable salt is exemplified by hydrochlorate, sulfate, hydrobromate, hydroiodide, phosphate, nitrate, benzoate, methanesulfonate, 2-hydroxyethanesulfonate, p-toluenesulfonate, acetate, propanoate, oxalate, malonate, succinate, glutarate, adipate, tartarate, maleate, fumarate, malate, and mandelate.

The solvate is not specifically limited so long as it is a pharmaceutically acceptable solvate, and is exemplified by hydrate and organic solvates. In some embodiments, the solvate is a hydrate.

In certain aspects, the invention provides compounds of the invention, e.g., compounds as described above, that have advantageous properties as compared to cilnidipine. In some aspects, the compounds have a similar ability to cilnidipine to inhibit mitochondrial division but reduced ability to block calcium channels as compared to cilnidipine. For example, a compound of the invention can have at least 50% of the mitochondrial division inhibitory activity of cilnidipine, at least 75% of the of the mitochondrial division inhibitory activity of cilnidipine, at least 90% of the mitochondrial division inhibitory activity of cilnidipine, or at least equal mitochondrial division inhibitory activity to the mitochondrial division inhibitory activity of cilnidipine. Mitochondrial division inhibitory activity can be determined as described herein, e.g., by the evaluation system of Exemplary Experiment 1.

In other aspects, the compounds of the invention have enhanced ability as compared to cilnidipine to inhibit mitochondrial division, with or without a reduced ability to block calcium channels. For example, a compound of the invention can have (a) at least 100%, at least 125% or at least 150% (and optionally up to 200%, up to 300% or up to more than 300%) of the mitochondrial division inhibitory activity of cilnidipine and, optionally (b) calcium channel blocking activity no greater than 75%, no greater than 50%, no greater than 25% or no greater than 10% of the calcium channel blocking activity of cilnidipine. Mitochondrial division inhibitory activity can be determined as described herein, e.g., by the evaluation system of Exemplary Experiment 1 and calcium channel blocking activity can be determined as described herein, e.g., by the evaluation system of Exemplary Experiment 12.

(Exemplary Drp1-Filamin Complex Formation Inhibitor Embodiments)

First Embodiment

Regarding the Drp1-filamin complex formation inhibitor of a first embodiment, a compound represented by formula (1) may be such that $R^1$ represents a phenyl group, 2-pyridyl group, 3-pyridyl group or 4-pyridyl group, $R^2$ represents a hydrogen atom, and $R^3$ represents a nitro group. Alternatively, regarding the Drp1-filamin complex formation inhibitor of the first embodiment, a compound represented by formula (1) may be such that $R^1$ represents a 2-pyridyl group, 3-pyridyl group or 4-pyridyl group, $R^2$ represents an amino group, and $R^3$ represents a hydrogen atom.

As described later in Examples, the present inventors clarified that the cilnidipine derivative of the first embodiment has the Drp1-filamin complex formation inhibitor. The present inventors also clarified that the cilnidipine derivative of the first embodiment does not act to block the calcium channel, unlike cilnidipine that blocks the calcium channel. That is, the cilnidipine derivative of the first embodiment does not exhibit hypotensive effect.

As described later in Examples, the present inventors clarified that cilnidipine exhibits therapeutic effects on intractable diseases such as amyotrophic lateral sclerosis (ALS), inflammatory bowel disease, and diabetes, e.g., type 1/2 diabetes.

Administration of cilnidipine is, however, difficult for non-hypertensive patients, due to its hypotensive effect. In contrast, the cilnidipine derivative of the first embodiment, having no hypotensive effect, can be administered also to the non-hypertensive patients.

Specific examples of the cilnidipine derivative of the first embodiment include a compound represented by chemical formula (3) below (referred to as "NS4-019", hereinafter), a compound represented by chemical formula (4) below (referred to as "NS4-043", hereinafter), and a compound represented by chemical formula (5) below (referred to as "NS4-700", hereinafter).

[Chem.29]

(3)

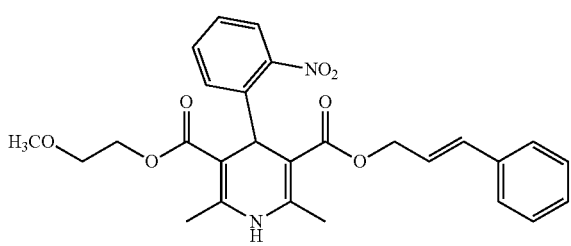

[Chem.30]

(4)

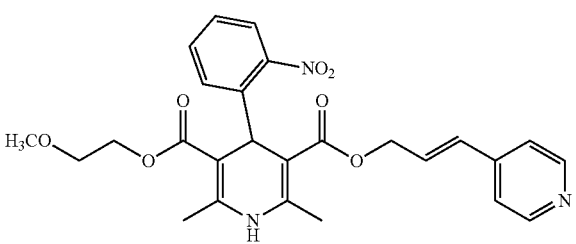

[Chem.31]

(5)

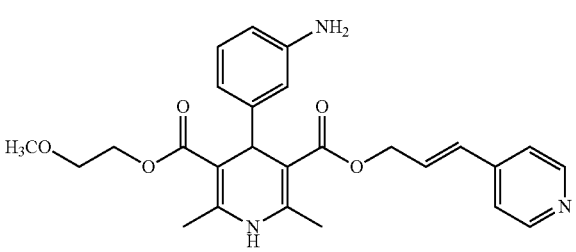

As described later in Examples, NS4-019 and NS4-043 exhibit suppressive ability over mitochondrial division, to a degree equivalent to that of cilnidipine. NS4-700 exhibits suppressive ability over mitochondrial division, to a high degree comparable to that of NS4-238 described later.

Second Embodiment

Regarding the Drp1-filamin complex formation inhibitor of the second embodiment, a compound represented by formula (1) may be such that $R^1$ represents a phenyl group, 2-pyridyl group, 3-pyridyl group or 4-pyridyl group, $R^2$ represents an amino group, and $R^3$ represents a hydrogen atom.

As described later in Examples, the present inventors clarified that the cilnidipine derivative of the second embodiment exhibits suppressive ability over mitochondrial division, approximately three times stronger than that of cilnidipine.

Specific examples of the cilnidipine derivative of the second embodiment include a compound represented by chemical formula (5) below (referred to as "NS4-700", hereinafter), and a compound represented by chemical formula (6) below (referred to as "NS4-238", hereinafter).

[Chem.32]

(5)

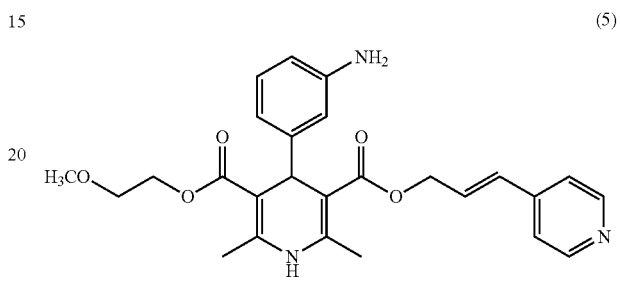

[Chem.33]

(6)

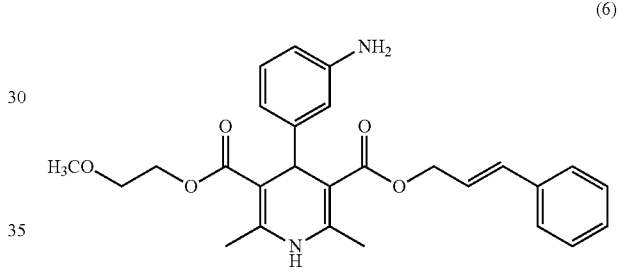

As described later in Examples, NS4-700 exhibits suppressive ability over mitochondrial division, to a high degree comparative to that of NS4-238, but does not block the calcium channel. Again as described later in Examples, NS4-238 exhibits suppressive ability over mitochondrial division, which is approximately three times stronger than that of cilnidipine, and blocks the calcium channel to a comparable degree with cilnidipine.

(Prophylactic or Therapeutic Agent)

The present invention provides, in one embodiment, a prophylactic agent or therapeutic agent for diseases caused by Drp1 dysfunction, containing any of the aforementioned compounds and Drp1-filamin complex formation inhibitors of the invention as an active ingredient. The diseases caused by Drp1 dysfunction are exemplified by chronic heart failure, amyotrophic lateral sclerosis (ALS), inflammatory bowel disease, and diabetes, e.g., type 1/2 diabetes.

Regarding the prophylactic or therapeutic agent of this embodiment, the aforementioned compound or Drp1-filamin complex formation inhibitor is preferably mixed with a pharmaceutically acceptable carrier, to be formulated as a pharmaceutical composition. The pharmaceutical composition may have an oral dosage form or non-oral dosage form. The oral dosage form is exemplified by tablet, pill, capsule, elixir, and microcapsule. The non-oral dosage form is exemplified by injection, inhalant, suppository, and patch.

The pharmaceutically acceptable carrier is exemplified by bases such as purified water, titanium oxide, carnauba wax, synthetic squalane, crotamiton, and gelatin; binders such as ethyl cellulose, glycerin and methacrylic acid copolymer S; excipients such as crystalline cellulose, croscarmellose sodium, magnesium stearate, and hypromellose; stabilizers such as gum arabic, magnesium aluminometasilicate, povidone, benzyl alcohol, sodium acetate, and magnesium stearate; plasticizers such as Macrogol 400 and Macrogol 6000; and solubilizers such as benzyl benzoate and benzyl alcohol.

The pharmaceutical composition may further contain an additive. The additive is exemplified by sweeteners such as sucrose, lactose, and saccharin; flavors such as peppermint and 1-menthol; and preservatives such as benzoic acid, salicylic acid, thimerosal, and phenol.

The pharmaceutical composition may be formulated by suitably combining the aforementioned carrier and additive, and by mixing them according to any of unit dosage form required by generally accepted pharmaceutical practice.

The pharmaceutical composition may be characterized by the purity of the compound of the invention. For example, in certain aspects, the pharmaceutical composition does not include an active pharmaceutical ingredient other than the compound of the invention, and in a particular embodiment the pharmaceutical composition does not substantially include cilnidipine. As used herein, the term "does not substantially include cilnidipine" refers to a detectable amount of cilnidipine, a therapeutically effective amount of cilnidipine, and/or any amount of cilnidipine. In further aspects, the compound of the invention in the pharmaceutical composition is at least 90% pure (for example is at least 95% pure, 98% pure or 99% pure). The percentage of purity refers to the purity of the active pharmaceutical ingredient in a pharmaceutical composition exclusive of carriers, e.g., excipients.

The pharmaceutical composition containing a compound of the invention is preferably in a dosage form containing (a) at least 1 mg of the compound of the invention, at least 2 mg of the compound of the invention, at least 5 mg of the compound of the invention, at least 10 mg of the compound of the invention and/or (b) up to 20 mg of the compound of the invention, up to 25 mg of the compound of the invention, or up to 50 mg of the compound of the invention.

Administration to patients may be implemented typically by intraarterial injection, intravenous injection, subcutaneous injection, as well as any method known to those skilled in the art, such as intranasal, transbronchial, intramuscular, transdermal, or oral method. Dosage may vary depending on weight, age and symptom of patient, and on method of administration. Proper dosage may be selected suitably by those skilled in the art.

Although dosage of the Drp1-filamin complex formation inhibitor may vary depending on type of the Drp1-filamin complex formation inhibitor and symptom of patient, oral dose for an adult (assumed to weigh 60 kg) is normally considered to be approximately 1 to 30 mg per day, which is administered once a day, or several times a day.

Although non-oral dose may vary depending on type of the Drp1-filamin complex formation inhibitor, symptom of patient, target organ, administration method and so forth, systemic administration for an adult (assumed to weigh 60 kg) is normally considered to be approximately 0.1 to 10 mg per day, which is administered once a day, or several times a day. Meanwhile, local administration for an adult (assumed to weigh 60 kg) is normally considered to be approximately 0.1 to 10 mg per day, which is administered once a day, or several times a day.

Other Embodiments

In one embodiment, the present invention provides a prophylactic or therapeutic method for disease caused by Drp1 dysfunction, comprising administering an effective dose of the Drp1-filamin complex formation inhibitor to a patient in need of therapy.

In one embodiment, the present invention provides the Drp1-filamin complex formation inhibitor for prophylactic or therapy for disease caused by Drp1 dysfunction.

In one embodiment, the present invention provides a usage of the Drp1-filamin complex formation inhibitor for manufacturing a prophylactic or therapeutic agent for disease caused by Drp1 dysfunction.

In all of these embodiments, the Drp1-filamin complex formation inhibitor is same as any of those described previously. Also the diseases caused by Drp1 dysfunction are same as those described previously.

Synthetic Schemes

The following synthetic schemes can be used to prepare compounds of the invention. In Schemes A to D, R1a, R1b, R1c, R2, R3, R4, and R5 are as defined herein for compounds of Formula (I).

Scheme A

[Chem. 34]

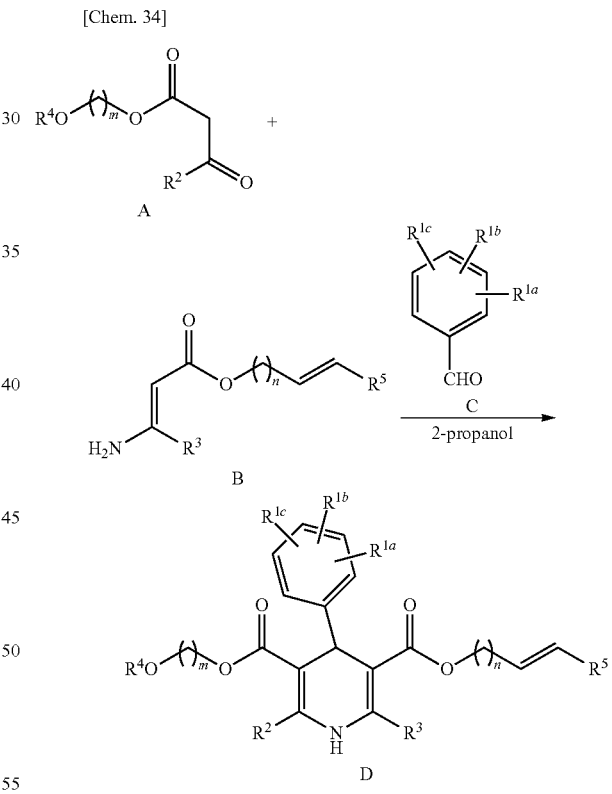

In Scheme A, one equivalent of compound A, one equivalent of compound B, and one equivalent of compound C, with protecting groups on $R^{1a}$, $R^{1b}$, $R^{1c}$, $R^2$, $R^3$, $R^4$, and $R^5$ as needed, can be combined in 2-propanol and stirred at approximately 70° C. for a period of time (e.g., 24 to 72 hours) to provide compound D. Suitable protecting groups are known and readily selected by those of skill in the art (see, e.g., Wuts and Greene, 2007, Greene's Protective Groups in Organic Synthesis, Fourth Edition, John Wiley & Sons, Inc.; Kocienski, 2005, Protecting Groups, Third Edition, Thieme). For example, an amine group can be protected with a tert-butyloxycarbonyl (Boc) protecting group. Compound D can be purified, for example, by flash column chromatography on silica gel. Protecting groups on $R^{1a}$, $R^{1b}$, $R^{1c}$, $R^2$, $R^3$, $R^4$, and $R^5$, when present, can be removed by standard means before or after a purification step. For example, a Boc protected amine can be deprotected by acid hydrolysis (e.g., treating the protected amine in dichloromethane with trifluoroacetic acid).

Scheme B

[Chem. 35]

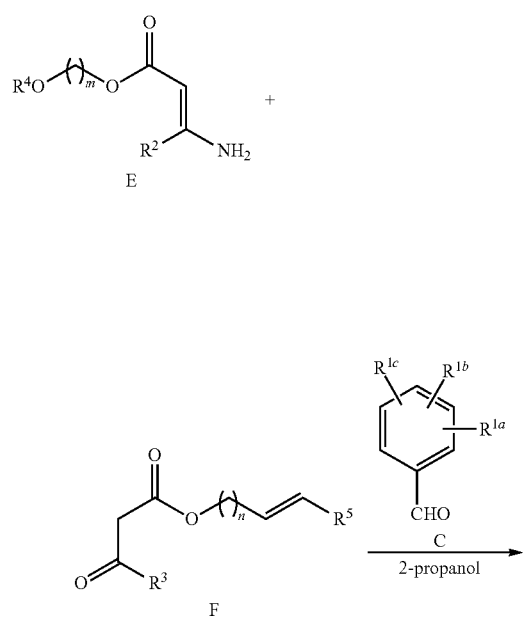

In Scheme B, one equivalent of compound E, one equivalent of compound F, and one equivalent of compound C, with protecting groups on $R^{1a}$, $R^{1b}$, $R^{1c}$, $R^2$, $R^3$, $R^4$, and $R^5$ as needed, can be combined in 2-propanol and stirred at approximately 70° C. for a period of time (e.g., 24 to 72 hours) to provide compound D. Compound D can be purified, for example, by flash column chromatography on silica gel. Protecting groups on $R^{1a}$, $R^{1b}$, $R^{1c}$, $R^2$, $R^3$, $R^4$, and $R^5$, when present, can be removed by standard means before or after a purification step.

Scheme C

[Chem. 36]

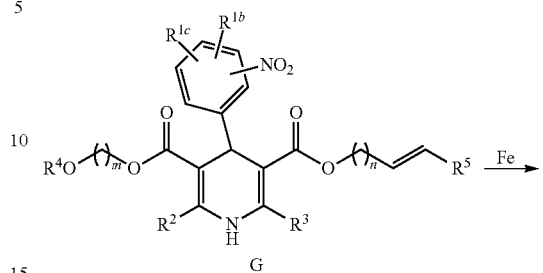

In Scheme C, Compound G (e.g., made according to Scheme A or Scheme B), with protecting groups on $R^{1b}$, $R^{1c}$, $R^2$, $R^3$, $R^4$, and $R^5$ as needed, in glacial acetic acid can be combined with an excess of iron powder (e.g., 55 equivalents per equivalent of compound G) and stirred at approximately 100° C. (e.g., for 15 minutes). Subsequently, the reaction mixture can be diluted with ethyl acetate and filtered through a pad of celite. The filtrate can be sequentially washed with saturated aqueous solution of sodium bicarbonate and brine, dried over magnesium sulfate and concentrated in vacuo. The residue can then be purified, e.g., by flash column chromatography on silica gel, to provide compound H. Protecting groups on $R^{1b}$, $R^{1c}$, $R^2$, $R^3$, $R^4$, and $R^5$, when present, can be removed by standard means before or after a purification step.

Scheme D

[Chem. 37]

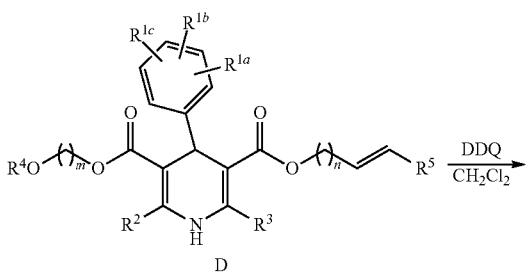

-continued

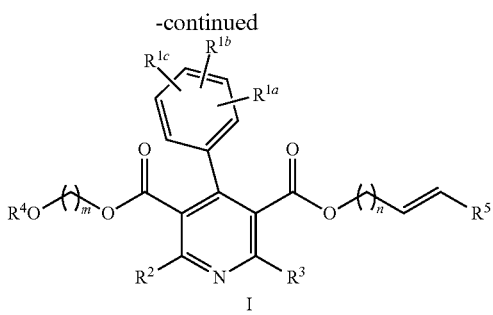

I

In Scheme D, a stirred solution of Compound D (e.g., made according to Scheme A or Scheme B), with protecting groups on $R^{1a}$, $R^{1b}$, $R^{1c}$, $R^2$, $R^3$, $R^4$, and $R^5$ as needed, in dichloromethane can be combined with 2,3-dichloro-5,6-dicyano-1,4-benzoquinone DDQ. After stirring at ambient temperature, e.g., for 2 h, the reaction mixture can purified, e.g., by flash column chromatography on silica gel to provide compound I. Protecting groups on $R^{1a}$, $R^{1b}$, $R^{1c}$, $R^2$, $R^3$, $R^4$, and $R^5$, when present, can be removed by standard means before or after a purification step.

EXAMPLES

The present invention will further be detailed below referring to Examples. The present invention is, however, not limited to Examples below.

Exemplary Experiment 1

<Building of System for Evaluating Degree of Mitochondrial Division>

A system for quantitatively evaluating degree of intracellular mitochondrial division was built. More specifically, myocardial cells obtained from a neonatal rat were cultured under normoxia (20%) or under hypoxia (1%) for 16 hours. The cells were then stained with a fluorescent dye (MitoTracker Green FM, from Thermo Fisher Scientific Inc.) that selectively stains mitochondria. The cells were observed under a fluorescent microscope, and the shape of mitochondria was quantified by image analysis.

FIGS. 1(a) and 1(b) are representative fluorescent microphotographs of mitochondria. FIG. 1(a) is a fluorescent microphotograph of a cell cultured under normoxia, and FIG. 1(b) is a fluorescent microphotograph of a cell cultured under hypoxia.

Figure 2:
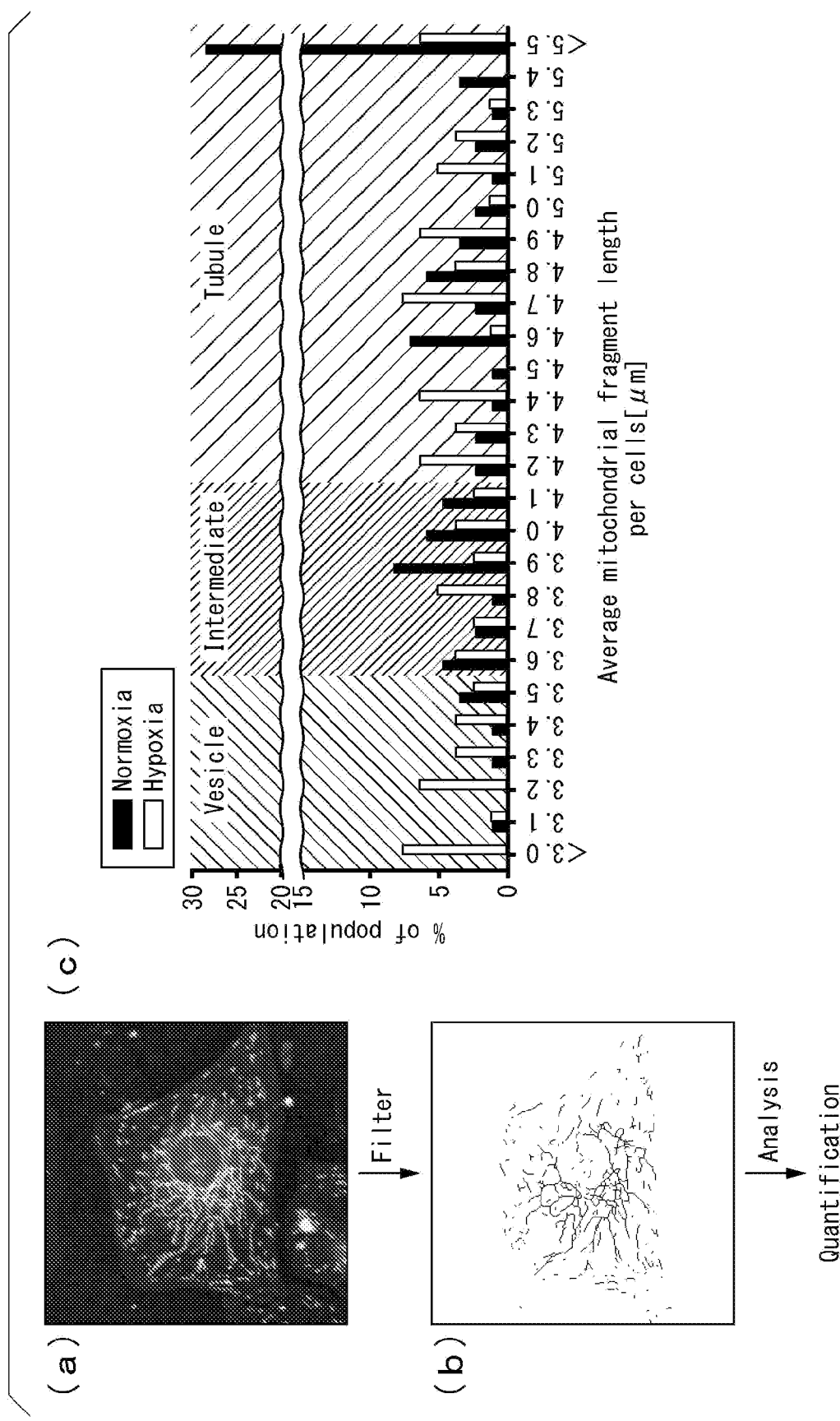
FIG. 2(a) is a representative fluorescent microphotograph of mitochondria.
FIG. 2(b) is an image that illustrates a shape of mitochondria extracted by filtering from the photograph in FIG. 2(a).
FIG. 2(c) is a graph that illustrates length of mitochondria from the myocardial cells of a neonatal rat cultured under normoxia or hypoxia.

FIGS. 2(a) and 2(b) are photographs and images explaining a method for quantifying the shape of mitochondria by image analysis. FIG. 2(a) is a representative fluorescent microphotograph of mitochondria. FIG. 2(b) is an image that illustrates a shape of mitochondria extracted by filtering from the photograph in FIG. 2(a). The image in FIG. 2(b) was analyzed to quantify the shape of mitochondria.

Figure 3:
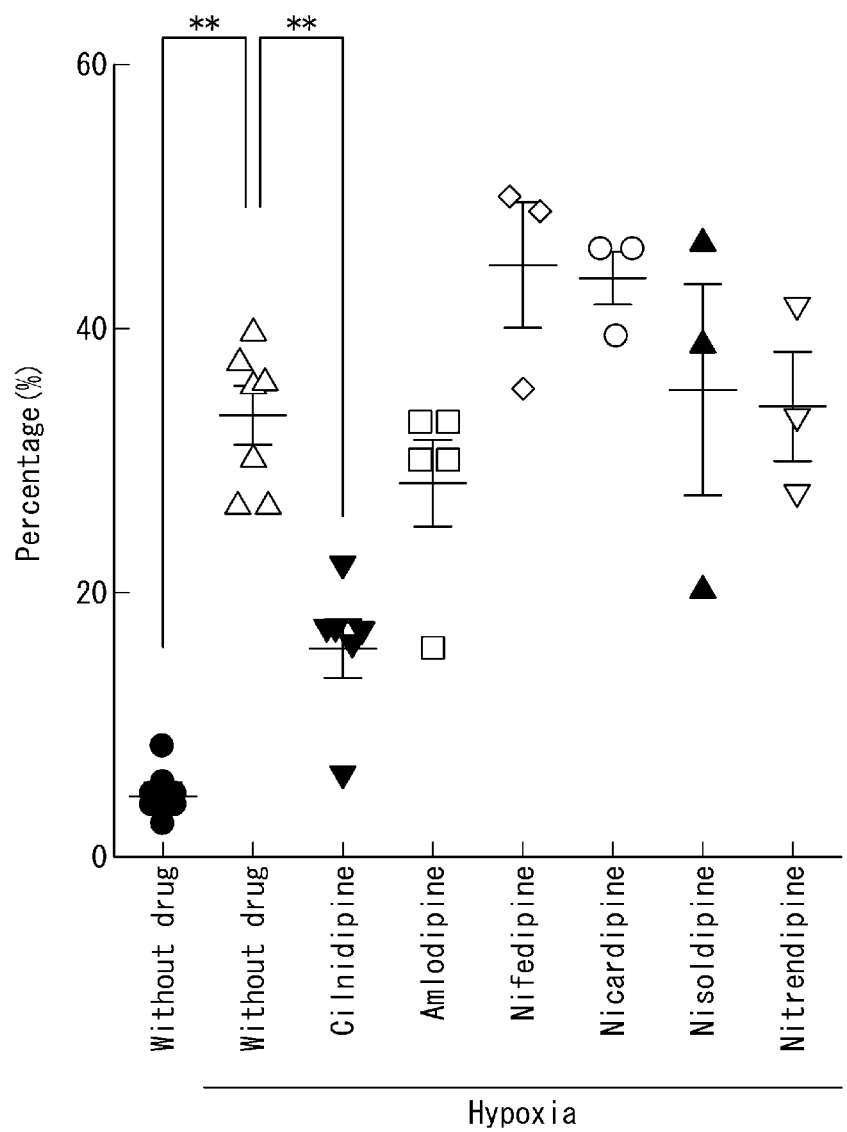
FIG. 3 is a graph that illustrates results of a measurement of percentage of cells having vesicular mitochondria in Exemplary Experiment 2.

FIG. 2(c) is a graph that illustrates length of mitochondria from the myocardial cells of a neonatal rat cultured under normoxia or hypoxia. In FIG. 2(c), "Normoxia" represents results obtained from culture under the normal oxygen concentration, and "Hypoxia" represents results obtained from culture under the low oxygen concentration. As illustrated in FIG. 2(c), 3.5 μm or smaller mitochondria were classified into Vesicle, 4.2 μm or larger mitochondria were classified into Tubule, and mitochondria having a size of 3.6 μm or larger but smaller than 4.2 μm were classified into Intermediate.

The results clarified that the myocardial cells from the neonatal rat, cultured under normoxia, produced large percentages of tubular mitochondria, meanwhile the myocardial cells from the neonatal rat, cultured under hypoxia (1%), caused mitochondrial division, and produced large percentages of vesicular mitochondria. It was also confirmed that the method of this Exemplary Experiment can quantitatively evaluate the shape of mitochondria.

Exemplary Experiment 2

<Screening of Existing Drugs>

Compounds capable of suppressing mitochondrial division under the hypoxic environment were screened from existing drugs, using the evaluation system built in Exemplary Experiment 1. The existing drugs examined here include cilnidipine represented by chemical formula (A1) below, amlodipine represented by chemical formula (A2) below, nifedipine represented by chemical formula (A3) below, nicardipine represented by chemical formula (A4) below, nisoldipine represented by chemical formula (A5) below, and nitrendipine represented by chemical formula (A6) below.

[Chem.38]

(A1)

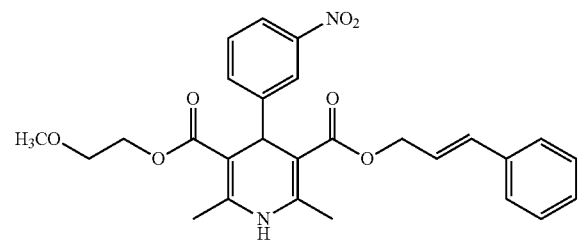

[Chem.39]

(A2)

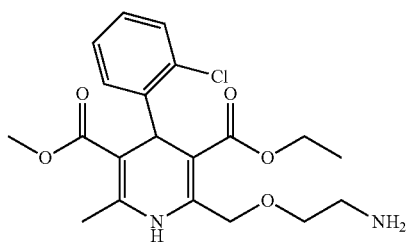

[Chem.40]

(A3)

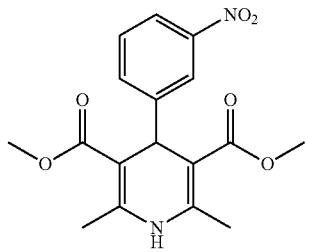

[Chem.41]

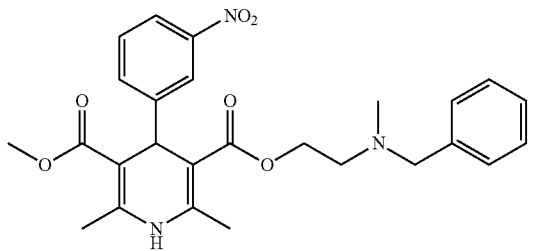

(A4)

[Chem.42]

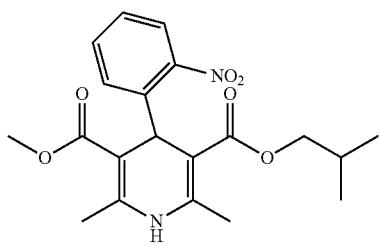

(A5)

[Chem.43]

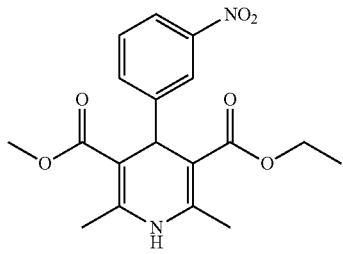

(A6)

Each of the aforementioned compounds was added to a culture medium of the myocardial cells from the neonatal rat, so as to adjust the final concentration to 1 μM, the cells were incubated for one hour, and further cultured under hypoxic environment for 16 hours. The cells were then stained in the same way as described in Exemplary Experiment 1 using MitoTracker Green FM (from Thermo Fischer Scientific Inc.), observed under a fluorescent microscope, and the shape of mitochondria was quantified. Also a group having dimethylsulfoxide (DMSO) added thereto in place of the drugs was prepared for comparison.

FIG. 3 is a graph that illustrates results of a measurement of percentage of cells having vesicular mitochondria. The results clarified that cilnidipine can significantly suppress mitochondrial division under hypoxic stimulation.

Exemplary Experiment 3

<Improvement of Amyotrophic Lateral Sclerosis by Cilnidipine Dosage>

Effects of cilnidipine on intractable disease were examined. In this Exemplary Experiment, cilnidipine was administered to model mice of amyotrophic lateral sclerosis (ALS), and survival rate was examined. The ALS model mice employed were SOD1-G93A mice.

Figure 4:
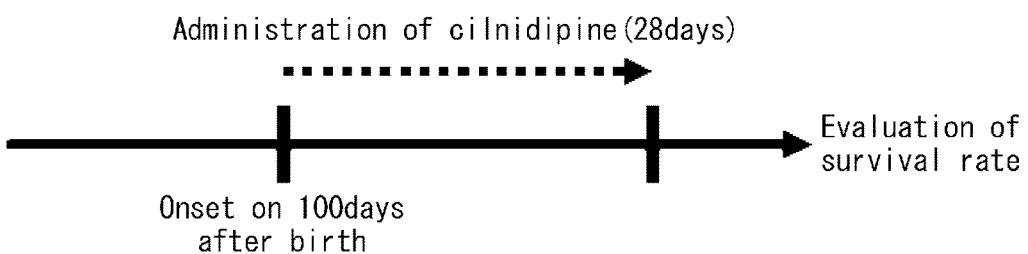
FIG. 4(a) is a drawing that illustrates an experiment schedule of Exemplary Experiment 3.
FIG. 4(b) is a graph that illustrates results of measurement of survival rate in Exemplary Experiment 3.
Figure 4:
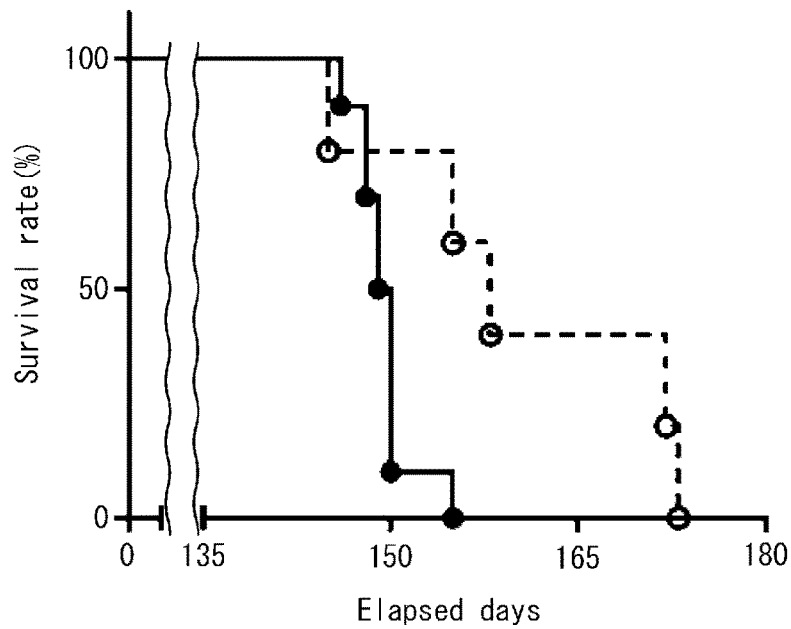

FIG. 4(a) is a drawing that illustrates an experiment schedule. An osmotic pump containing 5,000 μg/kg of cilnidipine was intraperitoneally implanted into each model mouse after onset of ALS, the drug was administered continuously over 28 days, and the survival rate was measured.

FIG. 4(b) is a graph that illustrates results of measurement of survival rate. In FIG. 4(b), "SOD1-G93A" represents results obtained from the ALS model mice, and "SOD1-G93A+CIL" represents results obtained from the ALS model mice after cilnidipine administration. The results clarified that the mice in the cilnidipine-administered group showed significant elongation of lifetime, as compared with the non-cilnidipine-administered group. The results suggest a therapeutic effect of cilnidipine against ALS.

Exemplary Experiment 4

<Improvement of Inflammatory Bowel Disease by Cilnidipine Administration>

Effects of cilnidipine on intractable disease were examined. In this Exemplary Experiment, cilnidipine was administered to model mice of inflammatory bowel disease, and survival rate was examined. The model mice of inflammatory bowel disease employed were mice on which inflammatory bowel disease is inducible by administrating dextran sulfate (DSS).

Figure 5:
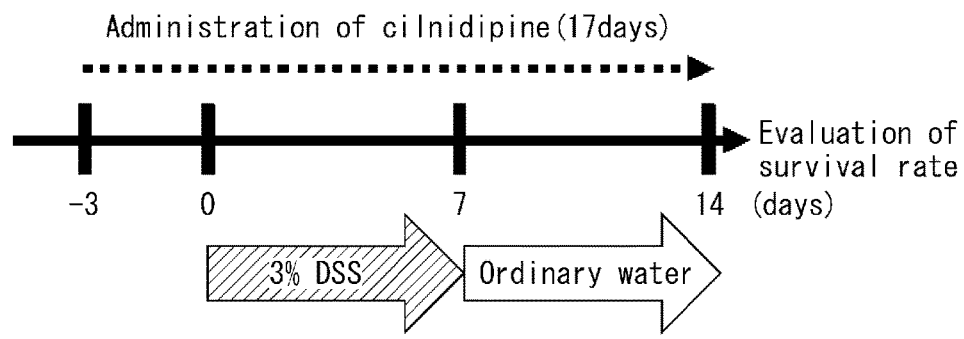
FIG. 5(a) is a drawing that illustrates an experiment schedule of Exemplary Experiment 4.
FIG. 5(b) is a graph that illustrates results of measurement of survival rate in Exemplary Experiment 4.
Figure 5:
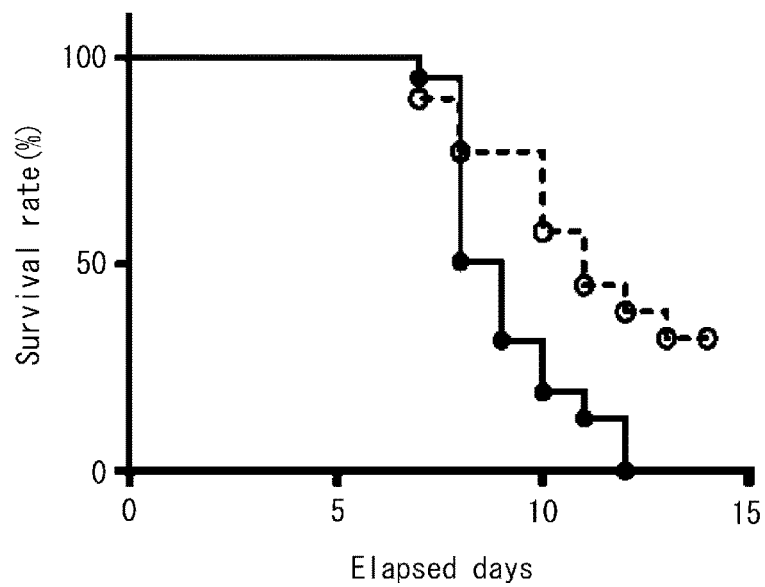

FIG. 5(a) is a drawing that illustrates an experiment schedule. From three days before the administrating DSS started, an osmotic pump containing 25,000 μg/kg of cilnidipine was intraperitoneally implanted into each mouse, the drug was administered continuously over 17 days, and the survival rate was measured.

From the first day (Day 0) the cilnidipine administration started, the mice were fed tap water containing 3% DSS as a drinking water for seven days. Over a period between Day 7 after the start of cilnidipine administration to Day 14, the drinking water was reverted to ordinary tap water. Also a control group was prepared, in which the mice were fed a solvent only in place of cilnidipine.

FIG. 5(b) is a graph that illustrates results of measurement of survival rate. In FIG. 5(b), "3% DSS Veh" represents results obtained from the model mice of inflammatory bowel disease administered the solvent only, and "3% DSS CIL" represents results obtained from the model mice of inflammatory bowel disease administered cilnidipine.

The results clarified that the mice in the cilnidipine-administered group showed significant increase of the survival rate as compared with the mice in the non-cilnidipine-administered group. The results suggest a prophylactic or therapeutic effect of cilnidipine against inflammatory bowel disease.

Exemplary Experiment 5

<First Improvement of Diabetes by Cilnidipine Administration>

Effects of cilnidipine on intractable disease were examined. In this Exemplary Experiment, cilnidipine was administered to model mice of type 1/2 diabetes, and the blood sugar level was measured over time. The model mice of type 1/2 diabetes employed were mice intraperitoneally administered 200 mg/kg of streptozotocin (STZ) on the 42nd day after birth. Also mouse without streptozotocin administration were prepared for comparison.

Blood sugar levels of mice in the individual groups were measured over time after the start of experiment. On the 14th day after the start of experiment, an osmotic pump containing 5,000 μg/kg of cilnidipine or the solvent only was implanted into each mouse in each group, for prolonged administration.

Figure 6:
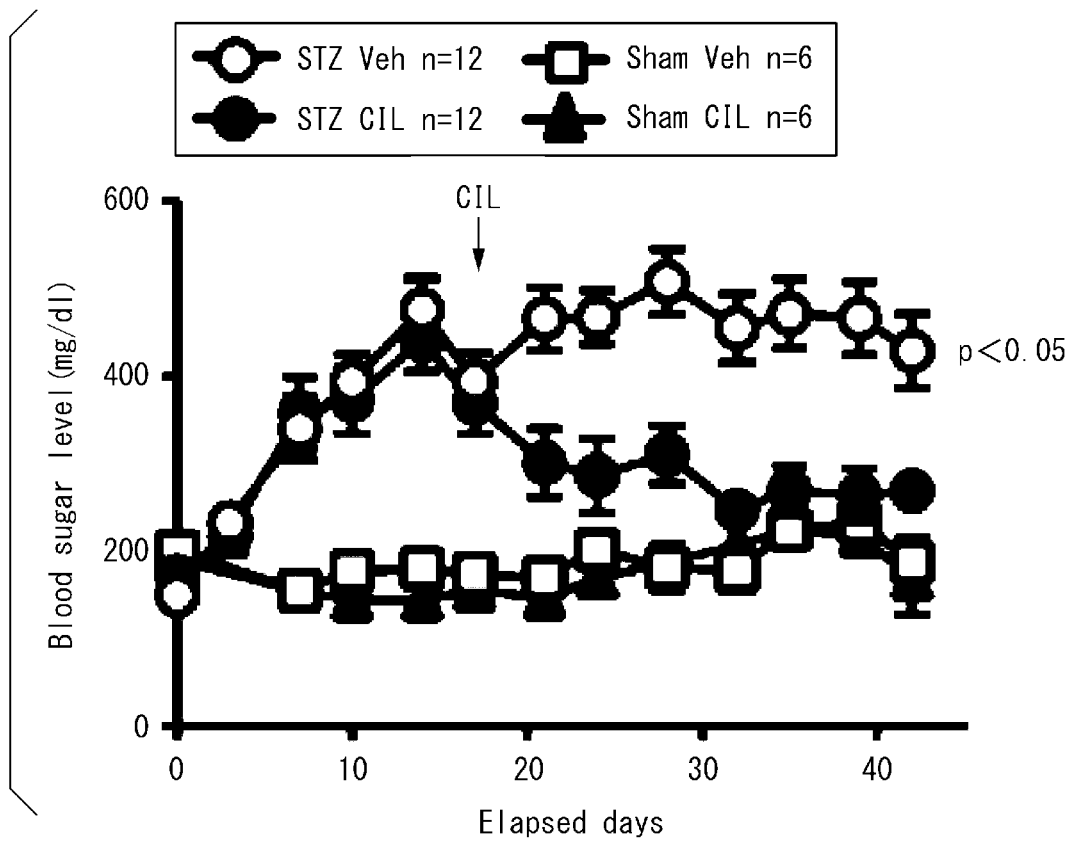
FIG. 6 is a graph that illustrates temporal changes in blood sugar level of mice in the individual groups in Exemplary Experiment 5.

FIG. 6 is a graph that illustrates temporal changes in blood sugar level of mice in the individual groups. In FIG. 6, "STZ Veh" represents results obtained from the model mice of type 1/2 diabetes administered solvent only, "STZ CIL" represents results obtained from the model mice of type 1/2 diabetes administered cilnidipine, "Sham Veh" represents results obtained from the control mice administered solvent only, and "Sham CIL" represents results obtained from the control mice administered cilnidipine.

The results clarified that the model mice of type 1/2 diabetes showed the blood sugar level getting closer to the normal level after the cilnidipine administration. The results suggest a therapeutic effect of cilnidipine against type 1/2 diabetes.

Exemplary Experiment 6

<Second Improvement of Type 2 Diabetes by Cilnidipine Administration>

Effects of cilnidipine on intractable disease were examined. The results shown in this Exemplary Experiment were obtained from retrospective analyses on patients in Kyushu University Hospital. In this Exemplary Experiment, percentages of blood HbA1c in hypertensive and hyperglycemic patients administered amlodipine, and in hypertensive and hyperglycemic patients administered cilnidipine, were evaluated.

Figure 7:
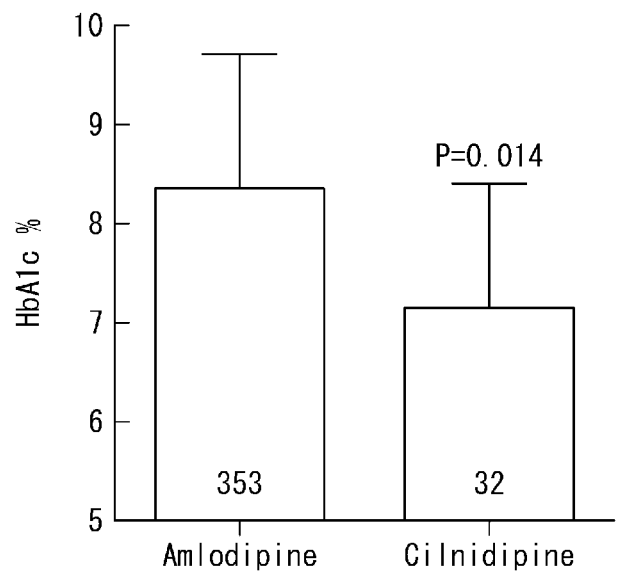
FIG. 7 is a graph that illustrates analytical results of Exemplary Experiment 6.

FIG. 7 is a graph that illustrates analytical results. In FIG. 7, "Amlodipine" represents analytical results of the patients administered amlodipine, and "Cilnidipine" represents analytical results of the patients administered cilnidipine. Numerals in the graph represent the number of patients.

The results clarified that the patients administered cilnidipine showed significant decrease of HbA1c, as compared with the patients administered amlodipine. The results suggest a therapeutic effect of cilnidipine against type 2 diabetes.

Exemplary Experiment 7

<Synthesis of Cilnidipine Derivatives>
Cilnidipine derivatives were synthesized.

Synthesis of NS4-019

A compound represented by chemical formula (3) below (referred to as "NS4-019", hereinafter) was synthesized according to Scheme I below.

Scheme I

[Chem. 44]

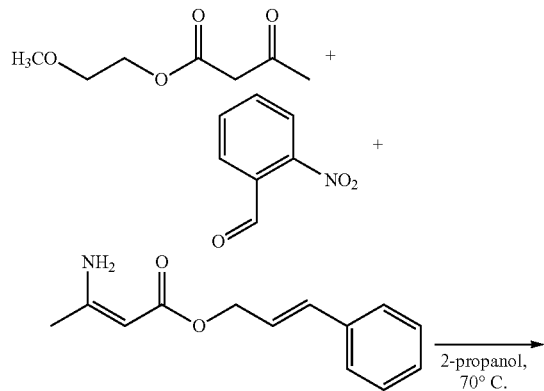

-continued

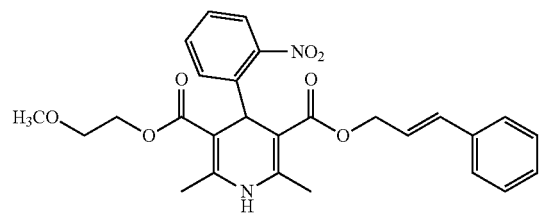

[Chem. 45]

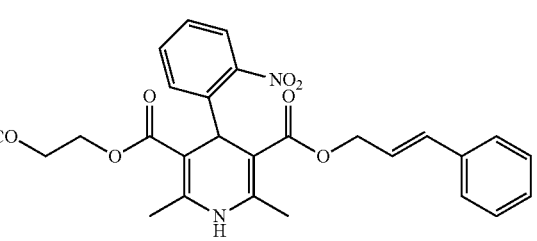

(3)

More specifically, 2-methoxyethyl acetoacetate (164 mg, 1.02 mmol), 2-nitrobenzaldehyde (153 mg, 1.01 mmol) and cinnamyl 3-aminocrotonate (220 mg, 1.01 mmol) were dissolved in 2-propanol (10 mL), and the mixture was stirred at 70° C. for 72 hours. The solvent was then evaporated off, and the residue was purified by silica gel column chromatography (hexane:ethyl acetate graded from 2:1 to 3:2), to obtain NS4-019 (283 mg, 57% yield) as a yellow viscous oil.

1H NMR (500 MHz, CDCl3): 7.70 (dd, J=8.0, 1.0 Hz, 1H), 7.53 (dd, J=8.0, 1.0 Hz, 1H), 7.45 (td, J=8.0, 1.0 Hz, 1H), 7.34-7.20 (m, 6H), 6.45 (d, J=16.0 Hz, 1H), 6.19 (dt, J=16.0, 6.5 Hz, 1H), 5.89 (s, 1H), 5.75 (s, 1H), 4.69 (ddd, J=13.0, 6.5, 1.0 Hz, 1H), 4.63 (ddd, J=13.0, 6.5, 1.0 Hz, 1H), 4.27-4.21 (m, 1H), 4.08-4.02 (m, 1H), 3.59-3.47 (m, 2H), 3.26 (s, 3H), 2.33 (s, 3H), 2.32 (s, 3H). ESI-MS m/z: 515.2 [M+Na]+.

Synthesis of NS4-021

A compound represented by chemical formula (7) below (referred to as "NS4-021", hereinafter) was synthesized according to Scheme II below.

Scheme II

[Chem. 46]

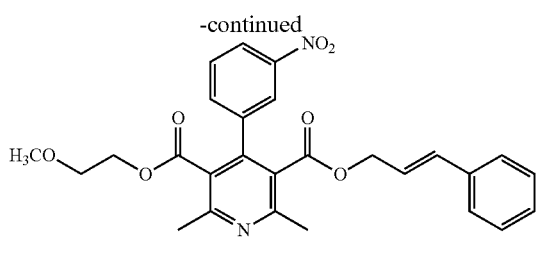

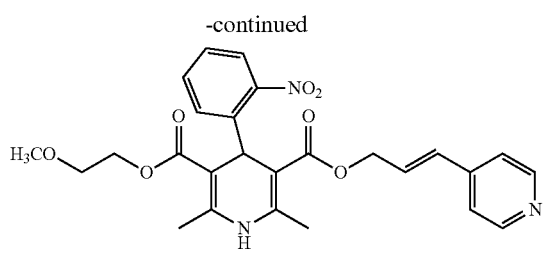

[Chem.47]

(7)

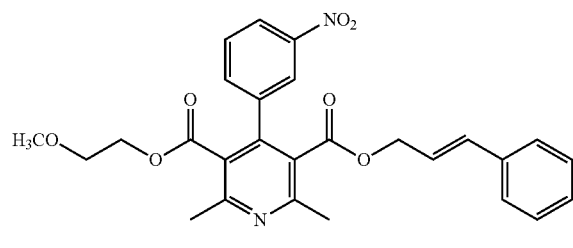

More specifically, cilnidipine (50.8 mg, 0.103 mmol) was dissolved in dichloromethane (3 mL), and 2,3-dichloro-5,6-dicyano-1,4-benzoquinone (31.5 mg, 0.139 mmol) was added. The mixture was stirred at room temperature at 2 hours, and the reaction mixture was purified by silica gel column chromatography (chloroform:ethyl acetate=8:1), to obtain NS4-021 (44.8 mg, 89% yield) as a colorless viscous oil.

1H NMR (500 MHz, CDCl3): 8.16 (t, J=2.0 Hz, 1H), 8.00 (ddd, J=8.0, 2.5, 1.0 Hz, 1H), 7.57 (dt, J=8.0, 1.0 Hz, 1H), 7.41 (t, J=8.0 Hz, 1H), 7.36-7.29 (m, 3H), 7.26-7.23 (m, 2H), 6.45 (d, J=16.0 Hz, 1H), 5.86 (dt, J=16.0, 7.0 Hz, 1H), 4.63 (dd, J=7.0, 1.0 Hz, 2H), 4.14-4.09 (m, 2H), 3.32 (t, J=5.0 Hz, 2H), 3.21 (s, 3H), 2.65 (s, 3H), 2.64 (s, 3H). ESI-MS m/z: 513.2 [M+Na]+.

Synthesis of NS4-043

A compound represented by chemical formula (4) below (referred to as "NS4-043", hereinafter) was synthesized according to Scheme III below.

[Chem.49]

(4)

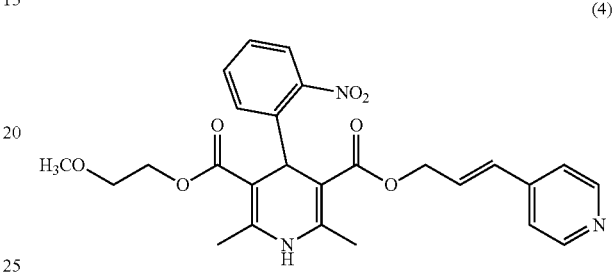

More specifically, (E)-3-(4-pyridyl)allyl acetoacetate (220 mg, 1.00 mmol), 2-nitrobenzaldehyde (153 mg, 1.01 mmol) and 2-methoxyethyl 3-aminocrotonate (162 mg, 1.02 mmol) were dissolved in 2-propanol (5 mL), and the mixture was stirred at 70° C. for 36 hours. The solvent was evaporated off, and the residue was purified by silica gel column chromatography (hexane:ethyl acetate graded from 1:1 to 1:6), to obtain NS4-043 (128 mg, 26% yield) as a yellow solid.

1HNMR (500 MHz, CDCl3): 8.52 (d, J=6.5 Hz, 2H), 7.71 (dd, J=8.0, 1.5 Hz, 1H), 7.54 (dd, J=8.0, 1.5 Hz, 1H), 7.47 (td, J=8.0, 1.5 Hz, 1H), 7.26-7.23 (m, 1H), 7.18 (d, J=6.5 Hz, 2H), 6.41 (dt, J=16.0, 6.0 Hz, 1H), 6.33 (d, J=16.0 Hz, 1H), 5.91 (s, 1H), 5.67 (s, 1H), 4.72 (ddd, J=13.5, 6.0, 1.0 Hz, 1H), 4.65 (ddd, J=13.5, 6.0, 1.0 Hz, 1H), 4.27-4.21 (m, 1H), 4.09-4.04 (m, 1H), 3.58-3.48 (m, 2H), 3.26 (s, 3H), 2.35 (s, 3H), 2.34 (s, 3H). ESI-MS m/z: 494.2 [M+H]+.

Synthesis of NS4-238

A compound represented by chemical formula (6) below (referred to as "NS4-238", hereinafter) was synthesized according to Scheme IV below.

Scheme III

[Chem. 48]

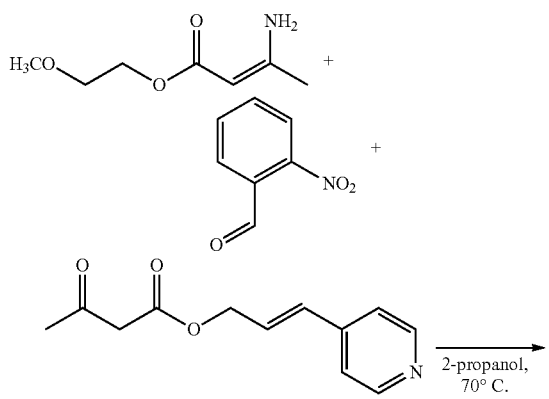

Scheme IV

[Chem. 50]

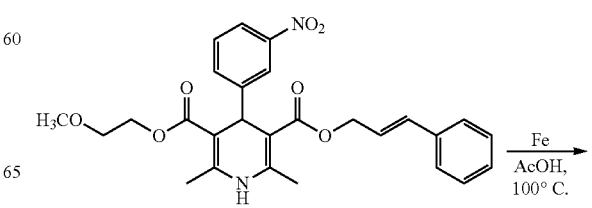

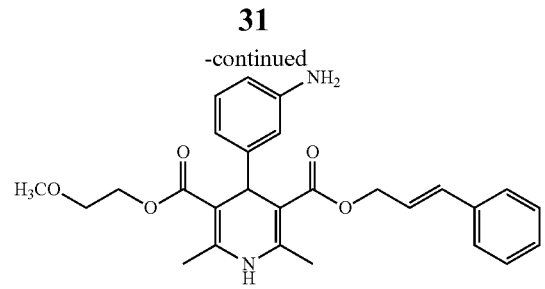

[Chem.51]

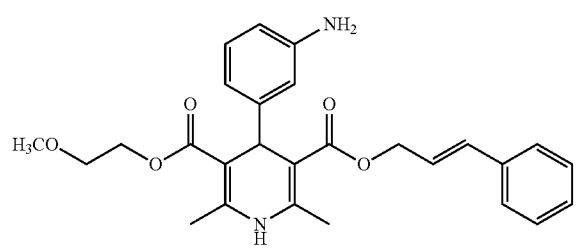

(6)

More specifically, cilnidipine (67.9 mg, 0.138 mmol) was dissolved in acetic acid (2 mL), and iron powder (425 mg, 7.60 mmol) was added. The mixture was stirred at 100° C. for 15 minutes, the reaction mixture was diluted with ethyl acetate, and then filtered through celite to separate a solid component. The filtrate was washed with saturated sodium bicarbonate water and saturated brine, the organic layer was dried over sodium sulfate, and the solvent was evaporated off under reduced pressure. The residue was purified by silica gel column chromatography (chloroform:ethyl acetate=3:2), to obtain NS4-238 (50.0 mg, 78% yield) as a pale yellow viscous oil.

1HNMR (500 MHz, CDCl3): 7.35 (d, J=7.0 Hz, 2H), 7.30 (t, J=7.5 Hz, 2H), 7.24 (t, J=7.0 Hz, 1H), 6.99 (t, J=7.5 Hz, 1H), 6.71 (d, J=7.5 Hz, 1H), 6.66 (t, J=2.0 Hz, 1H), 6.53 (d, J=16.0 Hz, 1H), 6.46 (ddd, J=8.0, 2.5, 1.0 Hz, 1H), 6.24 (dt, J=16.0, 6.0 Hz, 1H), 5.62 (s, 1H), 5.01 (s, 1H), 4.77 (ddd, J=13.5, 6.0, 1.5 Hz, 1H), 4.67 (ddd, J=13.5, 6.0, 1.5 Hz, 1H), 4.26-4.14 (m, 2H), 3.57-3.54 (m, 2H), 3.32 (s, 3H), 2.35 (s, 3H), 2.32 (s, 3H). ESI-MS m/z: 463.2 [M+H]+.

Synthesis of NS4-700

A compound represented by chemical formula (5) below (referred to as "NS4-700", hereinafter) was synthesized according to Scheme V below.

Scheme V

[Chem. 52]

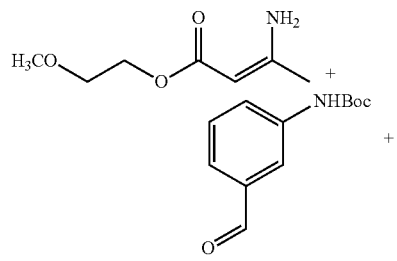

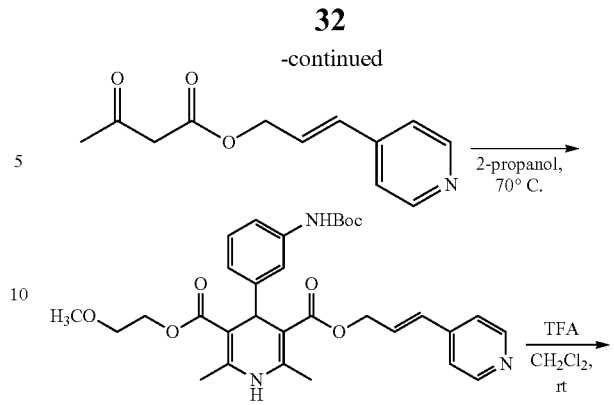

[Chem.53]

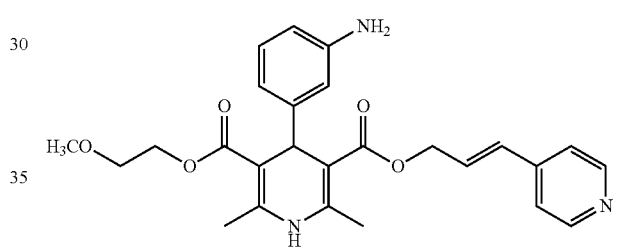

(5)

More specifically, (E)-3-(4-pyridyl)allyl acetoacetate (42.3 mg, 0.193 mmol), 3-(Boc-amino)benzaldehyde (43.8 mg, 0.198 mmol) and 2-methoxyethyl 3-aminocrotonate (30.8 mg, 0.193 mmol) were dissolved in 2-propanol (1 mL), and the mixture was stirred at 70° C. for 24 hours. The solvent was evaporated off, and the residue was purified by silica gel column chromatography (hexane:ethyl acetate graded from 1:2 to 1:3) to obtain intermediate Boc-NS4-700 (36.8 mg, 34% yield) as a colorless amorphous substance. The intermediate (31.3 mg, 55.5 μmol) was dissolved in dichloromethane (2 mL), and trifluoroacetic acid (0.5 mL) was added dropwise. The mixture was stirred at room temperature for 20 minutes, the reaction liquid was neutralized with saturated sodium bicarbonate water, and extracted twice with dichloromethane. The resultant organic layers were combined, washed with saturated brine, dried over magnesium sulfate, and the solvent was evaporated off under reduced pressure. The residue was purified by silica gel column chromatography (chloroform:methanol graded from 100:1 to 25:1) to obtain NS4-700 (19.9 mg, 77% yield) as a colorless amorphous substance.

1HNMR (500 MHz, CDCl3): 8.51 (d, J=5.5 Hz, 2H), 7.18 (d, J=5.5 Hz, 2H), 7.00 (t, J=8.0 Hz, 1H), 6.73 (dt, J=7.5, 1.0 Hz, 1H), 6.68 (t, J=2.0 Hz, 1H), 6.47 (ddd, J=8.0, 2.5, 1.0 Hz, 1H), 6.42 (dt, J=16.0, 5.0 Hz, 1H), 6.31 (d, J=16.0 Hz, 1H), 5.99 (s, 1H), 5.02 (s, 1H), 4.86 (ddd, J=14.5, 5.0, 1.5 Hz, 1H), 4.66 (ddd, J=14.5, 5.0, 1.5 Hz, 1H), 4.29-4.23 (m, 1H), 4.20-4.15 (m, 1H), 3.60-3.56 (m, 2H), 3.33 (s, 3H), 2.37 (s, 3H), 2.31 (s, 3H). ESI-MS m/z: 464.2 [M+H]+.

Synthesis of JYK-002

A compound represented by chemical formula (8) below (referred to as "JYK-002", hereinafter) was prepared from 2-methoxyethyl 3-oxobutanoate, (E)-3-phenyl-2-propen-1-yl 3-aminobut-2-enoate, and 4-nitrobenzaldehyde according to the procedure described for NS4-019.

[Chem.54]

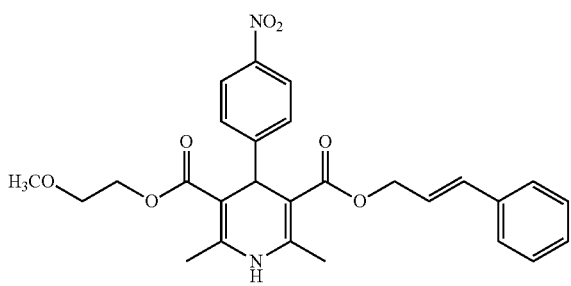

(8)

1H NMR (400 MHz, CDCl3) δ: 8.02 (d, J=8.0 Hz, 2H), 7.44 (d, J=8.0 Hz, 2H), 7.29-7.21 (m, 5H), 6.47 (d, J=16.0 Hz, 1H), 6.14 (dt, J=16.0, 6.4 Hz, 1H), 5.64 (s, 1H), 5.13 (s, 1H), 4.73-4.59 (m, 2H), 4.21-4.07 (m, 2H), 3.54-3.43 (m, 2H), 3.27 (s, 3H), 2.35 (s, 3H), 2.32 (s, 3H). ESI-MS m/z: 493.2 [M+H]+.

Synthesis of JYK-003

A compound represented by chemical formula (9) below (referred to as "JYK-003", hereinafter) was prepared from 3-(2-methoxyethyl) 5-[(2E)-3-phenyl-2-propen-1-yl]2,6-dimethyl-4-(4-nitrophenyl)-1,4-dihydropyridine-3,5-dicarboxylate according to the procedure described for NS4-238.

[Chem.55]

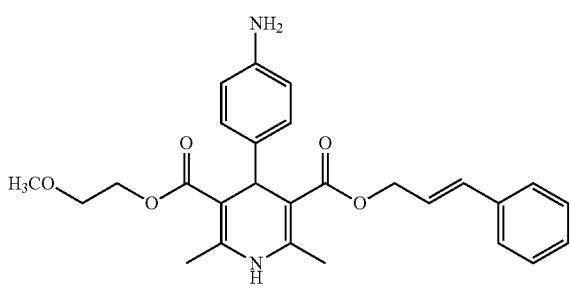

(9)

1H NMR (500 MHz, CDCl3) δ: 7.36-7.28 (m, 4H), 7.24 (tt, J=7.0, 1.5 Hz, 1H), 7.09 (d, J=8.5 Hz, 2H), 6.53 (d, J=8.5 Hz, 2H), 6.50 (d, J=16.0 Hz, 1H), 6.22 (dt, J=16.0, 6.0 Hz, 1H), 5.56 (s, 1H), 4.95 (s, 1H), 4.76 (ddd, J=13.5, 6.0, 1.5 Hz, 1H), 4.66 (ddd, J=13.5, 6.0, 1.5 Hz, 1H), 4.24-4.13 (m, 2H), 3.57-3.53 (m, 2H), 3.32 (s, 3H), 2.34 (s, 3H), 2.32 (s, 3H). ESI-MS m/z: 463.2 [M+H]+.

Synthesis of JYK-001

A compound represented by chemical formula (10) below (referred to as "JYK-001", hereinafter) was prepared from 2-methoxyethyl 3-aminobut-2-enoate, (E)-3-(pyridin-4-yl)-2-propen-1-yl 3-oxobutanoate, and 3-nitrobenzaldehyde according to the procedure for NS4-043.

[Chem.56]

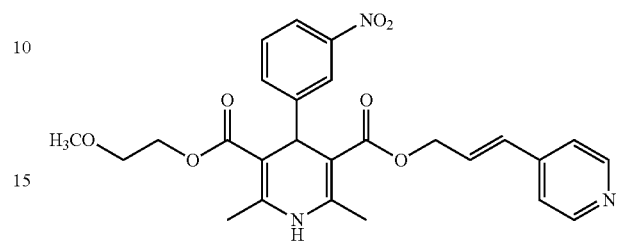

(10)

1H NMR (500 MHz, CDCl3) δ: 8.55 (d, J=6.0 Hz, 2H), 8.15 (t, J=2.0 Hz, 1H), 8.00 (dd, J=8.0, 2.0 Hz, 1H), 7.66 (dd, J=8.0, 2.0 Hz, 1H), 7.36 (t, J=8.0 Hz, 1H), 7.20 (d, J=6.0 Hz, 2H), 6.44-6.42 (m, 2H), 5.77 (s, 1H), 5.17 (s, 1H), 4.78-4.67 (m, 2H), 4.24-4.12 (m, 2H), 3.60-3.50 (m, 2H), 3.30 (s, 3H), 2.41 (s, 3H), 2.37 (s, 3H). ESI-MS m/z: 494.2 [M+H]+.

Synthesis of JYK-004

A compound represented by chemical formula (11) below (referred to as "JYK-004", hereinafter) was prepared from 2-methoxyethyl 3-aminobut-2-enoate, (E)-3-(pyridin-4-yl)-2-propen-1-yl 3-oxobutanoate, and 4-nitrobenzaldehyde according to the procedure described for NS4-043.

[Chem.57]

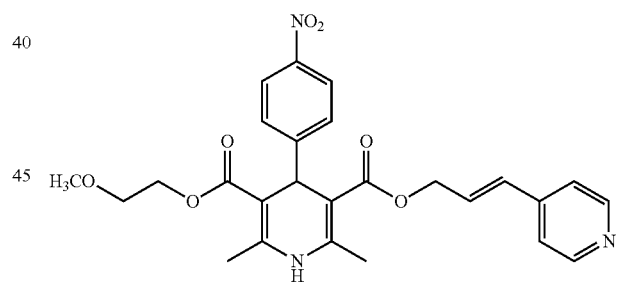

(11)

1H NMR (500 MHz, CDCl3) δ: 8.54 (d, J=6.0 Hz, 2H), 8.07 (d, J=9.0 Hz, 2H), 7.49 (d, J=9.0 Hz, 2H), 7.16 (d, J=6.0 Hz, 2H), 6.40-6.38 (m, 2H), 5.81 (s, 1H), 5.17 (s, 1H), 4.78-4.68 (m, 2H), 4.26-4.14 (m, 2H), 3.58-3.49 (m, 2H), 3.32 (s, 3H), 2.40 (s, 3H), 2.36 (s, 3H). ESI-MS m/z: 494.2 [M+H]+.

Exemplary Experiment 8

<First Evaluation of NS4-238>

Using the evaluation system built in Exemplary Experiment 1, suppressive ability of NS4-238 synthesized in Exemplary Experiment 7 exerted on mitochondrial division was examined.

NS4-238 was added to a culture medium of the myocardial cells from the neonatal rat, so as to adjust the final concentration to 1 μM, the cells were incubated for one hour, and further cultured under hypoxic environment for 16 hours. The cells were then stained in the same way as described in Exemplary Experiment 1 using MitoTracker Green FM (from Thermo Fischer Scientific Inc.), observed under a fluorescent microscope, and the shape of mitochondria was quantified. Also a group having cilnidipine added thereto in place of NS4-238, and a group having dimethylsulfoxide (DMSO) added thereto in place of the drugs were prepared for comparison.

Figure 8:
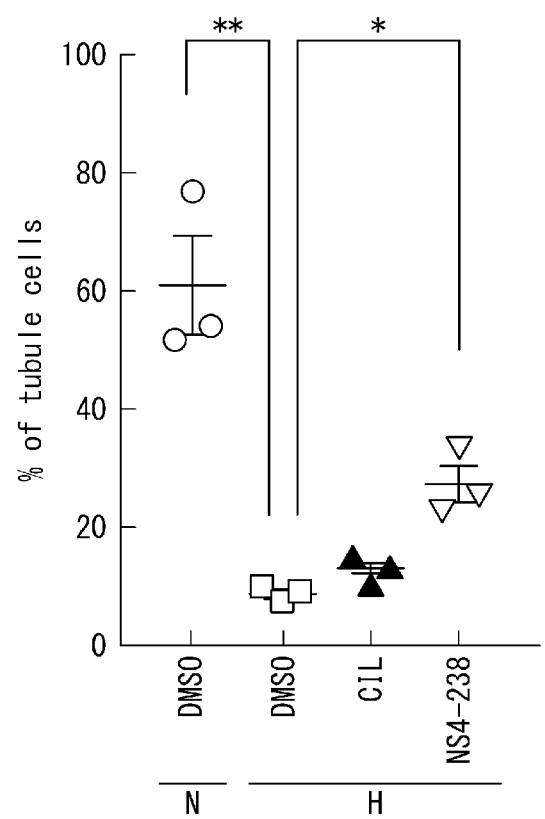
FIG. 8 is a graph that illustrates results of measurement of percentages of cells having tubular mitochondria in Exemplary Experiment 8.

FIG. 8 is a graph that illustrates results of measurement of percentages of cells having tubular mitochondria. In FIG. 8, "CIL" represents results obtained from cilnidipine administration, "NS4-238" represents results obtained from NS4-238 administration, "DMSO" represents results obtained from DMSO administration, "N" represents results obtained from the normoxic environment, and "H" represents results obtained from the hypoxic environments.

The results clarified that NS4-238 significantly suppressed mitochondrial division under hypoxic stimulation. It was also clarified that the suppressive ability of NS4-238 against mitochondrial division was approximately three times larger than that of cilnidipine.

Exemplary Experiment 9

<Second Evaluation of NS4-238>

In Exemplary Experiment 8, mitochondrial division under hypoxic stimulation was examined. In this Exemplary Experiment, whether mitochondrial division is promoted by overexpressed filamin or overexpressed filamin cardiomyopathy mutant or not, and influence of NS4-238 on mitochondrial division were examined.

A disease called filamin cardiomyopathy has been known to involve A1539T mutation (substitution of adenine at position 1539 to thymine) on filamin-C gene. Then influence of A1545T mutant of filamin A gene, similar to A1539T mutant of filamin-C gene, on the shape of mitochondria of myocardial cell was examined.

An expression vector of wild type filamin A gene fused with mCherry tag, or, an expression vector of A1545T mutant of filamin A gene fused with mCherry tag was transduced into H9c2 cell, which is a murine heart striated muscle cell line, and allowed to overexpress. Also a group, having an expression vector of mCherry transduced and allowed to overexpress therein, was prepared for comparison.

The cells were cultured for 24 hours, cilnidipine or NS4-238 was added to the culture medium while adjusting the final concentration to 1 µM, and the cells were further cultured for 24 hours. Also a group having DMSO added thereto in place of the drugs was prepared for comparison.

The cells were then stained in the same way as described in Exemplary Experiment 1 using MitoTracker Green FM (from Thermo Fischer Scientific Inc.). The cells were observed under a fluorescent microscope, and the shape of mitochondria was quantified by image analysis.

Figure 9:
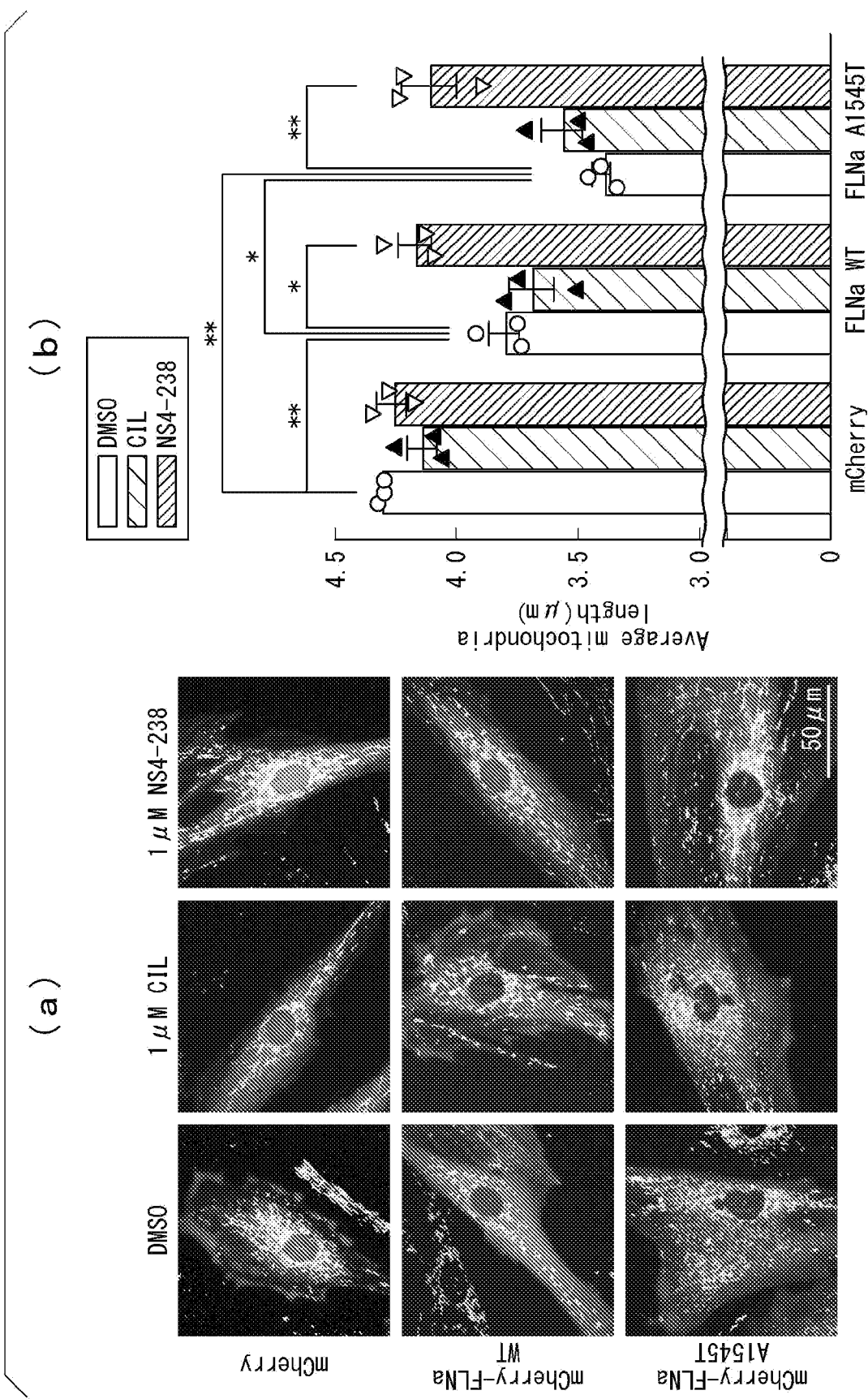
FIG. 9(a) is a fluorescent microphotograph of cells in Exemplary Experiment 9.
FIG. 9(b) is a graph that illustrates results of measurement of average length of mitochondrial fragments, as a result of image analysis of fluorescent microphotograph in FIG. 9(a).

FIG. 9(a) is a fluorescent microphotograph of cells. Scale bar=50 µm FIG. 9(b) is a graph that illustrates results of measurement of average length of mitochondrial fragments, as a result of image analysis of fluorescent microphotograph in FIG. 9(a). In FIG. 9(b), "*" represents presence of significant difference at p<0.05, and "**" represents presence of significant difference at p<0.01.

In FIGS. 9(a) and 9(b), "DMSO" represents results obtained from DMSO addition, "CIL" represents results obtained from cilnidipine addition, "NS4-238" represents results obtained from NS4-238 addition, "mCherry" represents results obtained from overexpressed mCherry, "mCherry-FLNa WT" represents results obtained from overexpressed wild type filamin A gene fused with mCherry tag, and "mCherry-FLNa A1545T" represents results obtained from overexpressed A1545T mutant of filamin A gene fused with mCherry tag.

The results clarified that mitochondrial division was promoted by the overexpressed wild type filamin A gene. The mitochondrial division was found to be further promoted by the overexpressed A1545T mutant of filamin A gene.

It was also clarified that addition of NS4-238 successfully suppressed mitochondrial division which is promoted by overexpressed wild type filamin A gene or overexpressed A1545T mutant of filamin A gene.

In addition, addition of cilnidipine could not suppress mitochondrial division which is promoted by overexpressed wild type filamin A gene or overexpressed A1545T mutant of filamin A gene.

Exemplary Experiment 10

<First Evaluation of Cilnidipine Derivative>

How the cilnidipine derivatives, synthesized in Exemplary Experiment 7, can affect aging of myocardial cell was examined. Aging of myocardial cell was evaluated on the basis of accumulation of p53 protein. More specifically, each of cilnidipine, and the individual compounds namely NS4-019, NS4-021 and NS4-043, synthesized in Exemplary Experiment 7, was added to a culture medium of the myocardial cells from neonatal rat, so as to adjust the final concentration to 1 µM, and the cells were incubated for one hour. The cells were then subjected to hypoxic-reoxygenation stimulation, by cultivation under hypoxic (1%) environment for 18 hours, followed by cultivation under normoxic (21%) environment for 18 hours. The cells in each culture were then fixed with 4% paraformaldehyde, and immunostained with anti-p53 antibody and anti-α-actinin antibody. α-Actinin is a marker of myocardial cell. The cells in each culture were observed under a fluorescent microscope, and percentage of p53 accumulating cells relative to the α-actinin-positive cells was determined.

Figure 10:
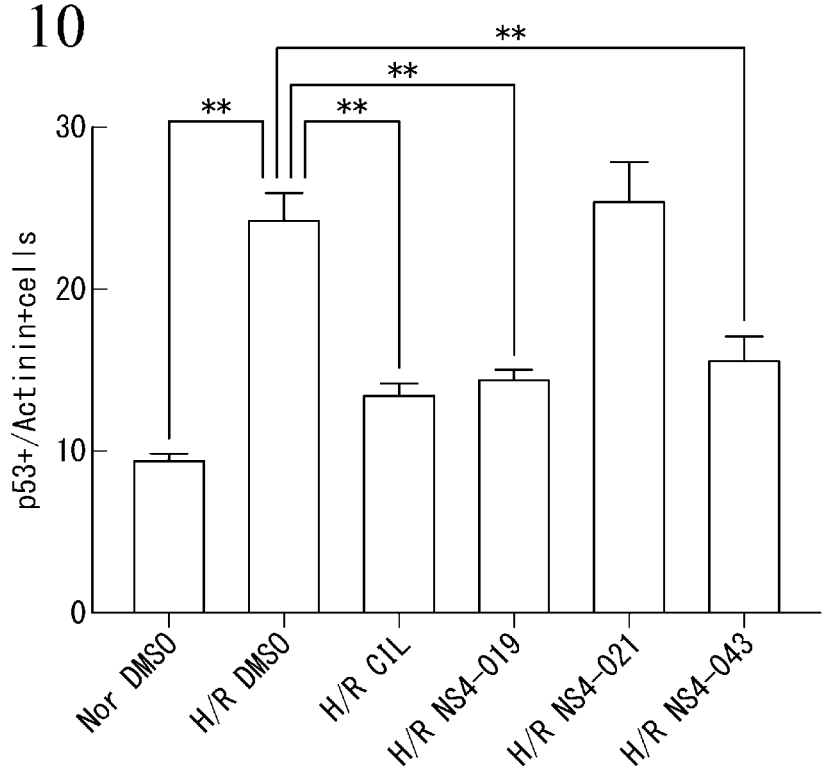
FIG. 10 is a graph that illustrates results of measurement of percentage of p53 accumulating cells relative to α-actinin-positive cells in Exemplary Experiment 10.

FIG. 10 is a graph that illustrates results of measurement of percentage of p53 accumulating cells relative to α-actinin-positive cells. In FIG. 10, "Nor DMSO" represents results obtained from the cells normoxically cultured with DMSO added thereto without hypoxic-reoxygenation stimulation, "H/R DMSO" represents results obtained from the cells cultured with DMSO added thereto and under hypoxic-reoxygenation stimulation, "H/R CIL" represents results obtained from the cells cultured with cilnidipine added thereto and under hypoxic-reoxygenation stimulation, "H/R NS4-019" represents results obtained from the cells cultured with NS4-019 added thereto and under hypoxic-reoxygenation stimulation, "H/R NS4-021" represents results obtained from the cells cultured with NS4-021 added thereto and under hypoxic-reoxygenation stimulation, "H/R NS4-043" represents results obtained from the cells cultured with NS4-043 added thereto and under hypoxic-reoxygenation stimulation, and "**" represents presence of significant difference at p<0.01.

The results clarified that NS4-019 and NS4-043 showed, like cilnidipine, suppressive effects over aging of myocardial cell possibly induced by hypoxic-reoxygenation stimulation. In contrast, NS4-021 was found to show no suppressive effect over aging of myocardial cell possibly induced by hypoxic-reoxygenation stimulation.

Exemplary Experiment 11

<Second Evaluation of Cilnidipine Derivative>

Using the evaluation system built in Exemplary Experiment 1, suppressive ability of cilnidipine derivative synthesized in Exemplary Experiment 7 exerted on mitochondrial division was examined.

More specifically, first, each of cilnidipine, and the individual compounds namely NS4-019, NS4-021 and NS4-043, synthesized in Exemplary Experiment 7, was added to a culture medium of the myocardial cells from neonatal rat, so as to adjust the final concentration to 1 µM, and the cells were incubated for one hour.

Next, each cell was further cultured under hypoxic environment for 18 hours. The cells were then stained in the same way as described in Exemplary Experiment 1 using MitoTracker Green FM (from Thermo Fischer Scientific Inc.), observed under a fluorescent microscope, and the shape of mitochondria was quantified. Also a group having dimethylsulfoxide (DMSO) added thereto in place of the drugs was prepared for comparison.

Figure 11:
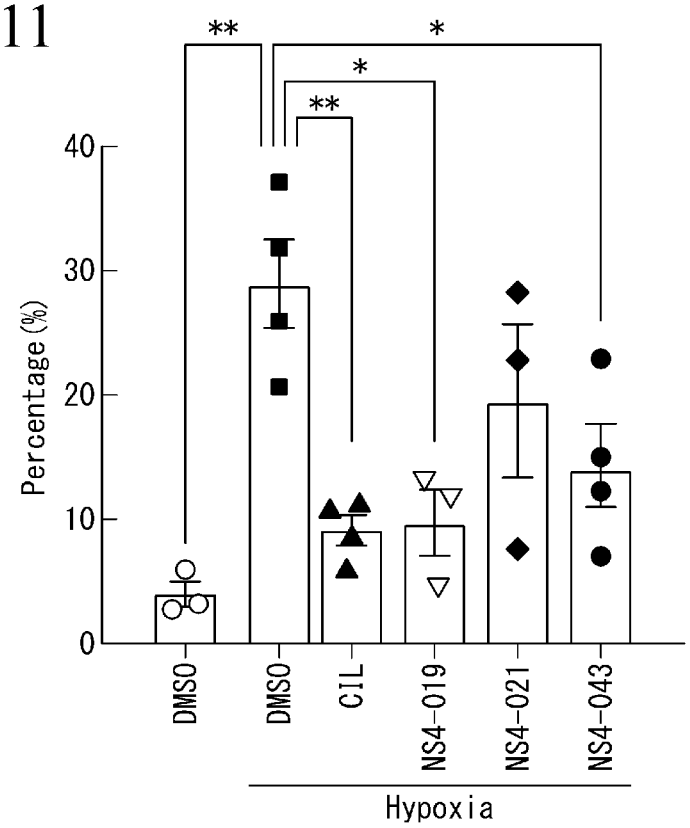
FIG. 11 is a graph that illustrates results of a measurement of percentage of cells having vesicular mitochondria in Exemplary Experiment 11.

FIG. 11 is a graph that illustrates results of a measurement of percentage of cells having vesicular mitochondria. In FIG. 11, "CIL" represents results obtained from cells having cilnidipine added thereto, "*" represents presence of significant difference at $p<0.05$, and "**" represents presence of significant difference at $p<0.01$.

The results clarified that, like cilnidipine, NS4-019 and NS4-043 can significantly suppress mitochondrial division under hypoxic stimulation. Also NS4-021 was found to have a tendency to suppress mitochondrial division under hypoxic stimulation. In short, the results of Exemplary Experiments 10 and 11 clarified that NS4-021 did not show a suppressive effect on aging of myocardial cells under hypoxic-reoxygenation stimulation, but showed a tendency to suppress mitochondrial division under hypoxic stimulation.

Exemplary Experiment 12

<Third Evaluation of Cilnidipine Derivative>

Effect of blocking the calcium channel by the cilnidipine derivative, synthesized in Exemplary Experiment 7, was examined. More specifically, first, Neuro-2a cells which belong to a cell line of murine neuroblastoma were cultured in serum-free culture media, and Fura 2-AM (from Dojindo Laboratories) as a calcium ion probe was added to the culture media, so as to transduce it into the cells.

The culture media were then replaced with HEPES buffered nutrient solution (pH7.4), and each of cilnidipine, and the individual compounds namely NS4-019, NS4-021, NS4-043, NS4-238, and NS4-700, synthesized in Exemplary Experiment 7, was added to the culture media so as to adjust the final concentrations to 0, 1, 10, 100, and 1,000 nM, and the culture media were incubated for 30 minutes.

Depolarizing stimulation was then given by adding potassium chloride solution (to a final concentration of 60 mM), and inflow of calcium ions into the cells was observed under a fluorescent microscope.

Figure 12:
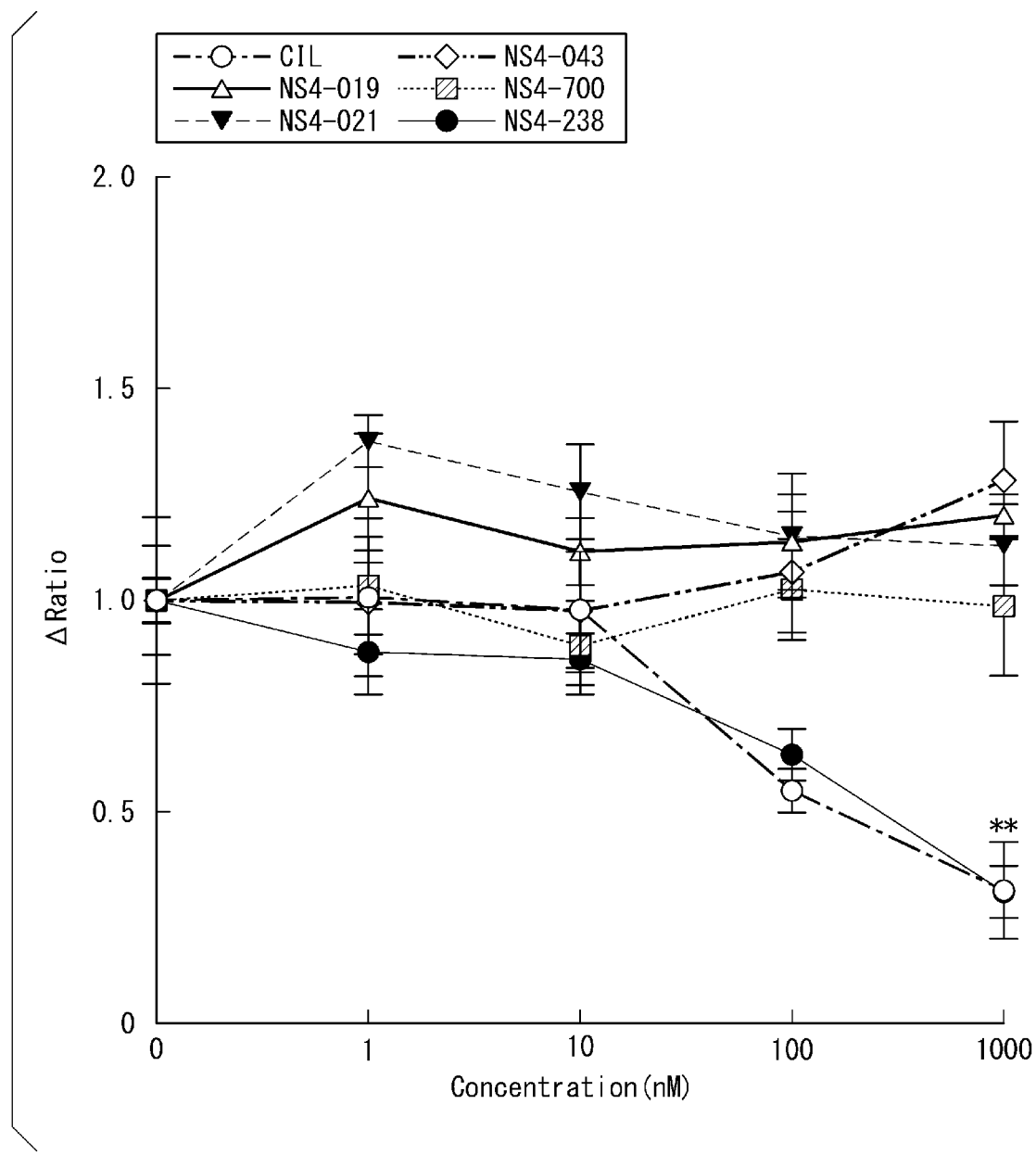
FIG. 12 is a graph that illustrates increase of intracellular calcium ion concentration after potassium chloride stimulation in Exemplary Experiment 12.

FIG. 12 is a graph that illustrates increase of intracellular calcium ion concentration after potassium chloride stimulation. In FIG. 12, "CIL" represents results obtained from the cells having cilnidipine added thereto, "NS4-238" represents results obtained from the cells having NS4-238 added thereto, and "**" represents presence of significant difference at $p<0.01$. The abscissa indicates concentration of the individual compounds, and the ordinate indicates ΔRatio given by equation (F1) below. Now, ΔRatio is a value relevant to the intracellular calcium ion concentration.

ΔRatio=(fluorescent intensity at 510 nm, when excited at 340 nm)/(fluorescent intensity at 510 nm, when excited at 380 nm)　　(F1)

The results clarified that cilnidipine and NS4-238 showed blocking effects exerted on the calcium channel, whereas NS4-019, NS4-021, NS4-043 and NS4-700 did not show blocking effect exerted on the calcium ion channel.

Exemplary Experiment 13

<Fourth Evaluation of Cilnidipine Derivative>

Using the evaluation system built in Exemplary Experiment 1, suppressive ability of NS4-238 and NS4-700 synthesized in Exemplary Experiment 7 exerted on mitochondrial division was examined.

More specifically, first, NS4-238 or NS4-700 was added to a culture medium of the myocardial cells from neonatal rat, so as to adjust the final concentration to 0.3 µM, and the cells were incubated for one hour. Next, each cell was further cultured under hypoxic environment for 18 hours. The cells were then stained in the same way as described in Exemplary Experiment 1 using MitoTracker Green FM (from Thermo Fischer Scientific Inc.), observed under a fluorescent microscope, and the shape of mitochondria was quantified. Also a group having dimethylsulfoxide (DMSO) added thereto in place of the drugs was prepared for comparison.

Figure 13:
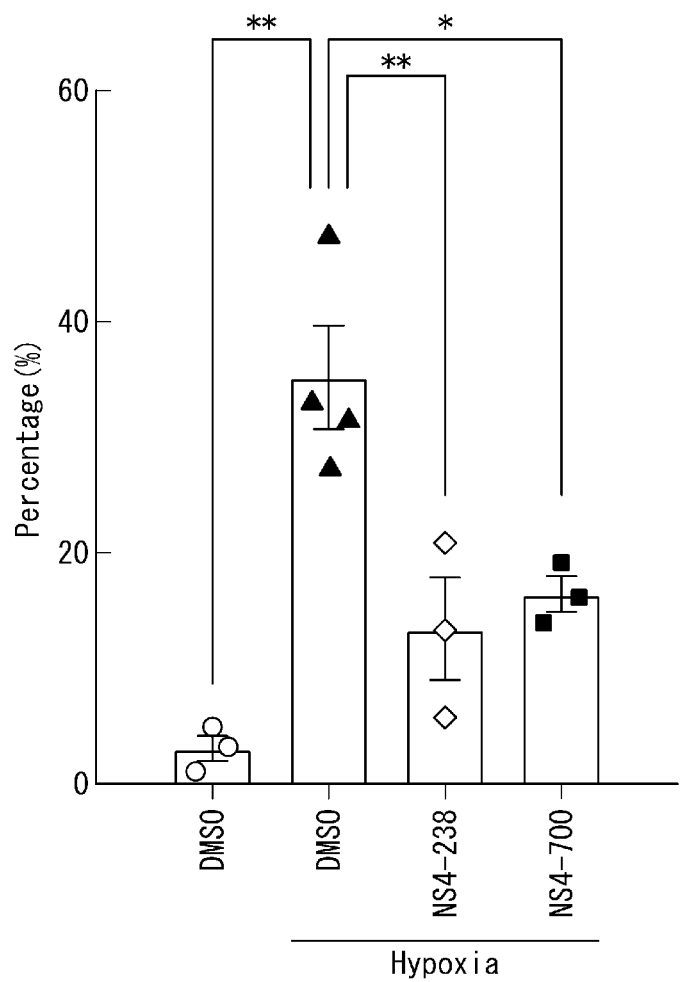
FIG. 13 is a graph that illustrates results of a measurement of percentage of cells having vesicular mitochondria in Exemplary Experiment 13.

FIG. 13 is a graph that illustrates results of a measurement of percentage of cells having vesicular mitochondria. In FIG. 13, "DMSO" represents results obtained from the cells having DMSO added thereto, "NS4-238" represents results obtained from the cells having NS4-238 added thereto, "*" represents presence of significant difference at $p<0.05$, and "**" represents presence of significant difference at $p<0.01$.

The results clarified that NS4-700 can, similarly to NS4-238, significantly suppress mitochondrial division under hypoxic stimulation.

Exemplary Experiment 14

<Fifth Evaluation of Cilnidipine Derivatives>

The suppressive ability of cilnidipine derivatives synthesized in Exemplary Experiment 7 exerted on mitochondrial division was examined using the evaluation system described in Exemplary Experiment 1 method described in Exemplary Experiment 8.

Figure 14:
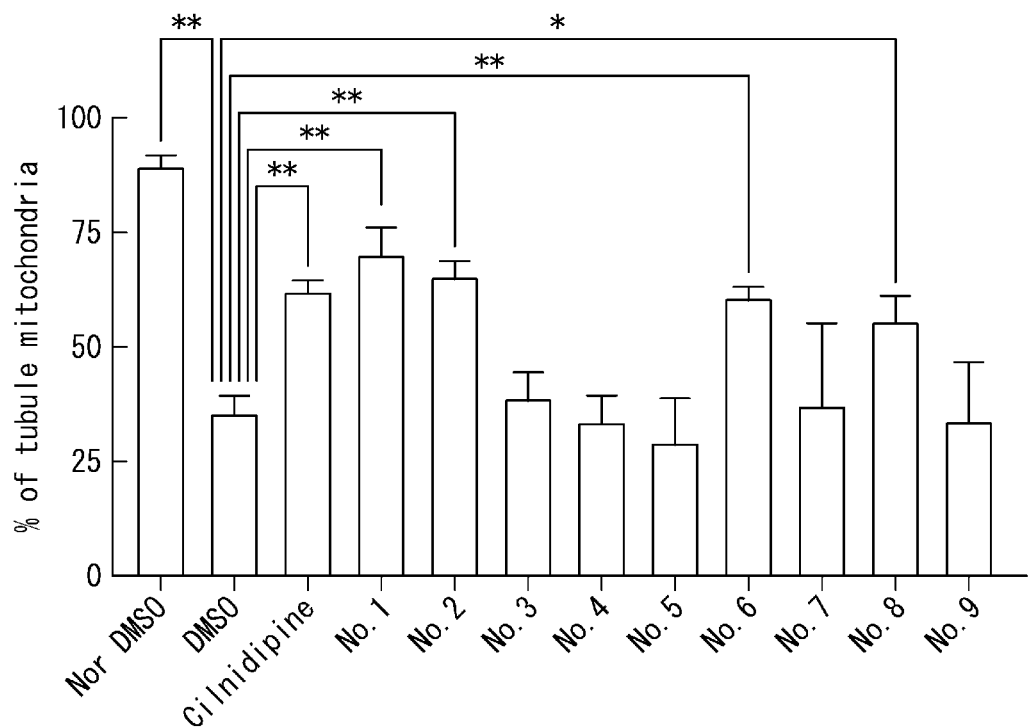
FIG. 14 is a graph that illustrates results of measurement of percentages of cells having tubular mitochondria in Exemplary Experiment 14.

FIG. 14 is a graph that illustrates results of measurement of percentages of cells having tubular mitochondria. In FIG. 14, "Nor DMSO" represents results obtained from cells normoxically cultured with DMSO added thereto, "DMSO" represents results obtained from DMSO administration, "Cilnidipine" represents results obtained from cilnidipine administration, and "No. 1" through "No. 9" represent results obtained from administration of NS4-019, NS4-238, NS4-021, JYK-002, JYK-003, NS4-043, JYK-001, NS4-700, and JYK-004, respectively. "*" represents presence of significant difference at $p<0.05$, and "**" represents presence of significant difference at $p<0.01$.

The results show that NS4-019, NS4-238, NS4-043, and NS4-700 significantly suppressed mitochondrial division under hypoxic stimulation.

Exemplary Experiment 15

<Sixth Evaluation of Cilnidipine Derivatives>

The effect of blocking the calcium channel by the cilnidipine derivatives synthesized in Exemplary Experiment 7 was examined according to the method described in Exemplary Experiment 12.

Figure 15:
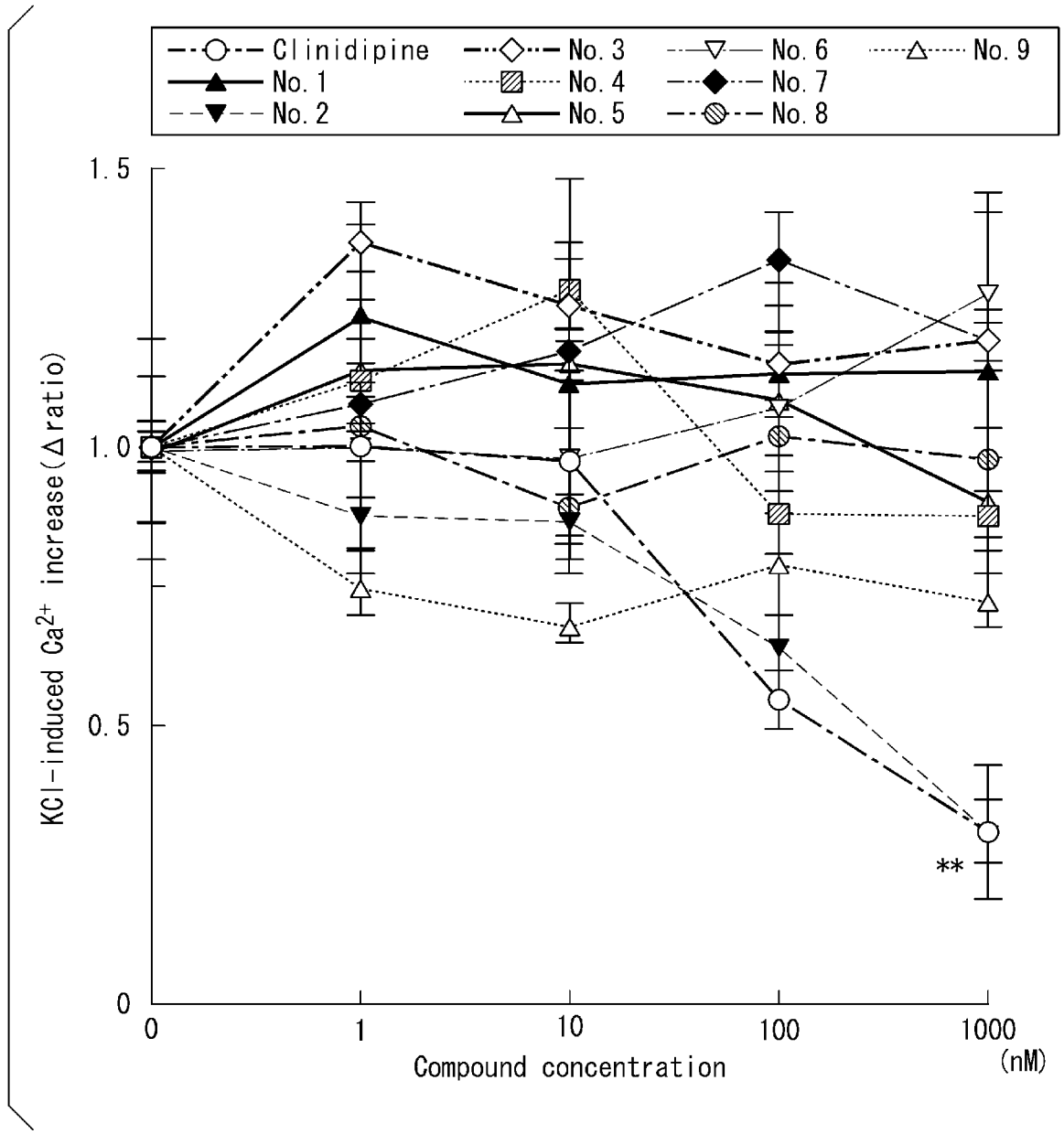
FIG. 15 is a graph that illustrates increase of intracellular calcium ion concentration after potassium chloride stimulation in Exemplary Experiment 15.

FIG. 15 is a graph that illustrates increase of intracellular calcium ion concentration after potassium chloride stimulation. In FIG. 15, "Cilnidipine" represents results obtained from the cells having cilnidipine added thereto, and "No. 1" through "No. 9" represent results obtained from administration of NS4-019, NS4-238, NS4-021, JYK-002, JYK-003, NS4-043, JYK-001, NS4-700, and JYK-004, respectively. "**" represents presence of significant difference at p<0.01. The abscissa indicates concentration of the individual compounds, and the ordinate indicates ΔRatio given by equation (F1) as in Example 12.

The results show that cilnidipine and NS4-238 showed blocking effects on the calcium channel at 1000 nM.

INDUSTRIAL APPLICABILITY

According to the present invention, it is possible to provide a Drp1-filamin complex formation inhibitor.

SPECIFIC EMBODIMENTS

The present disclosure is exemplified by the specific embodiments below.

1. A compound of Formula (I):

[Chem.58]

(I)

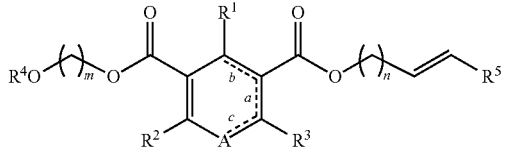

or a pharmacologically acceptable salt thereof or a solvate of them, wherein:
- $R^1$ is phenyl substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl, provided that at least one substituent is $NO_2$ or $NH_2$;
- $R^2$ is H, $C_1$-$C_6$ alkyl, $C_1$-$C_6$ haloalkyl, or $C_1$-$C_6$ alkoxyalkyl;
- $R^3$ is H, $C_1$-$C_6$ alkyl, $C_1$-$C_6$ haloalkyl, or $C_1$-$C_6$ alkoxyalkyl;
- $R^4$ is $C_1$-$C_6$ alkyl or $C_1$-$C_6$ haloalkyl;
- $R^5$ is phenyl or pyridinyl, wherein the phenyl or pyridinyl is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl;
- either (i) bond a is present and bonds b and c are absent or (ii) bonds b and c are present and bond a is absent;
- A is NH when bond a is present and N when bonds b and c are present;
- m is an integer from 1 to 4; and
- n is an integer from 1 to 3;

provided that the compound is other than

[Chem.59]

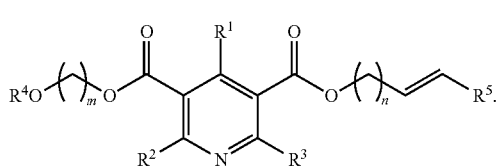

2. The compound of embodiment 1, or a pharmacologically acceptable salt thereof or a solvate of them, having the structure of Formula (Ia):

[Chem.60]

(Ia)

$$R^4O\underset{m}{\overbrace{\phantom{xxx}}}O\underset{R^2}{\overset{O}{\underset{\|}{C}}}\underset{\underset{H}{N}}{\overset{R^1}{\bigcirc}}\underset{R^3}{\overset{O}{\underset{\|}{C}}}O\underset{n}{\overbrace{\phantom{xxx}}}R^5$$

3. The compound of embodiment 1, or a pharmacologically acceptable salt thereof or a solvate of them, having the structure of Formula (Ib):

[Chem. 61]

(Ib)

$$R^4O\underset{m}{\overbrace{\phantom{xxx}}}O\underset{R^2}{\overset{O}{\underset{\|}{C}}}\underset{N}{\overset{R^1}{\bigcirc}}\underset{R^3}{\overset{O}{\underset{\|}{C}}}O\underset{n}{\overbrace{\phantom{xxx}}}R^5$$

4. The compound of any one of embodiments 1 to 3 or a pharmacologically acceptable salt thereof or a solvate of them, wherein $R^1$ is:

[Chem. 62]

wherein $R^{1a}$ is $NO_2$ or $NH_2$, and $R^{1b}$ and $R^{1c}$ are each independently H, $NO_2$, $NH_2$, OH, $C_1$-$C_6$ alkyl, $C_1$-$C_6$ haloalkyl, or $C_1$-$C_6$ alkoxyalkyl.

5. The compound of embodiment 4 or a pharmacologically acceptable salt thereof or a solvate of them, wherein $R^{1b}$ and $R^{1c}$ are each independently H, $NO_2$, $NH_2$, OH, $C_1$-$C_3$ alkyl, $C_1$-$C_3$ haloalkyl, or $C_1$-$C_3$ alkoxyalkyl.

6. The compound of embodiment 4 or a pharmacologically acceptable salt thereof or a solvate of them, wherein $R^1$ is

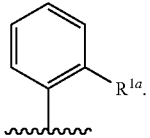

[Chem. 63]

7. The compound of embodiment 4 or a pharmacologically acceptable salt thereof or a solvate of them, wherein $R^1$ is

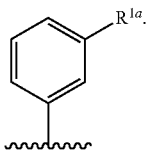

[Chem. 64]

8. The compound of embodiment 4 or a pharmacologically acceptable salt thereof or a solvate of them, wherein $R^1$ is

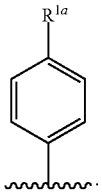

[Chem. 65]

9. The compound of any one of embodiments 4 to 8, or a pharmacologically acceptable salt thereof or a solvate of them, wherein $R^{1a}$ is $NO_2$.

10. The compound of any one of embodiments 4 to 8, or a pharmacologically acceptable salt thereof or a solvate of them, wherein $R^{1a}$ is $NH_2$.

11. The compound of any one of embodiments 1 to 10, or a pharmacologically acceptable salt thereof or a solvate of them, wherein $R^2$ is H, $C_1$-$C_3$ alkyl, $C_1$-$C_3$ haloalkyl, or $C_1$-$C_3$ alkoxyalkyl.

12. The compound of embodiment 11, or a pharmacologically acceptable salt thereof or a solvate of them, wherein $R^2$ is $C_1$-$C_3$ alkyl.

13. The compound of embodiment 12, or a pharmacologically acceptable salt thereof or a solvate of them, wherein $R^2$ is $CH_3$.

14. The compound of any one of embodiments 1 to 13, or a pharmacologically acceptable salt thereof or a solvate of them, wherein $R^3$ is H, $C_1$-$C_3$ alkyl, $C_1$-$C_3$ haloalkyl, or $C_1$-$C_3$ alkoxyalkyl.

15. The compound of embodiment 14, or a pharmacologically acceptable salt thereof or a solvate of them, wherein $R^3$ is $C_1$-$C_3$ alkyl.

16. The compound of embodiment 15, or a pharmacologically acceptable salt thereof or a solvate of them, wherein $R^3$ is $CH_3$.

17. The compound of any one of embodiments 1 to 16, or a pharmacologically acceptable salt thereof or a solvate of them, wherein $R^4$ is $C_1$-$C_3$ alkyl or $C_1$-$C_3$ haloalkyl.

18. The compound of embodiment 17, or a pharmacologically acceptable salt thereof or a solvate of them, wherein $R^4$ is $C_1$-$C_3$ alkyl.

19. The compound of embodiment 18, or a pharmacologically acceptable salt thereof or a solvate of them, wherein $R^4$ is $CH_3$.

20. The compound of any one of embodiments 1 to 19, or a pharmacologically acceptable salt thereof or a solvate of them, wherein $R^5$ is phenyl which is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl.

21. The compound of embodiment 20, or a pharmacologically acceptable salt thereof or a solvate of them, wherein $R^5$ is phenyl which is unsubstituted or substituted with one to three substituents each of which is independently $NO_2$, $NH_2$, OH, $C_1$-$C_3$ alkyl, $C_1$-$C_3$ haloalkyl, or $C_1$-$C_3$ alkoxyalkyl.

22. The compound of embodiment 20, or a pharmacologically acceptable salt thereof or a solvate of them, wherein $R^5$ is unsubstituted phenyl.

23. The compound of any one of embodiments 1 to 19, or a pharmacologically acceptable salt thereof or a solvate of them, wherein $R^5$ is pyridinyl which is unsubstituted or substituted with one to three substituents each of which is independently NO 2, $NH_2$, OH, $C_1$-$C_6$ alkyl, $C_1$-$C_6$ haloalkyl, or $C_1$-$C_6$ alkoxyalkyl.

24. The compound of embodiment 23, or a pharmacologically acceptable salt thereof or a solvate of them, wherein $R^5$ is pyridinyl which is unsubstituted or substituted with one to three substituents each of which is independently $NO_2$, $NH_2$, OH, $C_1$-$C_3$ alkyl, $C_1$-$C_3$ haloalkyl, or $C_1$-$C_3$ alkoxyalkyl.

25. The compound of embodiment 23, or a pharmacologically acceptable salt thereof or a solvate of them, wherein $R^5$ is unsubstituted pyridinyl.

26. The compound of any one of embodiments 23 to 25, or a pharmacologically acceptable salt thereof or a solvate of them, wherein the $R^5$ pyridinyl is 4-pyridyl.

27. The compound of any one of embodiments 23 to 25, or a pharmacologically acceptable salt thereof or a solvate of them, wherein the $R^5$ pyridinyl is 3-pyridyl.

28. The compound of any one of embodiments 23 to 25, or a pharmacologically acceptable salt thereof or a solvate of them, wherein the $R^5$ pyridinyl is 2-pyridyl.

29. The compound of any one of embodiments 1 to 28, or a pharmacologically acceptable salt thereof or a solvate of them, wherein m is 2.

30. The compound of any one of embodiments 1 to 28, or a pharmacologically acceptable salt thereof or a solvate of them, wherein n is 1.

31. The compound of embodiment 2, or a pharmacologically acceptable salt thereof or a solvate of them, wherein:
$R^1$ is

[Chem. 66]

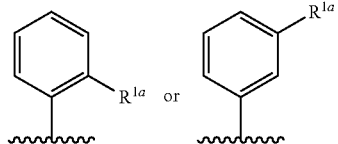

wherein $R^{1a}$ is $NO_2$ or $NH_2$;

$R^2$, $R^3$, and R are $CH_3$;

$R^5$ is unsubstituted phenyl or unsubstituted pyridinyl;

m is 2; and n is 1.

32. The compound of embodiment 31, or a pharmacologically acceptable salt thereof or a solvate of them, wherein $R^5$ is unsubstituted 4-pyridyl.

33. The compound of embodiment 1, or a pharmacologically acceptable salt thereof or a solvate of them, wherein the compound is

[Chem. 67]

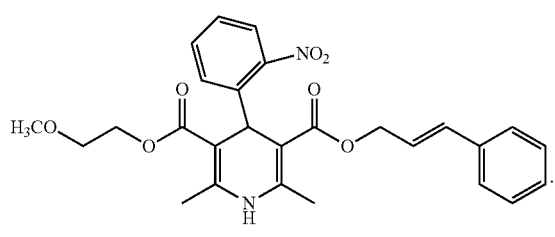 [SMILES: COCCOC(=O)C1=C(C)NC(C)=C(C(=O)OC/C=C/c2ccccc2)C1c1ccccc1[N+](=O)[O-]]

34. The compound of embodiment 1, or a pharmacologically acceptable salt thereof or a solvate of them, wherein the compound is

[Chem. 68]

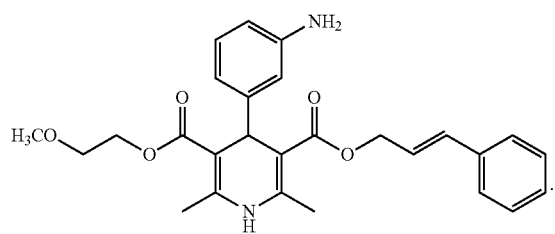

35. The compound of embodiment 1, or a pharmacologically acceptable salt thereof or a solvate of them, wherein the compound is

[Chem. 69]

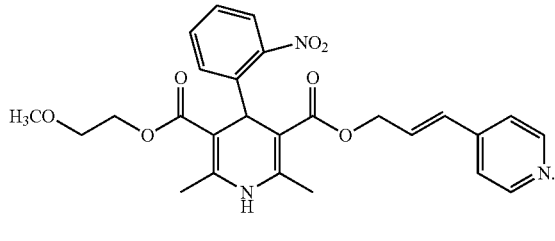 [SMILES: COCCOC(=O)C1=C(C)NC(C)=C(C(=O)OC/C=C/c2ccncc2)C1c1ccccc1[N+](=O)[O-]]

36. The compound of embodiment 1, or a pharmacologically acceptable salt thereof or a solvate of them, wherein the compound is

[Chem. 70]

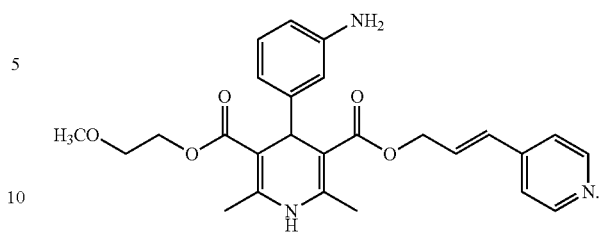

37. The compound of embodiment 1, or a pharmacologically acceptable salt thereof or a solvate of them, wherein the compound is

[Chem. 71]

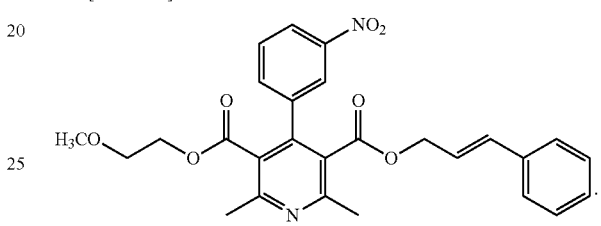

38. The compound of embodiment 1, or a pharmacologically acceptable salt thereof or a solvate of them, wherein the compound is

[Chem. 72]

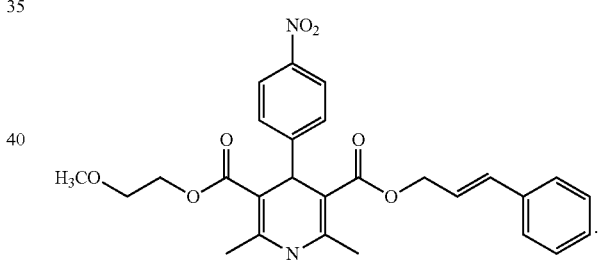

39. The compound of embodiment 1, or a pharmacologically acceptable salt thereof or a solvate of them, wherein the compound is

[Chem. 73]

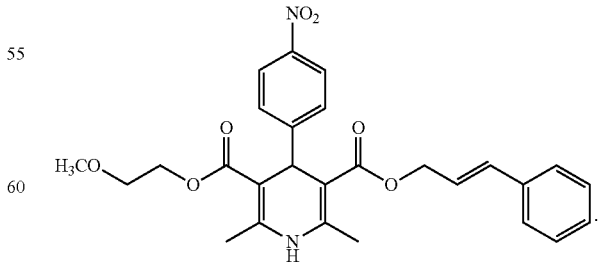

40. The compound of embodiment 1, or a pharmacologically acceptable salt thereof or a solvate of them, wherein the compound is

[Chem. 74]

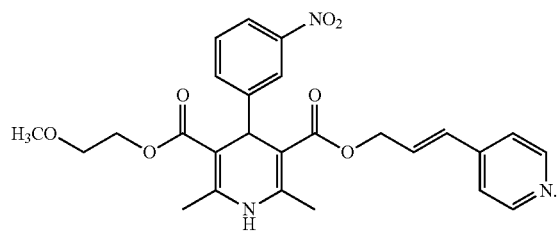

41. The compound of embodiment 1, or a pharmacologically acceptable salt thereof or a solvate of them, wherein the compound is

[Chem. 75]

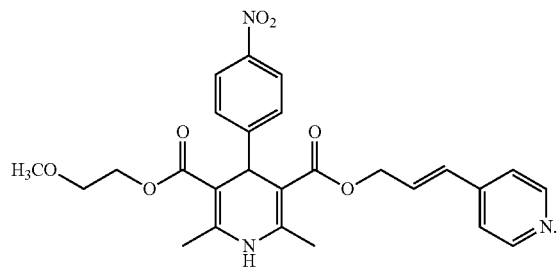

42. A compound represented by Formula (1) below or a pharmacologically acceptable salt thereof or a solvate of them:

[Chem. 76]

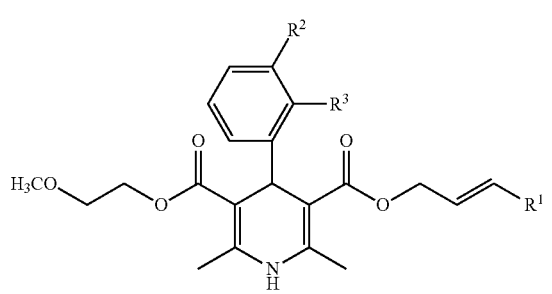

(1)

wherein in Formula (1), R represents a phenyl group, 2-pyridyl group, 3-pyridyl group or 4-pyridyl group, $R^2$ represents a hydrogen atom or amino group, $R^3$ represents a hydrogen atom or nitro group, and if $R^2$ is a hydrogen atom then $R^3$ is a nitro group, and, if $R^2$ is an amino group then $R^3$ is a hydrogen atom.

43. The compound of embodiment 42, wherein in Formula (1),
   (a) $R^1$ represents a phenyl group, 2-pyridyl group, 3-pyridyl group or 4-pyridyl group, $R^2$ represents a hydrogen atom, and $R^3$ represents a nitro group, or,
   (b) $R^1$ represents a 2-pyridyl group, 3-pyridyl group or 4-pyridyl group, $R^2$ represents an amino group, and $R^3$ represents a hydrogen atom.

44. The compound of embodiment 42, wherein in Formula (1). $R^1$ represents a phenyl group, 2-pyridyl group, 3-pyridyl group or 4-pyridyl group, $R^2$ represents an amino group, and $R^3$ represents a hydrogen atom.

45. A compound represented by Formula (2) below or a pharmacologically acceptable salt thereof or a solvate of them:

[Chem. 77]

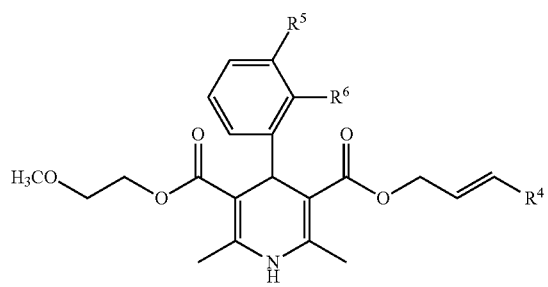

(2)

wherein in Formula (2), $R^4$ represents a phenyl group, 2-pyridyl group, 3-pyridyl group or 4-pyridyl group, $R^5$ represents an amino group, and $R^6$ represents a hydrogen atom.

46. A compound of Formula (A):

[Chem. 78]

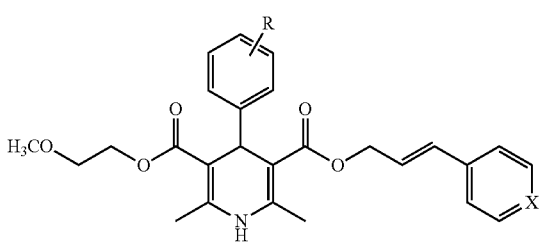

(A)

or a pharmacologically acceptable salt thereof or a solvate of them, wherein:
   (a) R is $NO_2$ or $NH_2$, wherein R is at the 2-position, 3-position, or 4-position of the phenyl ring; and
   (b) X is CH or N,
provided that the compound is other than

[Chem. 79]

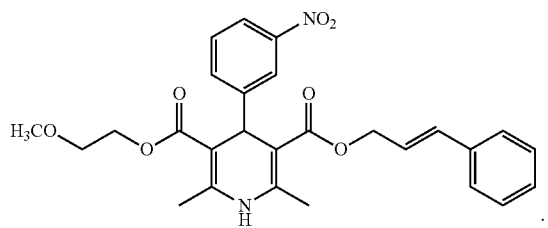 [SMILES: COCCOC(=O)C1=C(C)NC(C)=C(C(=O)OC/C=C/c2ccncc2)C1c1cccc(N)c1]

47. A compound of Formula (B):

[Chem. 80]

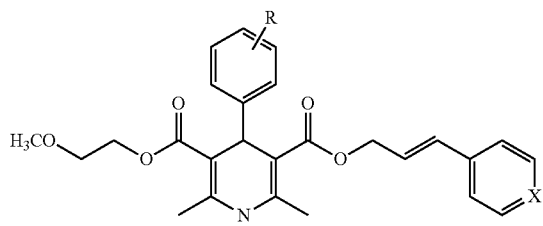

(B)

or a pharmacologically acceptable salt thereof or a solvate of them, wherein:
(a) R is NO$_2$ or NH$_2$, wherein R is at the 2-position, 3-position, or 4-position of the phenyl ring; and
(b) X represents CH or N.

48. The compound, pharmacologically acceptable salt or solvate of any one of embodiments 1 to 47, which is in the form of a pharmacologically acceptable salt.

49. The compound, pharmacologically acceptable salt or solvate of embodiment 48, wherein the pharmacologically acceptable salt is a hydrochlorate, sulfate, hydrobromate, hydroiodide, phosphate, nitrate, benzoate, methanesulfonate, 2-hydroxyethanesulfonate, p-toluenesulfonate, acetate, propanoate, oxalate, malonate, succinate, glutarate, adipate, tartarate, maleate, fumarate, malate, or mandelate.

50. The compound, pharmacologically acceptable salt or solvate of any one of embodiments 1 to 47, which is in the form of a free base.

51. The compound, pharmacologically acceptable salt or solvate of any one of embodiments 1 to 50, which is not in the form of a solvate.

52. The compound, pharmacologically acceptable salt or solvate of any one of embodiments 1 to 51, which has mitochondrial division inhibitory activity.

53. The compound, pharmacologically acceptable salt or solvate of embodiment 52 whose mitochondrial division inhibitory activity is at least 50% of the mitochondrial division inhibitory activity of cilnidipine, e.g., as determined by the evaluation system of Exemplary Experiment 1.

54. The compound, pharmacologically acceptable salt or solvate of embodiment 52 whose mitochondrial division inhibitory activity is at least 75% of the mitochondrial division inhibitory activity of cilnidipine, e.g., as determined by the evaluation system of Exemplary Experiment 1.

55. The compound, pharmacologically acceptable salt or solvate of embodiment 52 whose mitochondrial division inhibitory activity is at least 90% of the mitochondrial division inhibitory activity of cilnidipine, e.g., as determined by the evaluation system of Exemplary Experiment 1.

56. The compound, pharmacologically acceptable salt or solvate of embodiment 52 whose mitochondrial division inhibitory activity is at least equal to the mitochondrial division inhibitory activity of cilnidipine, e.g., as determined by the evaluation system of Exemplary Experiment 1.

57. The compound, pharmacologically acceptable salt or solvate of any one of embodiments 52 to 56 whose mitochondrial division inhibitory activity is up to 300% of the mitochondrial division inhibitory activity of cilnidipine, e.g., as determined by the evaluation system of Exemplary Experiment 1.

58. The compound, pharmacologically acceptable salt or solvate of any one of embodiments 52 to 56 whose mitochondrial division inhibitory activity is up to 200% of the mitochondrial division inhibitory activity of cilnidipine, e.g., as determined by the evaluation system of Exemplary Experiment 1.

59. The compound, pharmacologically acceptable salt or solvate of any one of embodiments 52 to 56 whose mitochondrial division inhibitory activity is up to 150% of the mitochondrial division inhibitory activity of cilnidipine, e.g., as determined by the evaluation system of Exemplary Experiment 1.

60. The compound, pharmacologically acceptable salt or solvate of any one of embodiments 1 to 59 that has reduced calcium channel blocking activity as compared to cilnidipine.

61. The compound, pharmacologically acceptable salt or solvate of embodiment 60 whose calcium channel blocking activity is no greater than 75% of the calcium channel blocking activity of cilnidipine, e.g., as determined by the evaluation system of Exemplary Experiment 12.

62. The compound, pharmacologically acceptable salt or solvate of embodiment 60 whose calcium channel blocking activity is no greater than 50% of the calcium channel blocking activity of cilnidipine, e.g., as determined by the evaluation system of Exemplary Experiment 12.

63. The compound, pharmacologically acceptable salt or solvate of embodiment 60 whose calcium channel blocking activity is no greater than 25% of the calcium channel blocking activity of cilnidipine, e.g., as determined by the evaluation system of Exemplary Experiment 12.

64. The compound, pharmacologically acceptable salt or solvate of embodiment 60 whose calcium channel blocking activity is no greater than 10% of the calcium channel blocking activity of cilnidipine, e.g., as determined by the evaluation system of Exemplary Experiment 12.

65. A pharmaceutical composition comprising the compound, pharmacologically acceptable salt or solvate of any one of embodiments 1 to 64 and one or more pharmaceutically acceptable carriers.

66. The pharmaceutical composition of embodiment 65, wherein the one or more pharmaceutically acceptable carriers comprise a base.

67. The pharmaceutical composition of embodiment 66, wherein the base comprises purified water, titanium oxide, carnauba wax, synthetic squalane, crotamiton, or gelatin.

68. The pharmaceutical composition of any one of embodiments 65 to 67, wherein the one or more pharmaceutically acceptable carriers comprise a binder.

69. The pharmaceutical composition of embodiment 68, wherein the binder comprises ethyl cellulose, glycerin or methacrylic acid copolymer S.

70. The pharmaceutical composition of any one of embodiments 65 to 69, wherein the one or more pharmaceutically acceptable carriers comprise an excipient.

71. The pharmaceutical composition of embodiment 70, wherein the excipient is crystalline cellulose, croscarmellose sodium, magnesium stearate, and hypromellose; stabilizers such as gum arabic, magnesium aluminometasilicate, povidone, benzyl alcohol, sodium acetate, or magnesium stearate.

72. The pharmaceutical composition of any one of embodiments 65 to 71, wherein the one or more pharmaceutically acceptable carriers comprise a plasticizer.

73. The pharmaceutical composition of embodiment 72, wherein the plasticizer is Macrogol 400 or Macrogol 6000.

74. The pharmaceutical composition of any one of embodiments 65 to 73, wherein the one or more pharmaceutically acceptable carriers comprise a solubilizer.

75. The pharmaceutical composition of embodiment 74, wherein the solubilizer is benzyl benzoate and benzyl alcohol.

76. The pharmaceutical composition of any one of embodiments 65 to 75, which does not include an active pharmaceutical ingredient other than the compound, pharmacologically acceptable salt or solvate of any one of embodiments 1 to 64.

77. The pharmaceutical composition of any one of embodiments 65 to 75, which does not substantially include cilnidipine.

78. The pharmaceutical composition of any one of embodiments 65 to 77, in which the compound, pharmacologically acceptable salt or solvate of any one of embodiments 1 to 64 is at least 90% pure.

79. The pharmaceutical composition of any one of embodiments 65 to 77, in which the compound, pharmacologically acceptable salt or solvate of any one of embodiments 1 to 64 is at least 95% pure.

80. The pharmaceutical composition of any one of embodiments 65 to 79, which is an oral dosage form.

81. The pharmaceutical composition of embodiment 80, which is in the form of a pill, tablet, capsule, elixir or microcapsule.

82. The pharmaceutical composition of any one of embodiments 65 to 79, which comprises at least 1 mg of the compound, pharmacologically acceptable salt or solvate of any one of embodiments 1 to 64.

83. The pharmaceutical composition of any one of embodiments 65 to 79, which comprises at least 2 mg of the compound, pharmacologically acceptable salt or solvate of any one of embodiments 1 to 64.

84. The pharmaceutical composition of any one of embodiments 65 to 79, which comprises at least 5 mg of the compound, pharmacologically acceptable salt or solvate of any one of embodiments 1 to 64.

85. The pharmaceutical composition of any one of embodiments 65 to 79, which comprises at least 10 mg of the compound, pharmacologically acceptable salt or solvate of any one of embodiments 1 to 64.

86. The pharmaceutical composition of any one of embodiments 65 to 85, which comprises up to 20 mg of the compound, pharmacologically acceptable salt or solvate of any one of embodiments 1 to 64.

87. The pharmaceutical composition of any one of embodiments 65 to 85, which comprises up to 25 mg of the compound, pharmacologically acceptable salt or solvate of any one of embodiments 1 to 64.

88. The pharmaceutical composition of any one of embodiments 65 to 85, which comprises up to 50 mg of the compound, pharmacologically acceptable salt or solvate of any one of embodiments 1 to 64.

89. A dynamin-related protein 1 (Drp1)-filamin complex formation inhibitor that contains, as an active ingredient, the compound, pharmacologically acceptable salt or solvate of any one of embodiments 1 to 64.

90. The compound, pharmacologically acceptable salt or solvate of any one of embodiments 1 to 64, the pharmaceutical composition of any one of embodiments 65 to 88, or the (Drp1)-filamin complex formation inhibitor of embodiment 89, for use as a prophylactic or therapeutic agent for disease caused by Drp1 dysfunction.

91. The compound, pharmacologically acceptable salt or solvate of any one of embodiments 1 to 64, the pharmaceutical composition of any one of embodiments 65 to 88, or the (Drp1)-filamin complex formation inhibitor of embodiment 89, for use as a prophylactic or therapeutic agent for chronic heart failure.

92. The compound, pharmacologically acceptable salt or solvate of any one of embodiments 1 to 64, the pharmaceutical composition of any one of embodiments 65 to 88, or the (Drp1)-filamin complex formation inhibitor of embodiment 89, for use as a prophylactic or therapeutic agent for amyotrophic lateral sclerosis.

93. The compound, pharmacologically acceptable salt or solvate of any one of embodiments 1 to 64, the pharmaceutical composition of any one of embodiments 65 to 88, or the (Drp1)-filamin complex formation inhibitor of embodiment 89, for use as a prophylactic or therapeutic agent for inflammatory bowel disease.

94. The compound, pharmacologically acceptable salt or solvate of any one of embodiments 1 to 64, the pharmaceutical composition of any one of embodiments 65 to 88, or the (Drp1)-filamin complex formation inhibitor of embodiment 89, for use as a prophylactic or therapeutic agent for diabetes, optionally:

(a) type 1 diabetes; or (b) type 2 diabetes.

95. A method of treating a disease caused by Drp1 dysfunction, comprising administering to a subject in need thereof a therapeutically effective amount of a compound, pharmacologically acceptable salt or solvate of any one of embodiments 1 to 64, the pharmaceutical composition of any one of embodiments 65 to 88, or the (Drp1)-filamin complex formation inhibitor of embodiment 89.

96. A method of treating chronic heart failure, comprising administering to a subject in need thereof a therapeutically effective amount of a compound, pharmacologically acceptable salt or solvate of any one of embodiments 1 to 64, the pharmaceutical composition of any one of embodiments 65 to 88, or the (Drp1)-filamin complex formation inhibitor of embodiment 89.

97. A method of treating amyotrophic lateral sclerosis, comprising administering to a subject in need thereof a therapeutically effective amount of a compound, pharmacologically acceptable salt or solvate of any one of embodiments 1 to 64, the pharmaceutical composition of any one of embodiments 65 to 88, or the (Drp1)-filamin complex formation inhibitor of embodiment 89.

98. A method of treating inflammatory bowel disease, comprising administering to a subject in need thereof a therapeutically effective amount of a compound, pharmacologically acceptable salt or solvate of any one of embodiments 1 to 64, the pharmaceutical composition of any one of embodiments 65 to 88, or the (Drp1)-filamin complex formation inhibitor of embodiment 89.

99. A method of treating diabetes, e.g., type 1 diabetes or type 2 diabetes, comprising administering to a subject in need thereof a therapeutically effective amount of a compound, pharmacologically acceptable salt or solvate of any one of embodiments 1 to 64, the pharmaceutical composition of any one of embodiments 65 to 88, or the (Drp1)-filamin complex formation inhibitor of embodiment 89.

1'. A dynamin-related protein 1 (Drp1)-filamin complex formation inhibitor that contains, as an active ingredient, a compound represented by formula (1) below or a pharmacologically acceptable salt thereof or a solvate of them:

[Chem. 81]

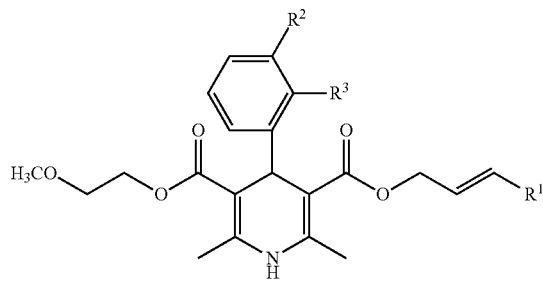

(1)

wherein in formula (1), $R^1$ represents a phenyl group, 2-pyridyl group, 3-pyridyl group or 4-pyridyl group, $R^2$ represents a hydrogen atom or amino group, $R^3$ represents a hydrogen atom or nitro group, and if $R^2$ is a hydrogen atom then $R^3$ is a nitro group, and, if $R^2$ is an amino group then $R^3$ is a hydrogen atom.

2'. The Drp1-filamin complex formation inhibitor according to embodiment 1', wherein in formula (1), $R^1$ represents a phenyl group, 2-pyridyl group, 3-pyridyl group or 4-pyridyl group, $R^2$ represents a hydrogen atom, and $R^3$ represents a nitro group, or, $R^1$ represents a 2-pyridyl group, 3-pyridyl group or 4-pyridyl group, $R^2$ represents an amino group, and $R^3$ represents a hydrogen atom.

3'. Drp1-filamin complex formation inhibitor according to embodiment 1', wherein in formula (1), $R^1$ represents a phenyl group, 2-pyridyl group, 3-pyridyl group or 4-pyridyl group, $R^2$ represents an amino group, and $R^3$ represents a hydrogen atom.

4'. The Drp1-filamin complex formation inhibitor according to any one of embodiments 1' to 3', being a prophylactic or therapeutic agent for disease caused by Drp1 dysfunction.

5'. The Drp1-filamin complex formation inhibitor according to embodiment 4', wherein the disease is chronic heart failure, amyotrophic lateral sclerosis, inflammatory bowel disease or type 2 diabetes.

6'. A pharmaceutical composition for inhibiting Drp1-filamin complex formation, comprising the Drp1-filamin complex formation inhibitor described in any one of embodiments 1' to 5', and a pharmaceutically acceptable carrier.

7'. A compound represented by formula (2) below or a pharmacologically acceptable salt thereof or a solvate of them:

[Chem. 82]

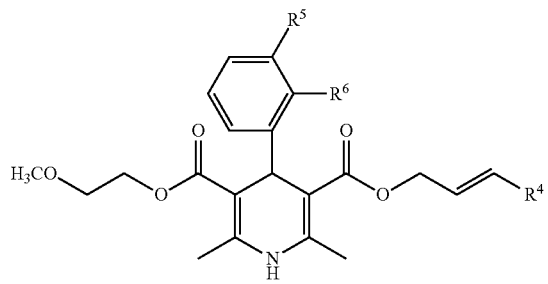

(2)

wherein in formula (2), $R^4$ represents a phenyl group, 2-pyridyl group, 3-pyridyl group or 4-pyridyl group, $R^5$ represents an amino group, and $R^6$ represents a hydrogen atom.

The invention claimed is:

1. A compound of Formula (I):

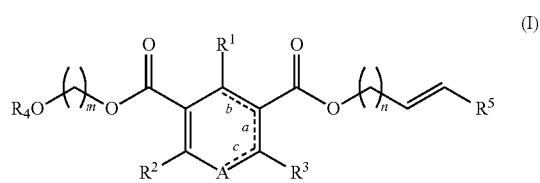

(I)

or a pharmacologically acceptable salt thereof or a solvate of them, wherein:

$R^1$ is phenyl substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl, provided that at least one substituent is $NO_2$ or $NH_2$;

$R^2$ is H, $C_1$-$C_6$ alkyl, $C_1$-$C_6$ haloalkyl, or $C_1$-$C_6$ alkoxyalkyl;

$R^3$ is H, $C_1$-$C_6$ alkyl, $C_1$-$C_6$ haloalkyl, or $C_1$-$C_6$ alkoxyalkyl;

$R^4$ is $C_1$-$C_6$ alkyl or $C_1$-$C_6$ haloalkyl;

$R^5$ is phenyl or pyridinyl, wherein the phenyl or pyridinyl is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl;

either (i) bond a is present and bonds b and c are absent or (ii) bonds b and c are present and bond a is absent;

A is NH when bond a is present and N when bonds b and c are present;

m is an integer from 1 to 4; and n is an integer from 1 to 3;

provided that the compound is other than

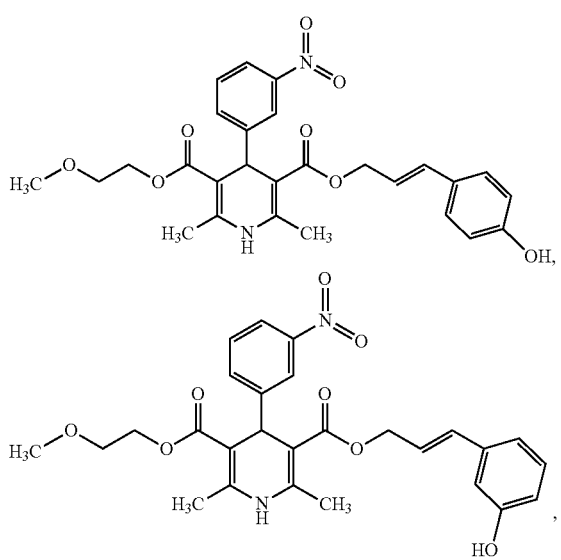

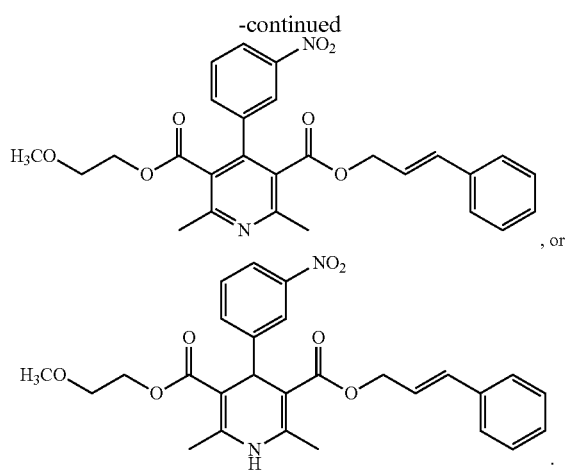, or

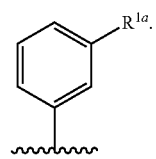

2. The compound of claim 1, or a pharmacologically acceptable salt thereof or a solvate of them, having the structure of Formula (Ia):

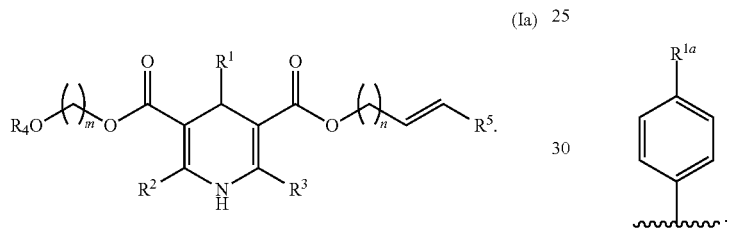

(Ia)

3. The compound of claim 1, or a pharmacologically acceptable salt thereof or a solvate of them, having the structure of Formula (Ib):

(Ib)

4. The compound of claim 1 or a pharmacologically acceptable salt thereof or a solvate of them, wherein $R^1$ is:

wherein $R^{1a}$ is $NO_2$ or $NH_2$, and $R^{1b}$ and $R^{1c}$ are each independently H, $NO_2$, $NH_2$, OH, $C_1$-$C_6$ alkyl, $C_1$-$C_6$ haloalkyl, or $C_1$-$C_6$ alkoxyalkyl.

5. The compound of claim 4 or a pharmacologically acceptable salt thereof or a solvate of them, wherein $R^{1b}$ and $R^{1c}$ are each independently H, $NO_2$, $NH_2$, OH, $C_1$-$C_3$ alkyl, $C_1$-$C_3$ haloalkyl, or $C_1$-$C_3$ alkoxyalkyl.

6. The compound of claim 4 or a pharmacologically acceptable salt thereof or a solvate of them, wherein $R^1$ is 7. The compound of claim 4 or a pharmacologically acceptable salt thereof or a solvate of them, wherein $R^1$ is 8. The compound of claim 4 or a pharmacologically acceptable salt thereof or a solvate of them, wherein $R^1$ is 9. The compound of claim 4, or a pharmacologically acceptable salt thereof or a solvate of them, wherein $R^{1a}$ is $NO_2$.

10. The compound of claim 4, or a pharmacologically acceptable salt thereof or a solvate of them, wherein $R^{1a}$ is $NH_2$.

11. The compound of claim 1, or a pharmacologically acceptable salt thereof or a solvate of them, wherein $R^2$ is H, $C_1$-$C_3$ alkyl, $C_1$-$C_3$ haloalkyl, or $C_1$-$C_3$ alkoxyalkyl.

12. The compound of claim 11, or a pharmacologically acceptable salt thereof or a solvate of them, wherein $R^2$ is $C_1$-$C_3$ alkyl.

13. The compound of claim 12, or a pharmacologically acceptable salt thereof or a solvate of them, wherein $R^2$ is $CH_3$.

14. The compound of claim 1, or a pharmacologically acceptable salt thereof or a solvate of them, wherein $R^3$ is H, $C_1$-$C_3$ alkyl, $C_1$-$C_3$ haloalkyl, or $C_1$-$C_3$ alkoxyalkyl.

15. The compound of claim 14, or a pharmacologically acceptable salt thereof or a solvate of them, wherein $R^3$ is $C_1$-$C_3$ alkyl.

16. The compound of claim 15, or a pharmacologically acceptable salt thereof or a solvate of them, wherein $R^3$ is $CH_3$.

17. The compound of claim 1, or a pharmacologically acceptable salt thereof or a solvate of them, wherein $R^4$ is $C_1$-$C_3$ alkyl or $C_1$-$C_3$ haloalkyl.

18. The compound of claim 17, or a pharmacologically acceptable salt thereof or a solvate of them, wherein $R^4$ is $C_1$-$C_3$ alkyl.

19. The compound of claim 18, or a pharmacologically acceptable salt thereof or a solvate of them, wherein $R^4$ is $CH_3$.

20. The compound of claim 1, or a pharmacologically acceptable salt thereof or a solvate of them, wherein $R^5$ is phenyl which is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl.

21. The compound of claim 20, or a pharmacologically acceptable salt thereof or a solvate of them, wherein $R^5$ is phenyl which is unsubstituted or substituted with one to three substituents each of which is independently $NO_2$, $NH_2$, OH, $C_1$-$C_3$ alkyl, $C_1$-$C_3$ haloalkyl, or $C_1$-$C_3$ alkoxyalkyl.

22. The compound of claim 20, or a pharmacologically acceptable salt thereof or a solvate of them, wherein $R^5$ is unsubstituted phenyl.

23. The compound of claim 1, or a pharmacologically acceptable salt thereof or a solvate of them, wherein $R^5$ is pyridinyl which is unsubstituted or substituted with one to three substituents each of which is independently $NO_2$, $NH_2$, OH, $C_1$-$C_6$ alkyl, $C_1$-$C_6$ haloalkyl, or $C_1$-$C_6$ alkoxyalkyl.

24. The compound of claim 23, or a pharmacologically acceptable salt thereof or a solvate of them, wherein $R^5$ is pyridinyl which is unsubstituted or substituted with one to three substituents each of which is independently $NO_2$, $NH_2$, OH, $C_1$-$C_3$ alkyl, $C_1$-$C_3$ haloalkyl, or $C_1$-$C_3$ alkoxyalkyl.

25. The compound of claim 23, or a pharmacologically acceptable salt thereof or a solvate of them, wherein $R^5$ is unsubstituted pyridinyl.

26. The compound of claim 23, or a pharmacologically acceptable salt thereof or a solvate of them, wherein the $R^5$ pyridinyl is 4-pyridyl.

27. The compound of claim 23, or a pharmacologically acceptable salt thereof or a solvate of them, wherein the $R^5$ pyridinyl is 3-pyridyl.

28. The compound of claim 23, or a pharmacologically acceptable salt thereof or a solvate of them, wherein the $R^5$ pyridinyl is 2-pyridyl.

29. The compound of claim 1, or a pharmacologically acceptable salt thereof or a solvate of them, wherein m is 2.

30. The compound of claim 1, or a pharmacologically acceptable salt thereof or a solvate of them, wherein n is 1.

31. The compound of claim 2, or a pharmacologically acceptable salt thereof or a solvate of them, wherein:
$R^1$ is

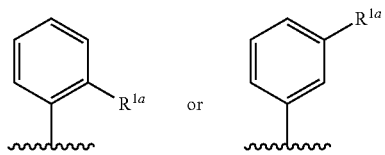

wherein $R^{1a}$ is $NO_2$ or $NH_2$;
$R^2$, $R^3$, and $R^4$ are $CH_3$;
$R^5$ is unsubstituted phenyl or unsubstituted pyridinyl;
m is 2; and
n is 1.

32. The compound of claim 31, or a pharmacologically acceptable salt thereof or a solvate of them, wherein $R^5$ is unsubstituted 4-pyridyl.

33. The compound of claim 1, or a pharmacologically acceptable salt thereof or a solvate of them, wherein the compound is

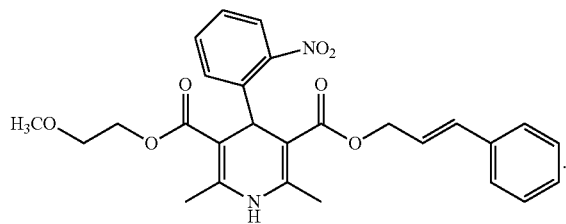

34. The compound of claim 1, or a pharmacologically acceptable salt thereof or a solvate of them, wherein the compound is

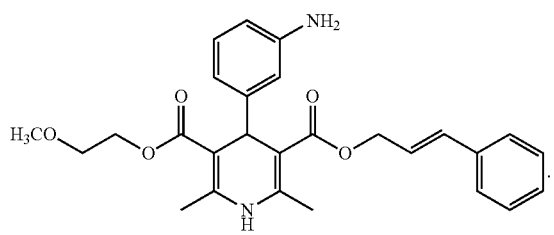

35. The compound of claim 1, or a pharmacologically acceptable salt thereof or a solvate of them, wherein the compound is

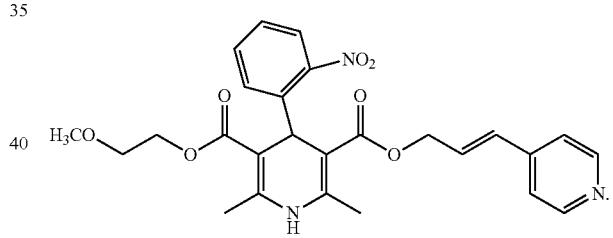

36. The compound of claim 1, or a pharmacologically acceptable salt thereof or a solvate of them, wherein the compound is

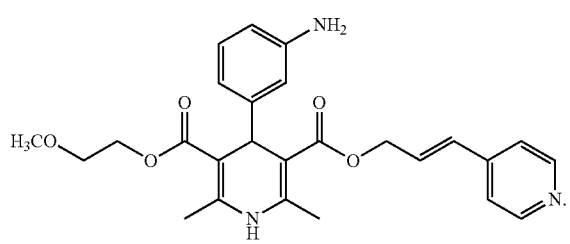

37. The compound of claim 1, or a pharmacologically acceptable salt thereof or a solvate of them, wherein the compound is

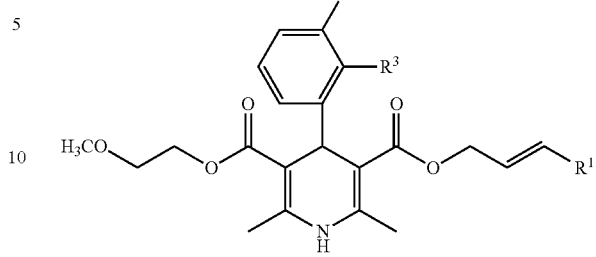

(1)

38. The compound of claim 1, or a pharmacologically acceptable salt thereof or a solvate of them, wherein the compound is

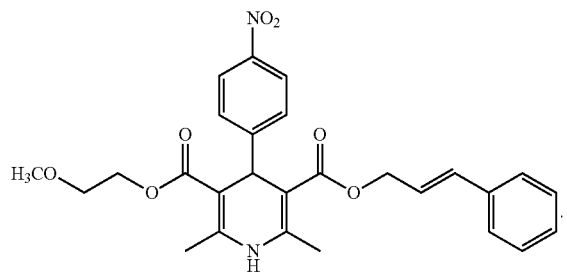 [SMILES: COCCOC(=O)C1=C(C)NC(C)=C(C(=O)OC/C=C/c2ccccc2)C1c1ccc([N+](=O)[O-])cc1]

wherein in Formula (1), $R^1$ represents a phenyl group, 2-pyridyl group, 3-pyridyl group or 4-pyridyl group, $R^2$ represents a hydrogen atom or amino group, $R^3$ represents a hydrogen atom or nitro group, and if $R^2$ is a hydrogen atom then $R^3$ is a nitro group, and, if $R^2$ is an amino group then $R^3$ is a hydrogen atom.

42. The compound of claim 41, wherein in Formula (1), (a) $R^1$ represents a phenyl group, 2-pyridyl group, 3-pyridyl group or 4-pyridyl group, $R^2$ represents a hydrogen atom, and $R^3$ represents a nitro group, or, (b) $R^1$ represents a 2-pyridyl group, 3-pyridyl group or 4-pyridyl group, $R^2$ represents an amino group, and $R^3$ represents a hydrogen atom.

39. The compound of claim 1, or a pharmacologically acceptable salt thereof or a solvate of them, wherein the compound is

43. The compound of claim 41, wherein in Formula (1), $R^1$ represents a phenyl group, 2-pyridyl group, 3-pyridyl group or 4-pyridyl group, $R^2$ represents an amino group, and $R^3$ represents a hydrogen atom.

44. A compound represented by Formula (2) below or a pharmacologically acceptable salt thereof or a solvate of them:

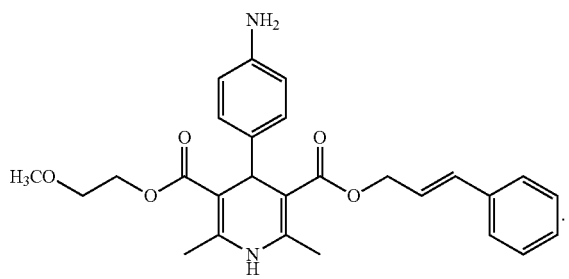

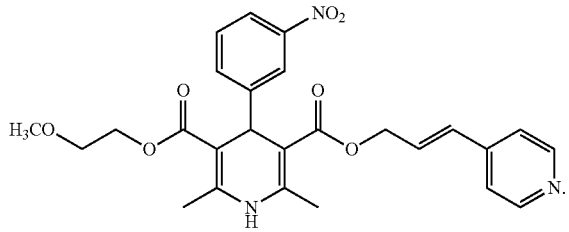

40. The compound of claim 1, or a pharmacologically acceptable salt thereof or a solvate of them, wherein the compound is

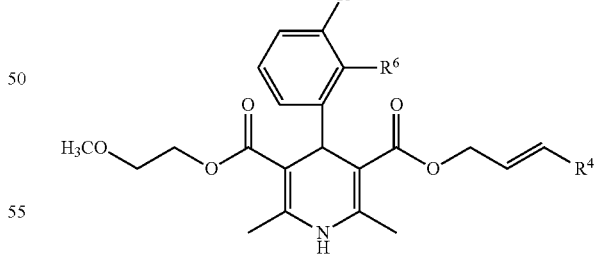

(2)

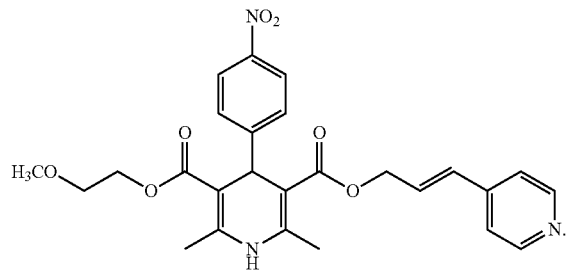

41. A compound represented by Formula (1) below or a pharmacologically acceptable salt thereof or a solvate of them:

wherein in Formula (2), $R^4$ represents a phenyl group, 2-pyridyl group, 3-pyridyl group or 4-pyridyl group, $R^5$ represents an amino group, and $R^6$ represents a hydrogen atom.

45. A compound of Formula (A):

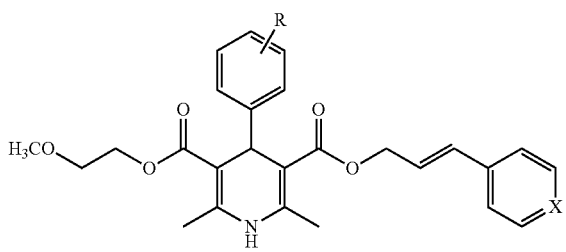

or a pharmacologically acceptable salt thereof or a solvate of them, wherein:
(a) R is $NO_2$ or $NH_2$, wherein R is at the 2-position, 3-position, or 4-position of the phenyl ring; and
(b) X is CH or N,
provided that the compound is other than

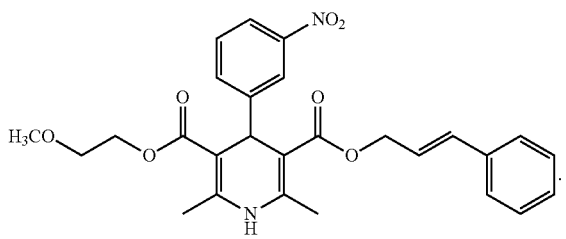 [SMILES: COCCOC(=O)C1=C(C)NC(C)=C(C(=O)OC/C=C/c2ccncc2)C1c1cccc([N+](=O)[O-])c1]

46. A compound of Formula (B):

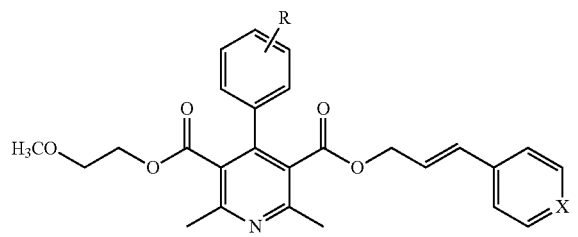

or a pharmacologically acceptable salt thereof or a solvate of them, wherein:
(a) R is $NO_2$ or $NH_2$, wherein R is at the 2-position, 3-position, or 4-position of the phenyl ring; and
(b) X represents CH or N,
provided that the compound is other than:

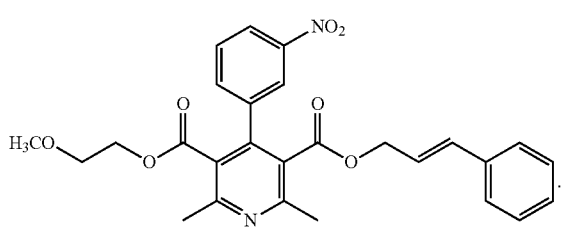 [SMILES: COCCOC(=O)c1c(C)nc(C)c(C(=O)OC/C=C/c2ccccc2)c1-c1cccc([N+](=O)[O-])c1]

47. The compound, pharmacologically acceptable salt or solvate of claim 1, which is in the form of a pharmacologically acceptable salt.

48. The compound, pharmacologically acceptable salt or solvate of claim 47, wherein the pharmacologically acceptable salt is a hydrochlorate, sulfate, hydrobromate, hydroiodide, phosphate, nitrate, benzoate, methanesulfonate, 2-hydroxyethanesulfonate, p-toluenesulfonate, acetate, propanoate, oxalate, malonate, succinate, glutarate, adipate, tartarate, maleate, fumarate, malate, or mandelate.

49. The compound, pharmacologically acceptable salt or solvate of claim 1, which is in the form of a free base.

50. The compound, pharmacologically acceptable salt or solvate of claim 1, which is not in the form of a solvate.

51. The compound, pharmacologically acceptable salt or solvate of claim 1, which has mitochondrial division inhibitory activity.

52. The compound, pharmacologically acceptable salt or solvate of claim 51 whose mitochondrial division inhibitory activity is at least 50% of the mitochondrial division inhibitory activity of cilnidipine, as determined by the evaluation system of Exemplary Experiment 1.

53. The compound, pharmacologically acceptable salt or solvate of claim 51 whose mitochondrial division inhibitory activity is at least 75% of the mitochondrial division inhibitory activity of cilnidipine, as determined by the evaluation system of Exemplary Experiment 1.

54. The compound, pharmacologically acceptable salt or solvate of claim 51 whose mitochondrial division inhibitory activity is at least 90% of the mitochondrial division inhibitory activity of cilnidipine, as determined by the evaluation system of Exemplary Experiment 1.

55. The compound, pharmacologically acceptable salt or solvate of claim 51 whose mitochondrial division inhibitory activity is at least equal to the mitochondrial division inhibitory activity of cilnidipine, as determined by the evaluation system of Exemplary Experiment 1.

56. The compound, pharmacologically acceptable salt or solvate of claim 51 whose mitochondrial division inhibitory activity is up to 300% of the mitochondrial division inhibitory activity of cilnidipine, as determined by the evaluation system of Exemplary Experiment 1.

57. The compound, pharmacologically acceptable salt or solvate of claim 51 whose mitochondrial division inhibitory activity is up to 200% of the mitochondrial division inhibitory activity of cilnidipine, as determined by the evaluation system of Exemplary Experiment 1.

58. The compound, pharmacologically acceptable salt or solvate of claim 51 whose mitochondrial division inhibitory activity is up to 150% of the mitochondrial division inhibitory activity of cilnidipine, as determined by the evaluation system of Exemplary Experiment 1.

59. The compound, pharmacologically acceptable salt or solvate of claim 1 that has reduced calcium channel blocking activity as compared to cilnidipine.

60. The compound, pharmacologically acceptable salt or solvate of claim 59 whose calcium channel blocking activity is no greater than 75% of the calcium channel blocking activity of cilnidipine, as determined by the evaluation system of Exemplary Experiment 12.

61. The compound, pharmacologically acceptable salt or solvate of claim 59 whose calcium channel blocking activity is no greater than 50% of the calcium channel blocking activity of cilnidipine, as determined by the evaluation system of Exemplary Experiment 12.

62. The compound, pharmacologically acceptable salt or solvate of claim 59 whose calcium channel blocking activity is no greater than 25% of the calcium channel blocking activity of cilnidipine, as determined by the evaluation system of Exemplary Experiment 12.

63. The compound, pharmacologically acceptable salt or solvate of claim 59 whose calcium channel blocking activity is no greater than 10% of the calcium channel blocking activity of cilnidipine, as determined by the evaluation system of Exemplary Experiment 12.

64. A pharmaceutical composition comprising the compound, pharmacologically acceptable salt or solvate of claim 1 and one or more pharmaceutically acceptable carriers.

65. The pharmaceutical composition of claim 64, wherein the one or more pharmaceutically acceptable carriers comprise a base.

66. The pharmaceutical composition of claim 65, wherein the base comprises purified water, titanium oxide, carnauba wax, synthetic squalane, crotamiton, or gelatin.

67. The pharmaceutical composition of claim 64, wherein the one or more pharmaceutically acceptable carriers comprise a binder.

68. The pharmaceutical composition of claim 67, wherein the binder comprises ethyl cellulose, glycerin or methacrylic acid copolymer S.

69. The pharmaceutical composition of claim 64, wherein the one or more pharmaceutically acceptable carriers comprise an excipient.

70. The pharmaceutical composition of claim 69, wherein the excipient is crystalline cellulose, croscarmellose sodium, magnesium stearate, and hypromellose; stabilizers such as gum arabic, magnesium aluminometasilicate, povidone, benzyl alcohol, sodium acetate, or magnesium stearate.

71. The pharmaceutical composition of claim 64, wherein the one or more pharmaceutically acceptable carriers comprise a plasticizer.

72. The pharmaceutical composition of claim 71, wherein the plasticizer is Macrogol 400 or Macrogol 6000.

73. The pharmaceutical composition of claim 64, wherein the one or more pharmaceutically acceptable carriers comprise a solubilizer.

74. The pharmaceutical composition of claim 73, wherein the solubilizer is benzyl benzoate and benzyl alcohol.

75. The pharmaceutical composition of claim 64, which does not include an active pharmaceutical ingredient other than the compound, pharmacologically acceptable salt or solvate of claim 1.

76. The pharmaceutical composition of claim 64, which does not substantially include cilnidipine.

77. The pharmaceutical composition of claim 64, in which the compound, pharmacologically acceptable salt or solvate of claim 1 is at least 90% pure.

78. The pharmaceutical composition of claim 64, in which the compound, pharmacologically acceptable salt or solvate of claim 1 is at least 95% pure.

79. The pharmaceutical composition of claim 64, which is an oral dosage form.

80. The pharmaceutical composition of claim 79, which is in the form of a pill, tablet, capsule, elixir or microcapsule.

81. The pharmaceutical composition of claim 64, which comprises at least 1 mg of the compound, pharmacologically acceptable salt or solvate of claim 1.

82. The pharmaceutical composition of claim 64, which comprises at least 2 mg of the compound, pharmacologically acceptable salt or solvate of claim 1.

83. The pharmaceutical composition of claim 64, which comprises at least 5 mg of the compound, pharmacologically acceptable salt or solvate of claim 1.

84. The pharmaceutical composition of claim 64, which comprises at least 10 mg of the compound, pharmacologically acceptable salt or solvate of claim 1.

85. The pharmaceutical composition of claim 64, which comprises up to 20 mg of the compound, pharmacologically acceptable salt or solvate of claim 1.

86. The pharmaceutical composition of claim 64, which comprises up to 25 mg of the compound, pharmacologically acceptable salt or solvate of claim 1.

87. The pharmaceutical composition of claim 64, which comprises up to 50 mg of the compound, pharmacologically acceptable salt or solvate of claim 1.

88. A dynamin-related protein 1 (Drp1)-filamin complex formation inhibitor that contains, as an active ingredient, the compound, pharmacologically acceptable salt or solvate of claim 1.

89. A method of inhibiting formation of the Drp1-filamin complex, comprising administering to a subject in need thereof a therapeutically effective amount of a compound, pharmacologically acceptable salt or solvate of claim 1, the pharmaceutical composition of claim 64, or the (Drp1)-filamin complex formation inhibitor of claim 88.

90. A method of treating or reducing the incidence of chronic heart failure, comprising administering to a subject in need thereof a therapeutically effective amount of a compound, pharmacologically acceptable salt or solvate of claim 1, the pharmaceutical composition of claim 64, or the (Drp1)-filamin complex formation inhibitor of claim 88.

91. A method of treating or reducing the incidence of amyotrophic lateral sclerosis, comprising administering to a subject in need thereof a therapeutically effective amount of a compound, pharmacologically acceptable salt or solvate of claim 1, the pharmaceutical composition of claim 64, or the (Drp1)-filamin complex formation inhibitor of claim 88.

92. A method of treating or reducing the incidence of inflammatory bowel disease, comprising administering to a subject in need thereof a therapeutically effective amount of a compound, pharmacologically acceptable salt or solvate of claim 1, the pharmaceutical composition of claim 64, or the (Drp1)-filamin complex formation inhibitor of claim 88.

93. A method of treating or reducing the incidence of diabetes, e.g., type 1 diabetes or type 2 diabetes, comprising administering to a subject in need thereof a therapeutically effective amount of a compound, pharmacologically acceptable salt or solvate of claim 1, the pharmaceutical composition of claim 64, or the (Drp1)-filamin complex formation inhibitor of claim 88.

* * * * *